United States Patent [19]
Mishina

[11] Patent Number: 5,745,643
[45] Date of Patent: Apr. 28, 1998

[54] SYSTEM FOR AND METHOD OF REPRODUCING PLAYBACK DATA APPROPRIATELY BY THE USE OF ATTRIBUTE INFORMATION ON THE PLAYBACK DATA

[75] Inventor: Masamitsu Mishina, Sagamihara, Japan

[73] Assignee: Kabushiki Kaisha Toshiba, Kawasaki, Japan

[21] Appl. No.: 628,316

[22] Filed: Apr. 5, 1996

[30]   Foreign Application Priority Data

Apr. 6, 1995   [JP]   Japan ................ 7-081283

[51] Int. Cl.⁶ .......................... H04N 5/91; H04N 5/917
[52] U.S. Cl. .............................. 386/106; 386/109
[58] Field of Search ......................... 386/46, 95, 96, 386/97, 99, 102, 104, 105, 106, 109, 124, 125, 126–27, 29, 33, 39; 348/556, 445, 441; 360/32; H04N 5/91, 5/917

[56]   References Cited

U.S. PATENT DOCUMENTS 5,140,437   8/1992   Yonemitsu et al. ............ 386/109

5,400,077   3/1995   Cookson et al. ............ 348/556

FOREIGN PATENT DOCUMENTS

| 498 617 A2 | 8/1992 | European Pat. Off. . |
| 498 617 A3 | 8/1992 | European Pat. Off. . |
| 664 646 A2 | 7/1995 | European Pat. Off. . |
| 664 646 A3 | 7/1995 | European Pat. Off. . |
| WO 92/05658 | 4/1992 | WIPO . |

*Primary Examiner*—Robert Chevalier
*Attorney, Agent, or Firm*—Cushman Darby & Cushman IP Group of Pillsbury Madison & Sutro LLP

[57]   ABSTRACT

The video data to be reproduced is stored in a file in a video title set (VTS) secured in an information recording area on an optical disk. In the beginning area of the video title set (VTS), video title set information (VTSI) for managing the video title set (VTS) has been written. The video title set information (VTSI) is provided with a table (VTSI_MAT) for managing the video title set information. In the table (VTSI_MAT), the attributes peculiar to the video data (VTS_V_ATR) stored in the title set (VTS) have been written. By referring to the management table (VTSI_MAT), the video data to be reproduced is set in a reproducing system.

64 Claims, 35 Drawing Sheets

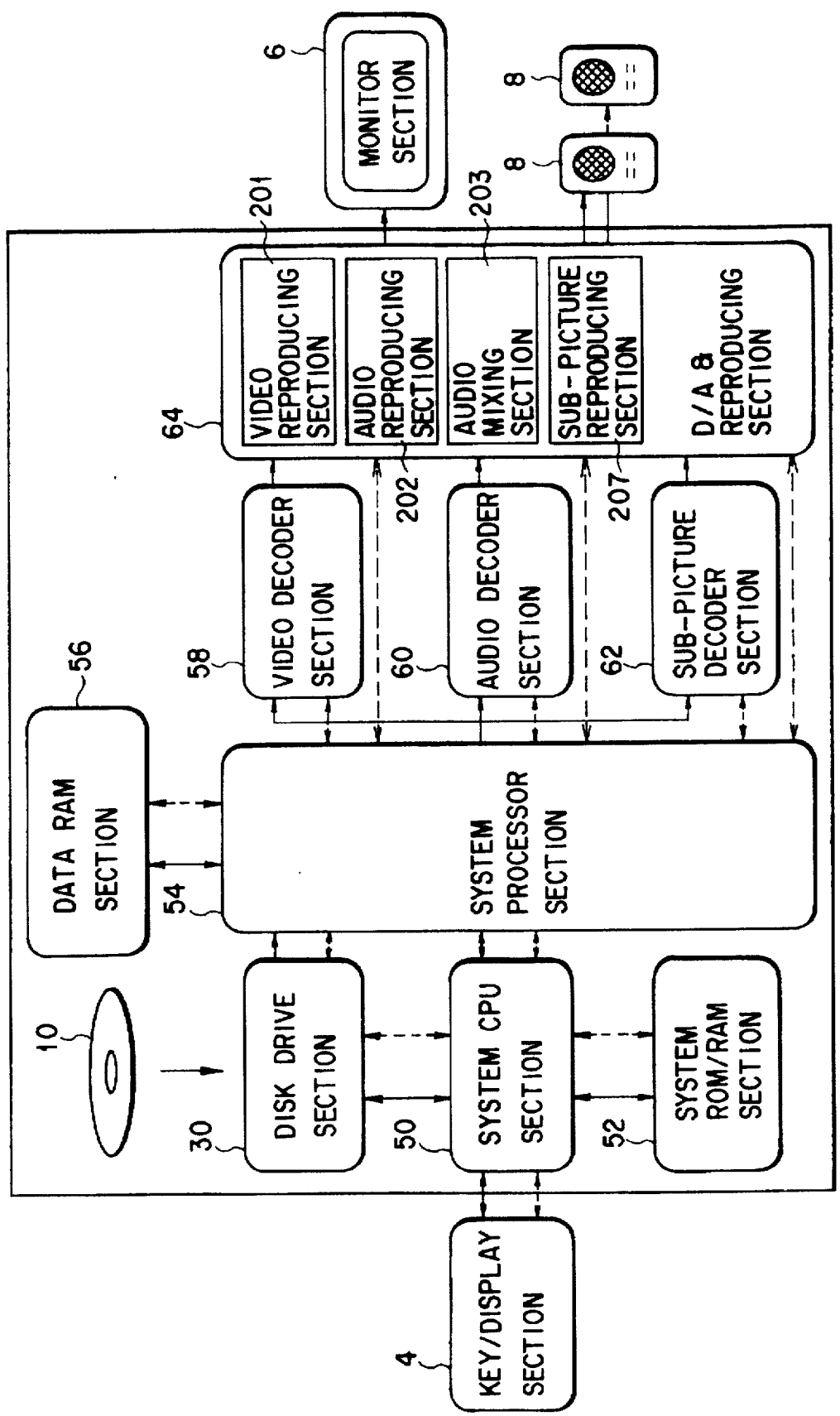
F I G. 1

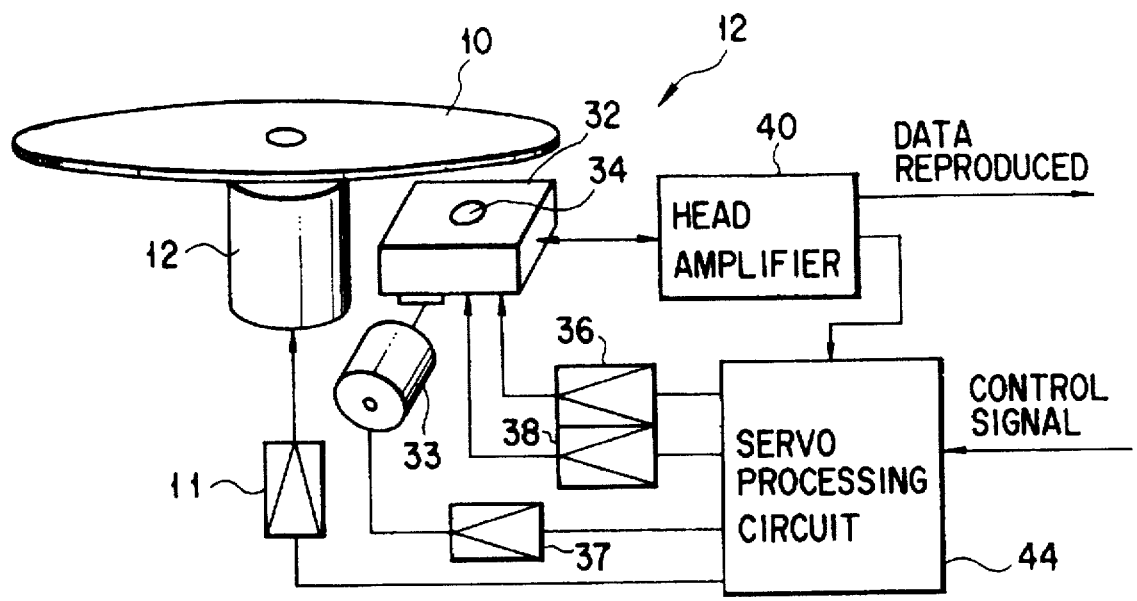
F I G. 2
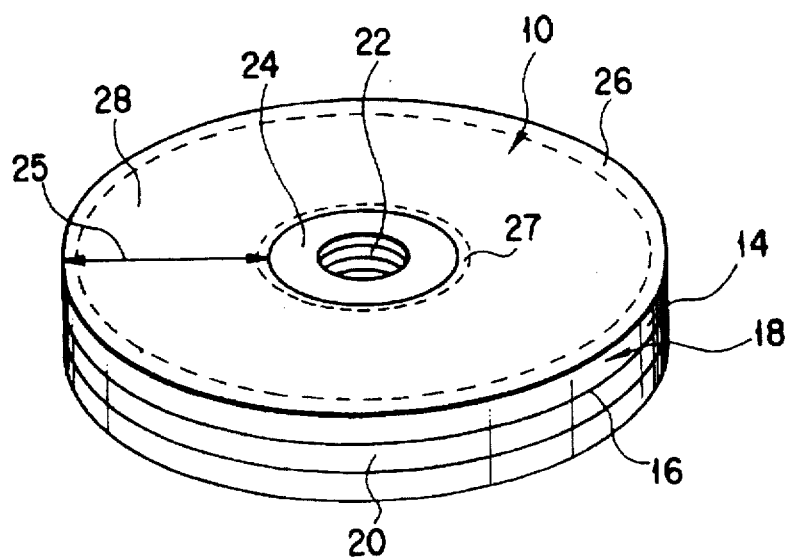
F I G. 3

FIG. 6

| Video Object Set (VOBS) | Video Object (VOB_IDN2) | ... | Video Object (VOB_IDNj) |
|---|---|---|---|
| 82 | 83 | | |

Video Object (VOB_IDN1) → Cell (C_IDN1), Cell (C_IDN2), ..., Cell (C_IDNj) — 84

Cell (C_IDN1) → Video Object Unit (VOBU), Video Object Unit (VOBU), Video Object Unit (VOBU), ..., Video Object Unit (VOBU) — 85

Video Object Unit (VOBU):
- NAV Pack — 86
- V Pack — 88
- V Pack
- V Pack
- SP Pack — 90
- A Pack — 91
- ...
- A Pack
- SP Pack
- V Pack
- V Pack
- V Pack
- NAV Pack
- ...
- A Pack

FIG. 7

| VMGI_MAT | Content (Description order) |
|---|---|
| VMG_ID | Video Manager Identifier |
| VMGI_SZ | Size of Video Manager Information |
| VERN | Version Number of DVD Video Specification |
| VMG_CAT | Video Manager Category |
| VLMS_ID | Volume Set Identifier |
| VTS_Ns | Number of Video Title Set |
| PVR_ID | Provider Unique ID |
| VMGI_MAT_EA | End Address of VMGI_MAT |
| VMGM_VOBS_SA | Video Manager Menu Video Object Set Start Address |
| TT_SRPT_SA | Start Address of TT_SRPT |
| VTS_ATRT_SA | Start Address of VTS_ATRT |
| VMGM_V_ATR | Video Attribute of VMGM |
| VMGM_AST_Ns | Number of Audio Stream of VMGM |
| VMGM_AST_ATR | Audio Stream Attribute of VMGM |
| VMGM_SPST_Ns | Number of Sub-picture Stream of VMGM |
| VMGM_SPST_ATR | Sub-picture Stream Attribute of VMGM |

FIG. 8
| b15 | b14 | b13 | b12 | b11 | b10 | b9 | b8 |
|---|---|---|---|---|---|---|---|
| Video Compression Mode | | Frame Rate | | Display Aspect Ratio | | Display Mode | |
| b7 | b6 | b5 | b4 | b3 | b2 | b1 | b0 |
|---|---|---|---|---|---|---|---|
| Reserved (0) | | | | | | | |
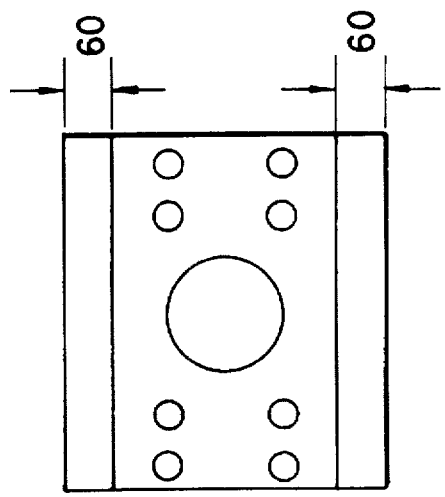
FIG. 10B
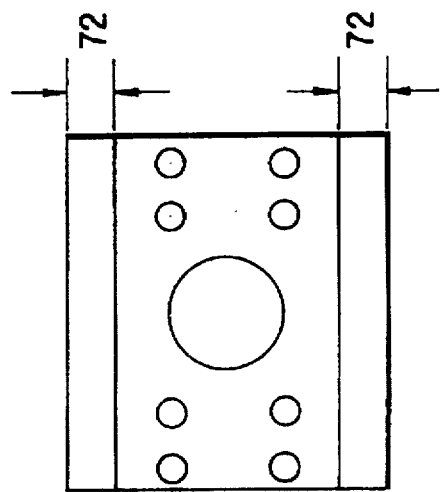
FIG. 10A

| Disc Recorded Data | | Playback Screen Image on TV Monitor | | | |
|---|---|---|---|---|---|
| Display Aspect Ratio | Description Picture Data | Display Mode / TV Aspect Ratio | | | |
| | | 00: Normal | 01: Pan-scan | 10: Letterbox | 9/16 |
| | | 3/4 | 3/4 | | |
| 00 (3/4) | [image] | [image] | [image] | [image] | [image] |
| 11 (9/16) | [image] | [image] | [image] | [image] | [image] |

| b63 | b62 | b61 | b60 | b59 | b58 | b57 | b56 |
|---|---|---|---|---|---|---|---|
| Audio Coding Mode | | | Reserved(0) | | Application ID | | |

| b55 | b54 | b53 | b52 | b51 | b50 | b49 | b48 |
|---|---|---|---|---|---|---|---|
| Quantization | | fs | | Reserved(0) | Audio Type | | |

| b47 | b46 | b45 | b44 | b43 | b42 | b41 | b40 |
|---|---|---|---|---|---|---|---|
| Number of Audio Channels | | | | Reserved(0) | | | |

| b39 | b38 | b37 | b36 | b35 | b34 | b33 | b32 |
|---|---|---|---|---|---|---|---|
| Reserved(0) | | | | | | | |

| b31 | b30 | b29 | b28 | b27 | b26 | b25 | b24 |
|---|---|---|---|---|---|---|---|
| Reserved(0) | | | | | | | |

| b23 | b22 | b21 | b20 | b19 | b18 | b17 | b16 |
|---|---|---|---|---|---|---|---|
| Reserved(0) | | | | | | | |

| b15 | b14 | b13 | b12 | b11 | b10 | b9 | b8 |
|---|---|---|---|---|---|---|---|
| Reserved(0) | | | | | Reserved(0) | | |

| b7 | b6 | b5 | b4 | b3 | b2 | b1 | b0 |
|---|---|---|---|---|---|---|---|
| Reserved(0) | | | | | | | |

| b47 | b46 | b45 | b44 | b43 | b42 | b41 | b40 |
|---|---|---|---|---|---|---|---|
| Sub-Picture Coding Mode | | Sub-Picture Display Type | | | | Sub-Picture Type | |

| b39 | b38 | b37 | b36 | b35 | b34 | b33 | b32 |
|---|---|---|---|---|---|---|---|
| Reserved(0) or Specific Code | | | | | | | |

| b31 | b30 | b29 | b28 | b27 | b26 | b25 | b24 |
|---|---|---|---|---|---|---|---|
| Reserved(0) or Specific Code | | | | | | | |

| b23 | b22 | b21 | b20 | b19 | b18 | b17 | b16 |
|---|---|---|---|---|---|---|---|
| Reserved(0) or Reserved for Specific Code | | | | | | | |

| b15 | b14 | b13 | b12 | b11 | b10 | b9 | b8 |
|---|---|---|---|---|---|---|---|
| Reserved(0) or Specific Code Extension | | | | | | | |

| b7 | b6 | b5 | b4 | b3 | b2 | b1 | b0 |
|---|---|---|---|---|---|---|---|
| Reserved(0) | | | | Reserved(0) | | | |

F I G. 12

TT_SRPT

| TT_SRPTI | (Description order) |
|---|---|
| | Content |
| EN_PGC_Ns | Number of Entry PGC |
| TT_SRPT_EA | End Address of TT_SRPT |

| TT_SRP | (Description order) |
|---|---|
| | Content |
| VTSN | Video Title Set Number |
| PGCN | Program Chain Number |
| VTS_SA | Start Address of Video Title Set |

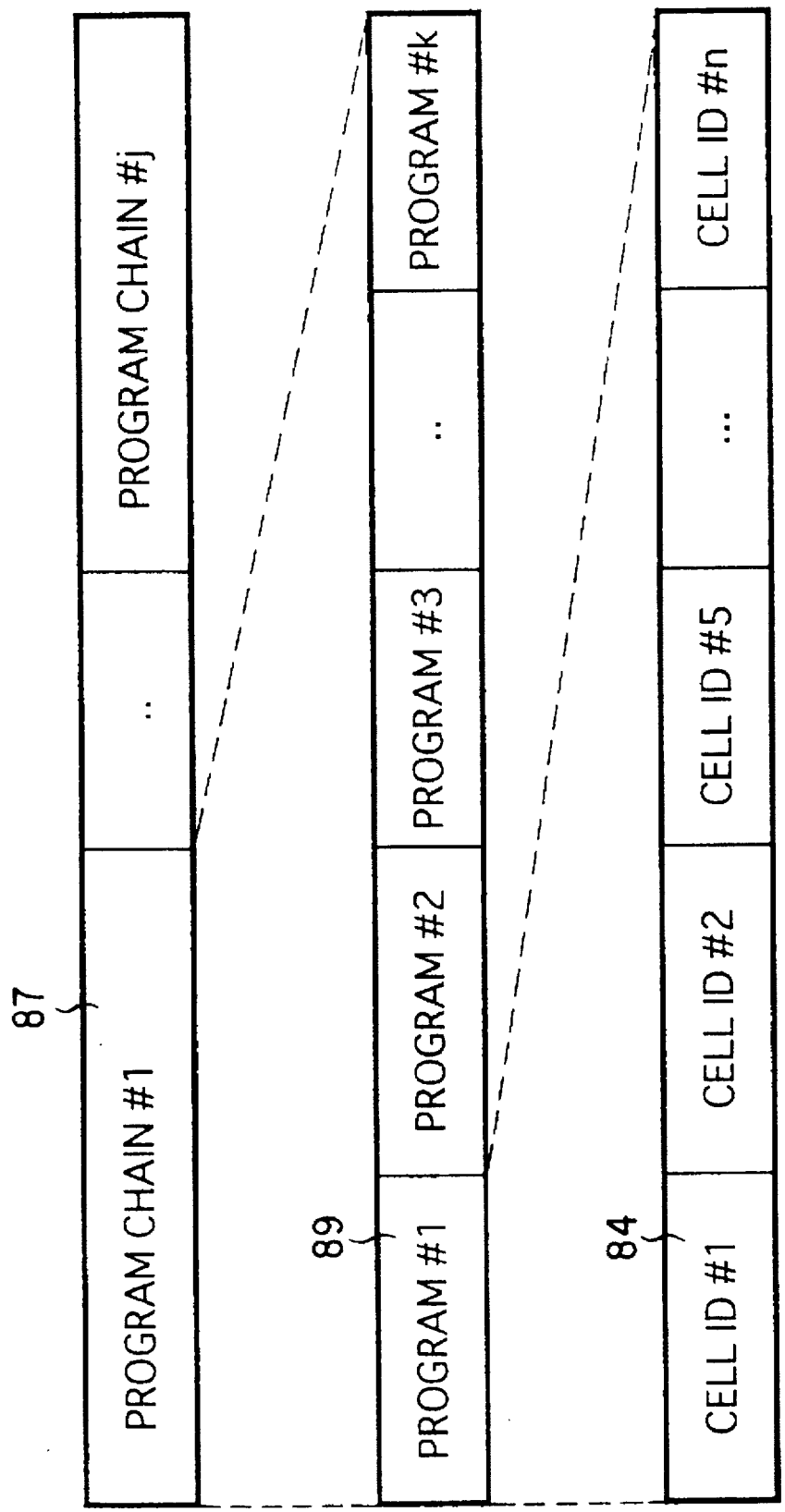
F I G. 16

| VTS_ATRTI | |
|---|---|
| | Contents |
| VTS_Ns | Number of VTSs |
| VTS_ATRT_EA | End Address of VTS_ATRT |

| VTS_ATR_SRP | |
|---|---|
| | Contents |
| (1) VTS_ATR_SA | Start Address of VTS_ATR |

| VTS_ATR | |
|---|---|
| | Contents |
| VTS_ATR_EA | End Address of VTS_ATR |
| VTS_CAT | Video Title Set Category |
| VTS_ATRI | Video Title Set Attribute Information |

| VTSI_MAT | Contents |
|---|---|
| VTS_ID | VTS Identifier |
| VTSI_SZ | Size of the VTSI |
| VERN | Version Number of DVD Video Specification |
| VTS_CAT | VTS Category |
| VTSI_MAT_EA | End Address of VTSI_MAT |
| VTSM_VOBS_SA | Start Address of VTSM_VOBS |
| VTSTT_VOBS_SA | Start Address of VTSTT_VOB |
| VTS_PTT_SRPT_SA | Start Address of VTS_PTT_SRPT |
| VTS_PGCIT_SA | Start Address of VTS_PGCIT |
| VTSM_PGCI_UT_SA | Start Address of VTSM_PGCI_UT |
| VTS_TMAPT_SA | Start Address of VTS_TMAPT |
| VTS_C_ADT_SA | Start Address of Cell Address Table |
| VTS_VOBU_ADMAP_SA | Start Address of VOBU Address Map |
| VTSM_V_ATR | Video Attribute of VTSM |
| VTSM_AST_Ns | Number of Audio Streams of VTSM |
| VTSM_AST_ATR | Audio Stream Attribute of VTSM |
| VTSM_SPST_Ns | Number of Sub-Picture Streams of VTSM |
| VTSM_SPST_ATR | Sub-Picture Stream Attribute of VTSM |
| VTS_V_ATR | Video Attribute of VTS |
| VTS_AST_Ns | Number of Audio Stream of VTS |
| VTS_AST_ATR | Audio Stream Attribute of VTS |
| VTS_SPST_Ns | Number of Sub-Picture Streams of VTS |
| VTS_SPST_ATR | Sub-Picture Stream Attribute of VTS |
| VTS_MU_AST_ATR | Multichannel Audio Stream Attribute of VTS |

F I G. 22

| Audio Coding Mode | Reserved (0) or Multichannel Extension | Audio Type | | Application ID | |
|---|---|---|---|---|---|
| b63 b62 b61 | b60 | b59 b58 | b57 | b56 | |
| Quantization | fs | Reserved (0) | Number of Audio Channels | | |
| b55 b54 b53 | b52 | b51 | b50 b49 b48 | | |
| Reserved (0) or Specific Code (Upper Bits) | | | | | |
| b47 b46 b45 b44 b43 b42 b41 b40 | | | | | |
| Reserved (0) or Specific Code (Lower Bits) | | | | | |
| b39 b38 b37 b36 b35 b34 b33 b32 | | | | | |
| Reserved (0) or Reserved (0) for Specific Code | | | | | |
| b31 b30 b29 b28 b27 b26 b25 b24 | | | | | |
| Reserved (0) | | | | | |
| b23 b22 b21 b20 b19 b18 b17 b16 | | | | | |
| Reserved (0) | | | | | |
| b15 b14 b13 b12 b11 b10 b9 b8 | | | | | |
| Reserved (0) or Application Information | | | | | |
| b7 b6 b5 b4 b3 b2 b1 b0 | | | | | |

FIG. 23

VTS_PGCIT

VTS_PGCIT_I (Description order)

| | Content |
|---|---|
| VTS_PGC_Ns | Number of VTS_PGCs |
| VTS_PGCIT_EA | End Address of VTS_PGCCIT |

VTS_PGCIT_SRP (Description order)

| | Content |
|---|---|
| VTS_PGC_CAT | Video Title Set PGC category |
| VTS_PGCI_SA | Start Address of VTS_PGC Information |

VTS_PGCI

| PGC_GI | |
|---|---|
| | (Description order) |
| | Content |
| PGCI_CAT | PGC Category |
| PGC_CNT | PGC Content |
| PGC_PB_TIME | PGC Playback Time |
| PGC_SPST_CTL | PGC-Sub-picutre Stream Control |
| PGC_AST_CTL | PGC Audio Stream Control |
| PGC_SP_PLT | PGC Sub-picture Palette |
| PGC_PGMAP_SA | Start Address of PGC_PGMAP |
| C_PBIT_SA | Start Address of C_PBIT |
| C_POSIT_SA | Start Address of C_POSIT |

FIG. 28

PGC_PGMAP

| |
|---|
| Entry Cell Number for Program #1 |
| Entry Cell Number for Program #2 |
| ⋮ |
| Entry Cell Number for Program #n |

FIG. 29

| Entry cell number | |
|---|---|
| | Content |
| ECELLN | Entry Cell Number |

FIG. 30

C_PBIT
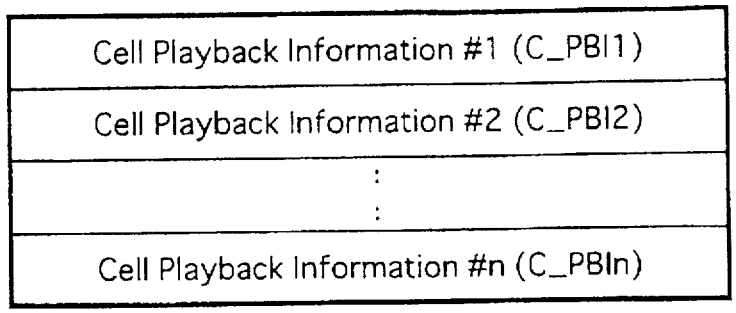
FIG. 31
| C_PBI | |
|---|---|
| | Content |
| C_CAT | Cell Category |
| C_PBTM | Cell Playback Time |
| C_FVOBU_SA | Start Address of the First VOBU in the Cell |
| C_LVOBU_SA | Start Address of the Last VOBU in the Cell |
FIG. 32
C_POSI
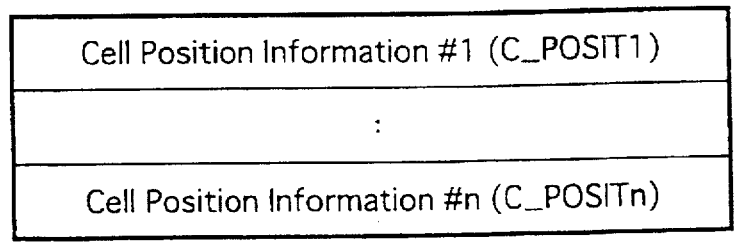
FIG. 33
| C_POSI | |
|---|---|
| | Content |
| C_VOB_IDN | VOB ID Number of Cell |
| C_IDN | Cell ID Number of the Cell |
FIG. 34

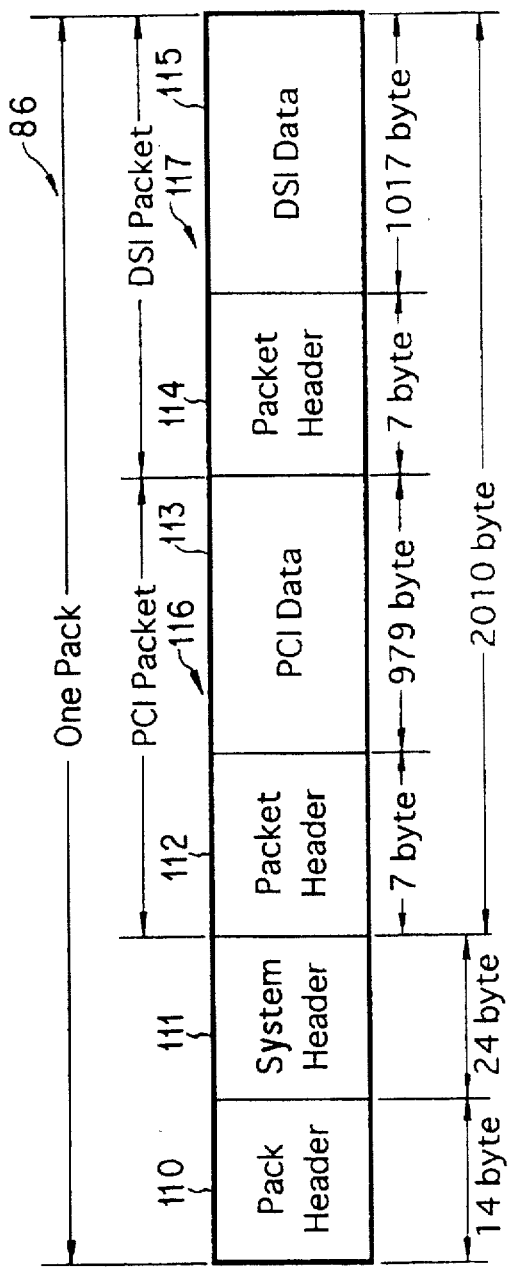
F I G. 35
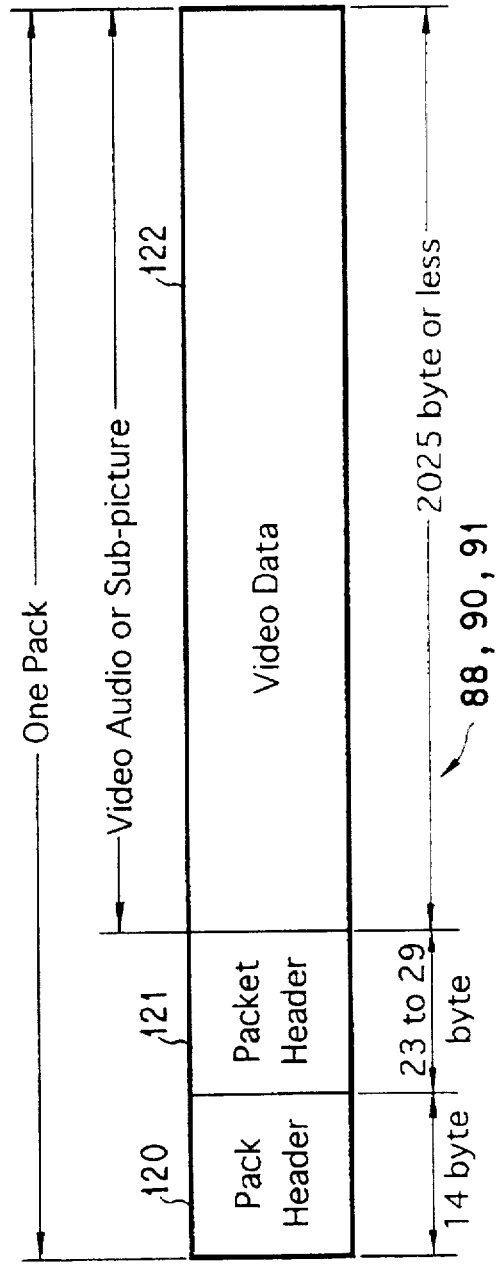
F I G. 36

FIG. 37

| PCI | |
|---|---|
| | Content |
| PCI_GI | PCI General Information |
| NSMLS_ANGLI | Angle Information |

FIG. 38

| PCI_GI | |
|---|---|
| | Content |
| NV_PCK_LBN | LBN of NV Pack |
| VOBU_CAT | Category of VOBU |
| VOBU_S_PTM | Start PTM of VOBU |
| VOBU_E_PTM | End PTM of VOBU |

FIG. 39

| DSI | |
|---|---|
| | Content |
| DSI_GI | DSI General Information |
| SML_PBI | Seamless Playback Information |
| SML_AGLI | Angle Information |
| NV_PCK_ADI | Navigation Pack Address Information |
| SYNCI | Synchronus Playback Information |

FIG. 40

| DSI_GI | |
|---|---|
| | Content |
| NV_PCK_SCR | SCR of NV Pack |
| NV_PCK_LBN | LBN of NV Pack |
| VOBU_EA | VOBU End Address |
| VOBU_IP_EA | First I-picture End Address |
| VOBU_VOB_IDN | VOB ID Number |
| VOBU_C_IDN | Cell ID Number |

FIG. 41

| SYNCI | |
|---|---|
| | Content |
| A_SYNCA 0 to 7 | Target Audio Pack Address |
| SP_SYNCA 0 to 31 | VOBU Start Address of Target SP pack |

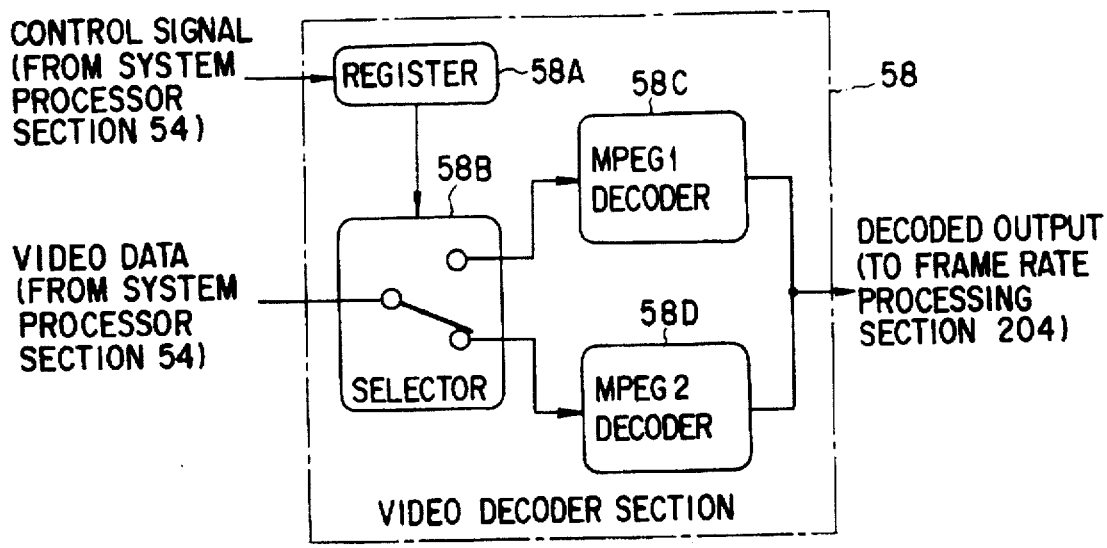
F I G. 42
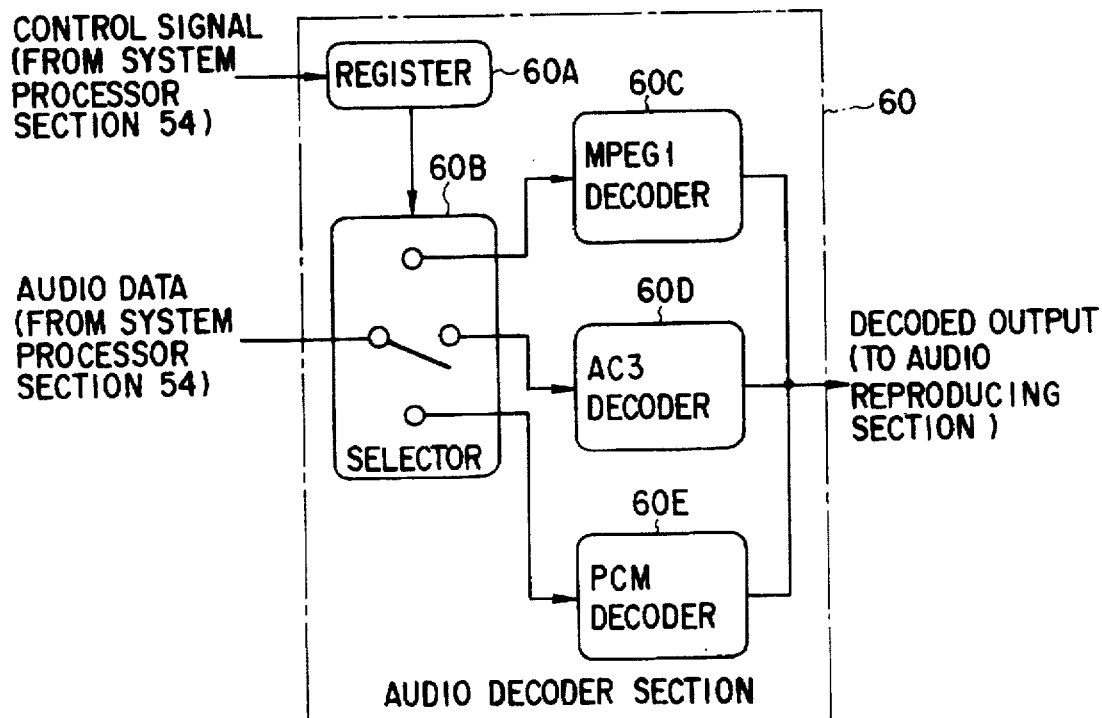
F I G. 43

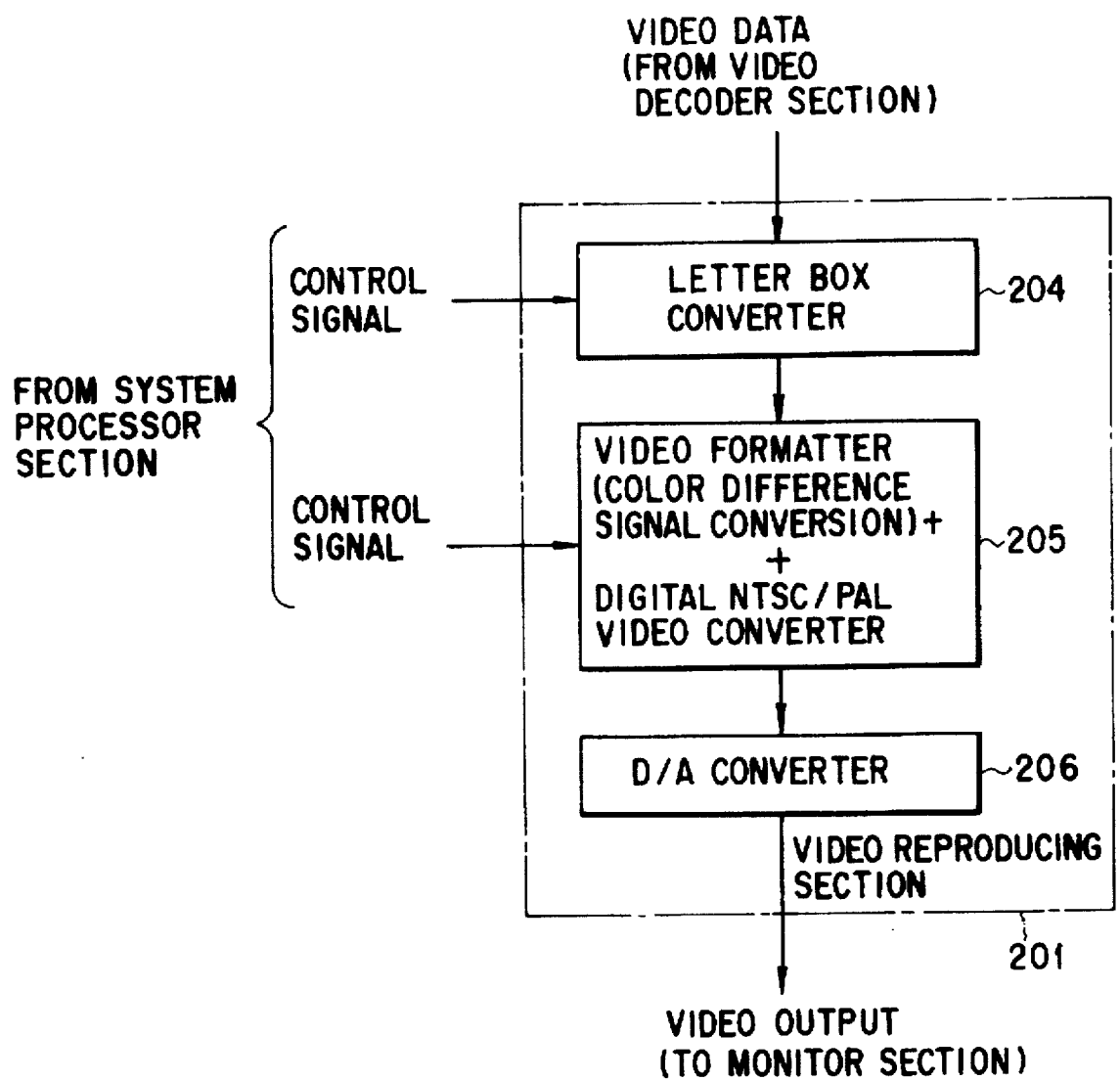
F I G. 45

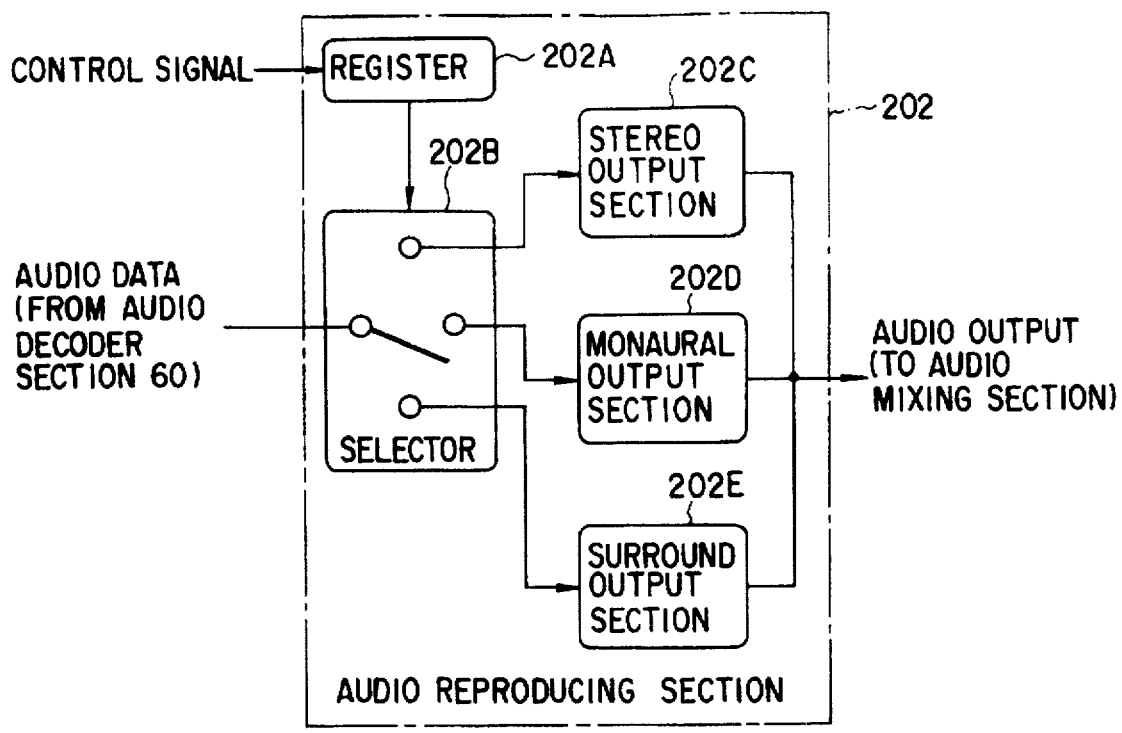
F I G. 46
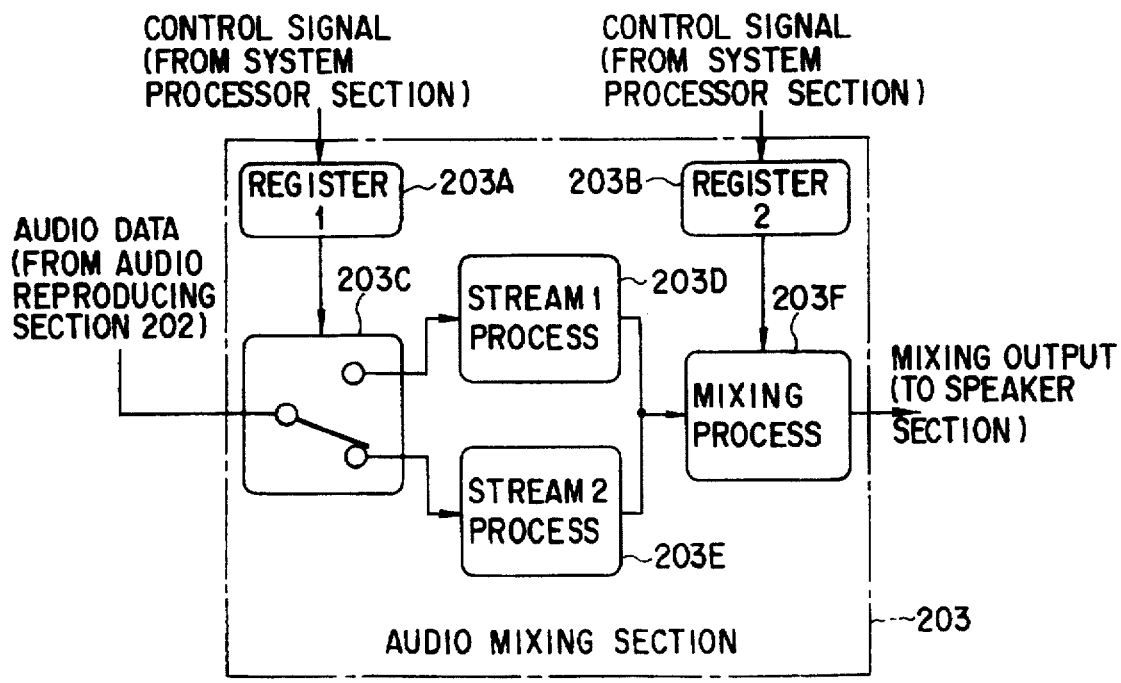
F I G. 47

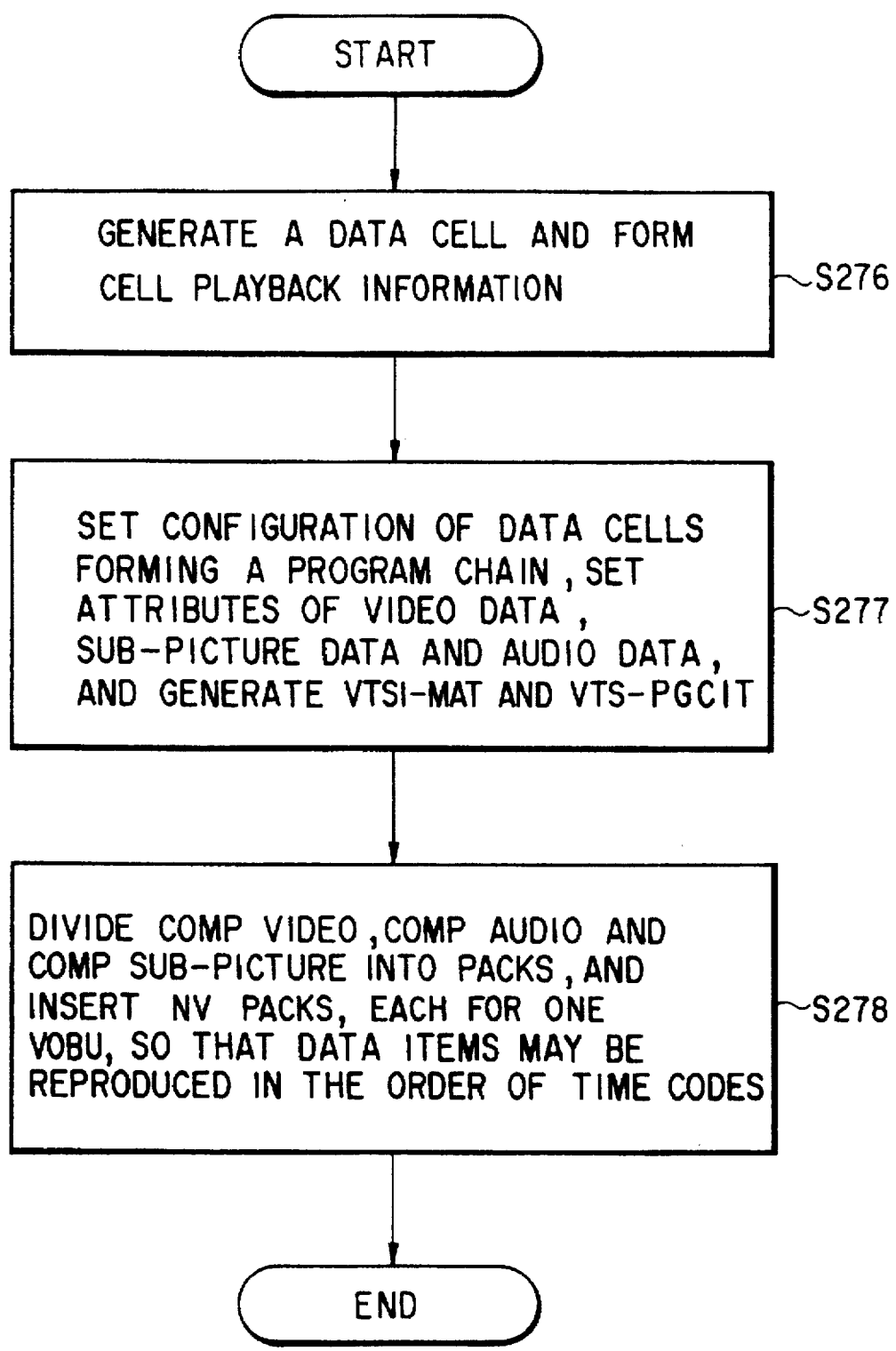
F I G. 53

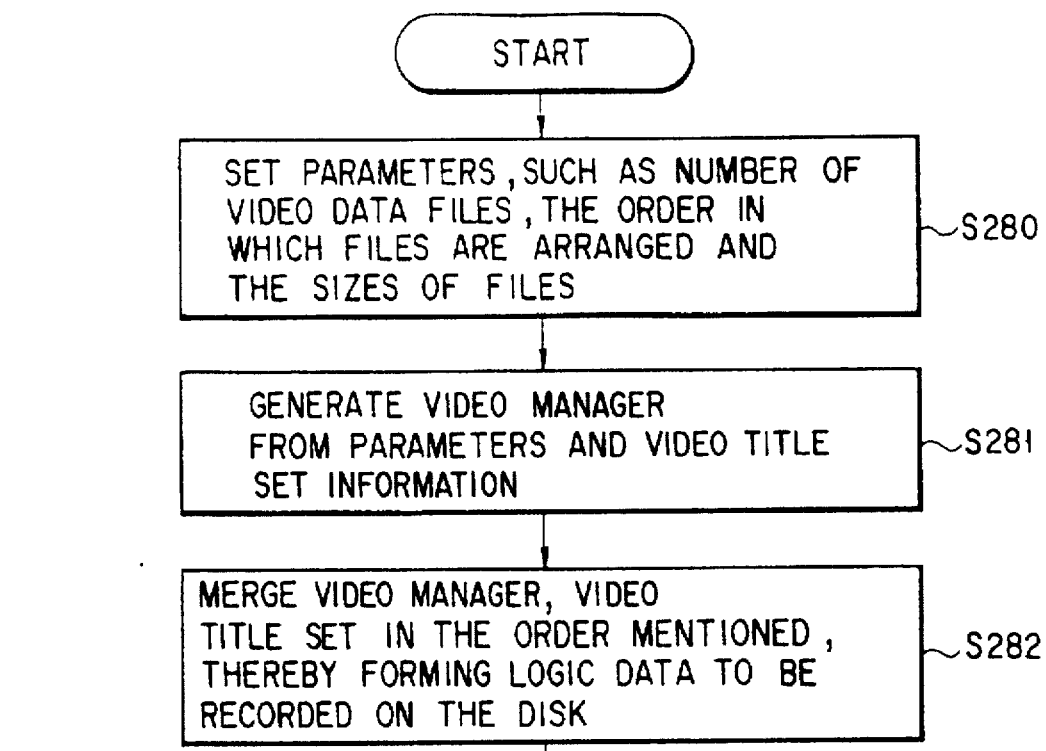
F I G. 55
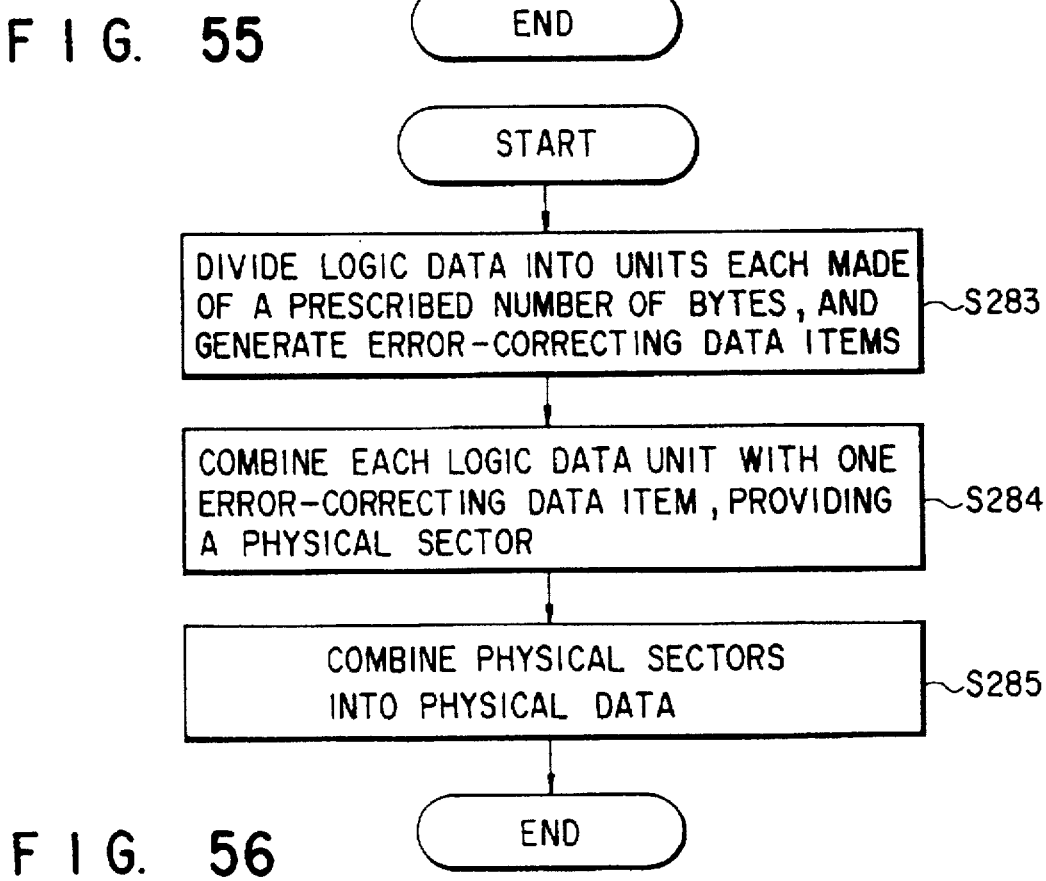
F I G. 56

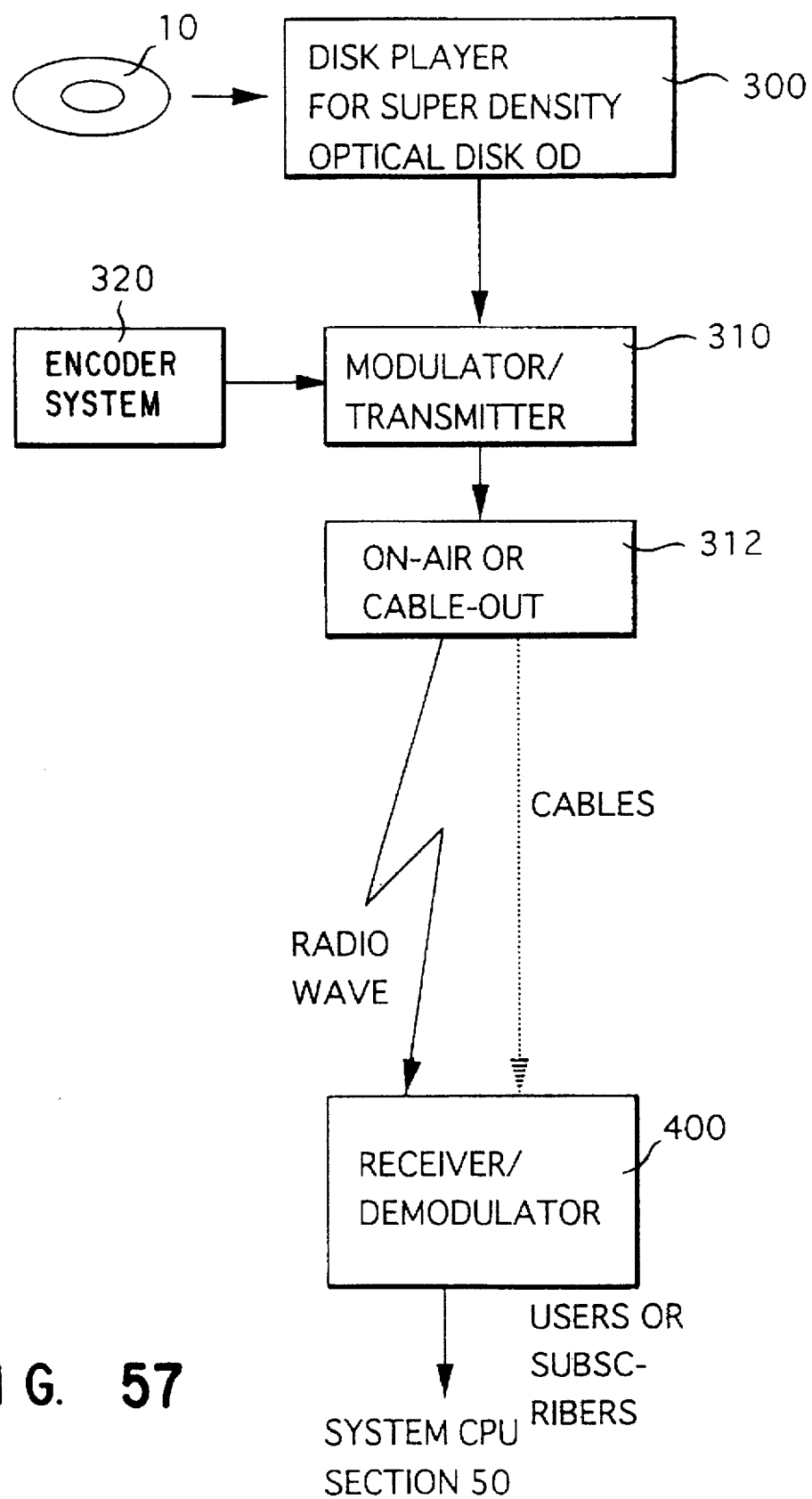
F I G. 57

SYSTEM FOR AND METHOD OF REPRODUCING PLAYBACK DATA APPROPRIATELY BY THE USE OF ATTRIBUTE INFORMATION ON THE PLAYBACK DATA

BACKGROUND OF THE INVENTION

1. Field of the Invention

This invention relates to a system for and method of reproducing playback data appropriately by the use of video attribute information on the playback data, and more particularly to a reproducing system and method capable of acquiring playback data having specific video attributes and converting the data into playback data best suitable for the reproducing system.

2. Description of the Related Art

Recently, moving-picture-oriented optical disk reproducing apparatuses, which reproduce images and sound from optical disks in which data, including images (video data) and sound (audio data), has been recorded digitally, have been developed and widely used as reproducing apparatuses for move software or karaoke, for example.

Compact disks (CDs) have been already developed and are now part of the best-known applications of optical disks. Because of the limits of their storage capacity, it is considered difficult to record and reproduce the movie data for a long time. To overcome this shortcoming, an optical disk capable of recording even movie data at high density is being investigated and developed.

Some of such high-density recording optical disks are available on the market. With such optical disks, it is possible to record a plurality of selectable video data items on a single disk. Furthermore, it is possible to allocate different sounds to a single video by recording a plurality of audio streams on the disk, and moreover, it is possible, for example, to select and display subtitles with different languages by recording a plurality of sub-picture streams on the disk. Moreover, the MPEG (Moving Picture Expert Group) scheme has been recently approved as an international standard moving-picture data compression scheme. The MPEG scheme is a scheme of variably compressing the video data. Furthermore, the MPEG2 scheme is now being standardized internationally. With this movement, the system format corresponding to the MPEG2 compression scheme has been prescribed in the MPEG 2 system layer. In this layer, data required to display the video data, including frame rate information and the display aspect ratio, has been prescribed.

When the video data compressed by a decoder compatible with the MPEG2 is expanded, however, if the source frame rate differs from the display frame rate, or if the source aspect ratio differs from the display aspect ratio, it is necessary to perform conversion suitable for the display unit. In the prior art, however, only the conversion of display prescribed in the MPEG2 system layer is performed, so that the video data output scheme cannot be changed, leading to the problem of being unable to change the output scheme to suit the situation.

SUMMARY OF THE INVENTION

An object of the present invention is to provide a reproducing apparatus capable of, when displaying video data, arbitrarily changing the video data output scheme on the basis of the video data attributes given to the video data.

Another object of the present invention is to provide a reproducing method capable of, when displaying video data, arbitrarily changing the video data output scheme on the basis of the video data attributes given to the video data.

According to the present invention, there is provided a system for reproducing video data from a recording medium having a playback data area in which video data has been stored and a playback information area in which management information on the stored video data itself and playback information on the procedure for reproducing video data have been written, the management information including information on the video attributes peculiar to video data necessary for converting video data into a video signal, the system comprising: searching means for searching the playback information area for video data and playback information; conversion sections that are provided for the video attributes on a one-to-one basis and convert the retrieved video data into a video signal; selecting means for selecting one of the conversion sections according to the retrieved video attribute information; and reproducing means for reproducing the video signal converted at the conversion section.

Furthermore, according to the present invention, there is provided a method of reproducing video data from a recording medium having a playback data area in which video data has been stored and a playback information area in which management information on the stored video data itself and playback information on the procedure for reproducing video data have been written, the management information including information on the video attributes peculiar to video data necessary for converting video data into a video signal, the method comprising the steps of: searching the playback information area for video data and playback information; selecting a conversion method according to the retrieved video attribute information; converting the retrieved video data into a video signal by the selected conversion method; and reproducing the converted video signal.

Still furthermore, according to the present invention, there is provided a communication system for transferring playback data, comprising: means for creating not only video data but also management information on the video data itself and playback management data specifying the procedure of reproducing the video data, the video data consisting of video data units, which are to be reproduced time-sequentially and each of which is to be reproduced within a constant time span, each data unit consisting of data pack trains into which video data is compressed and packeted, the management information including information on the video attributes peculiar to video data necessary for converting video data into a video signal; means for transferring video data units after playback management data has been transferred; conversion sections that are provided for the video attributes on a one-to-one basis and convert the transferred video data units into video signals; selecting means for selecting one of the conversion sections according to the video attribute information in the transferred playback management data; and reproducing means for reproducing the video signal converted at the conversion section.

BRIEF DESCRIPTION OF THE DRAWINGS

FIG. 1 is a schematic block diagram of an optical disk apparatus according to an embodiment of the present invention;

FIG. 2 is a detailed block diagram of the mechanism section of the disk drive unit of FIG. 1;

FIG. 3 is a schematic perspective view of the structure of an optical disk loaded in the disk drive unit of FIG. 1;

FIG. 6 shows an example of the structure of the video object set (VOBS) of FIG. 5;

FIG. 7 shows the parameters in the volume manager information management table (VMGI_MAT) in the video manger (VMGI) of FIG. 5 and the description thereof;

FIG. 8 is a bit table describing the video attributes of VMGM of FIG. 7;

FIG. 9 is an explanatory diagram of the relationship between the display aspect ratio related to the description of the video attributes and the display mode;

FIGS. 10A and 10B are plan views to help explain that the representation of the letter box of FIG. 9 changes with the frame rate;

FIG. 11 is a bit table describing the audio stream attributes of VMGM of FIG. 7;

FIG. 12 is a bit table describing the sub-picture stream attributes of VMGM of FIG. 7;

FIG. 16 is an explanatory diagram to help explain the structure of a program chain stored in a file;

FIG. 22 shows the parameters in the video title set information management table (VTSI_MAT) for the video title set information (VTSI) of FIG. 21 and the description thereof;

FIG. 23 is a bit map table of the audio stream attributes (VTS_AST_ATR) described in the table (VTSI_MAT) of FIG. 21;

FIG. 28 shows the parameters for pieces of general information (PGC_GI) on a program chain in the program chain information (VTS_PGCI) of FIG. 27;

FIG. 29 shows the structure of a program chain map (PGC_PGMAP) in the program chain information (VTS_PGCI) of FIG. 27;

FIG. 30 shows the parameters for the entry cell numbers (ECELLN) of the programs written in the program chain map (PGC_PGMAP) of FIG. 19 and the description thereof;

FIG. 31 shows the structure of a cell playback information table (C_PBIT) in the program chain information (VTS_PGCI) of FIG. 27;

FIG. 32 shows the parameters in the cell playback information (C_PBI) of FIG. 31 and the description thereof;

FIG. 33 shows the structure of cell position information (C_POSI) in the program chain information (VTS_PGCI) of FIG. 27;

FIG. 34 shows the parameters for the cell position information (C_POSI) of FIG. 33 and the description thereof;

FIG. 35 shows the structure of the navigation pack of FIG. 6;

FIG. 36 shows the structure of the video, audio, or sub-picture pack of FIG. 6;

FIG. 37 shows the parameters for presentation control information (PCI) in the navigation pack of FIG. 35 and the description thereof;

FIG. 38 shows the parameters for general information (PCI_GI) in the presentation control information (PCI) of FIG. 37 and the description thereof;

FIG. 39 shows the parameters for disk search information (DSI) in the navigation pack of FIG. 35 and the description thereof;

FIG. 40 shows the parameters for DSI general information (DSI_GI) in the disk search information (DSI) of FIG. 39 and the description thereof;

FIG. 41 shows the parameters for synchronous playback information (SYNCI) on the video object (VOB) OF FIG. 37 and the description thereof;

FIG. 42 is a block diagram of the video decoder section of FIG. 1;

FIG. 43 is a block diagram of the audio decoder section of FIG. 1;

FIG. 45 is a block diagram of the video playback processing section of FIG. 1;

FIG. 46 is a block diagram of the audio playback processing section of FIG. 1;

FIG. 47 is a block diagram of the audio mixing section of FIG. 1;

FIG. 53 is a flowchart for combining the main video data, audio data, and sub-picture data that have been encoded in the flow of FIG. 52 and creating a video data file;

FIG. 55 is a flowchart for creating logic data to be recorded on the disk in the disk formatter of FIG. 54;

FIG. 56 is a flowchart for creating from logic data physical data to be recorded on the disk; and FIG. 57 is a schematic diagram of a system that transfers the video title set of FIG. 4 via a communication system.

DETAILED DESCRIPTION OF THE PREFERRED EMBODIMENTS

Hereinafter, referring to the accompanying drawings, an optical disk and an optical disk reproducing apparatus according to an embodiment of the present invention will be explained.

Figure 4:
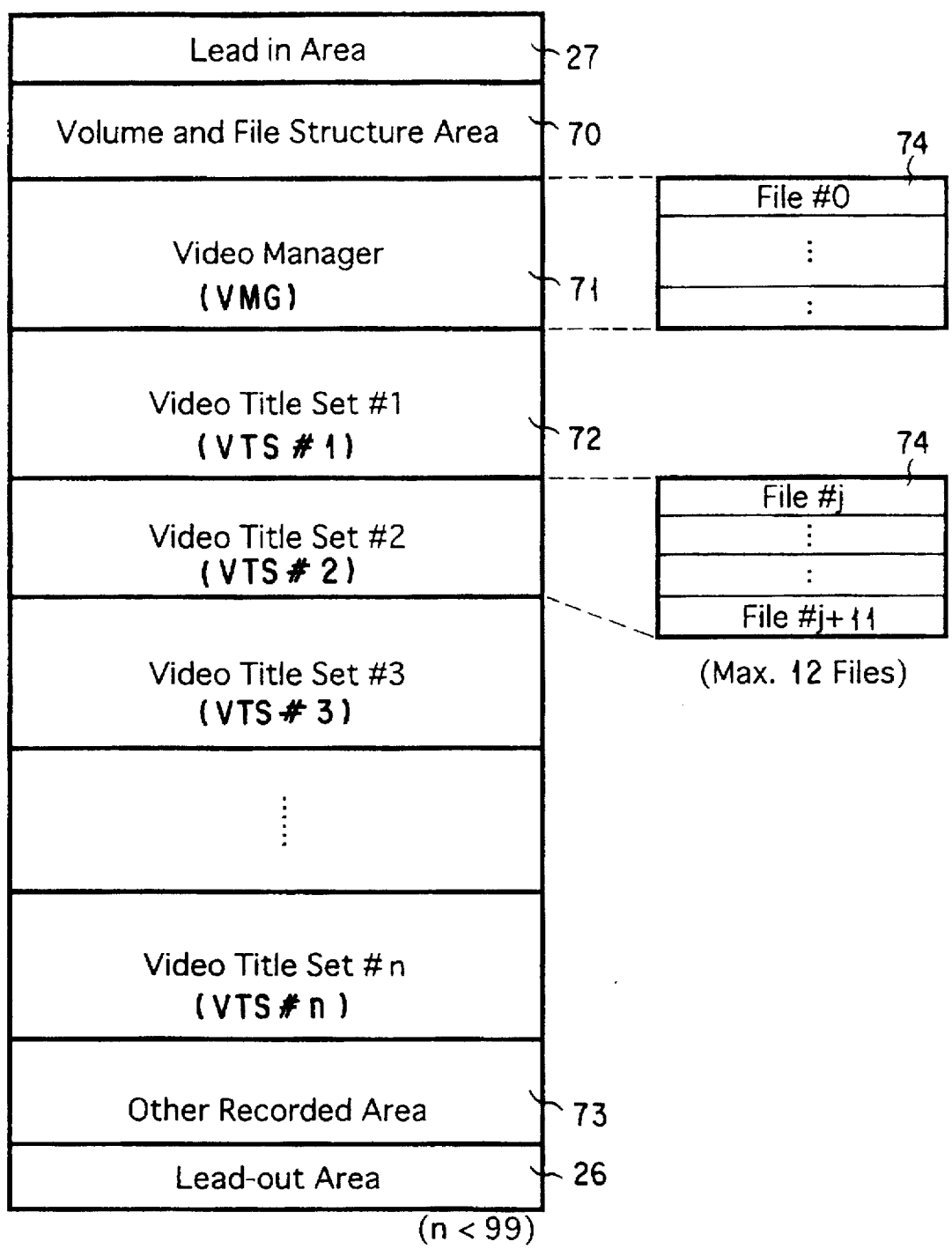
FIG. 4 shows the structure of a logic format of the optical disk of FIG. 3.

FIG. 1 is a block diagram of an optical disk reproducing apparatus that reproduces the data from an optical disk associated with an embodiment of the present invention. FIG. 2 is a block diagram of the disk drive section that drives the optical disk shown in FIG. 1. FIGS. 3 and 4 show the structure of the optical disk shown in FIGS. 1 and 2.

As shown in FIG. 1, the optical disk reproducing apparatus comprises a key/display section 4, a monitor section 6, and a speaker section 8. When the user operates the key/display section 4, this causes the recorded data to be reproduced from an optical disk 10. The recorded data contains video data, sub-picture data, and audio data, which are converted into video signals and audio signals. The monitor section 6 displays images according to the audio signals and the speaker section 8 generates sound according to the audio signals.

The optical disk 10 has been available with various structures. For instance, one type of the optical disk 10 is a read-only disk on which data is recorded at a high density as shown in FIG. 3. The optical disk 10, as shown in FIG. 3, is made up of a pair of composite layers 18 and an adhesive layer 20 sandwiched between the composite disk layers 18. Each of the composite disk layers 18 is composed of a transparent substrate 14 and a recording layer or a light-reflecting layer 16. The disk layer 18 is arranged so that the light-reflecting layer 16 may be in contact with the surface of the adhesive layer 20. A center hole 22 is made in the optical disk 10. On the periphery of the center hole 22 on both sides, clamping areas 24 are provided which are used to clamp the optical disk 10 during its rotation. When the disk 10 is loaded in the optical disk apparatus, the spindle of a spindle motor 12 shown in FIG. 2 is inserted into the center hole 22. As long as the disk is being rotated, it continues clamped to the clamping areas 24.

As shown in FIG. 3, the optical disk 10 has an information area 25 around the clamping area 24 on each side, on which areas the information can be recorded. In each information area 25, its outer circumference area is determined to be a lead-out area 26 in which no information is normally recorded, its inner circumference area adjoining the clamping area 24 is determined to be a lead-in area 27 in which no information is normally recorded, and the area between the lead-out area 26 and the lead-in area 27 is determined to be a data recording area 28.

At the recording layer 16 in the information area 25, a continuous spiral track is normally formed as an area in which data is to be recorded. The continuous track is divided into a plurality of physical sectors, which are assigned serial numbers. On the basis of the sectors, data is recorded. The data recording area 28 in the information recording area 25 is an actual data recording area, in which playback data, video data, sub-picture data, and audio data are recorded in the form of pits (that is, in the form of changes in the physical state) as explained later. With the read-only optical disk 10, a train of pits is previously formed on the transparent substrate 14 by a stamper, a reflecting layer is formed by evaporation on the surface of the transparent substrate 14 on which the pit train has been formed, and the reflecting layer serves as the recording layer 16. On the read-only optical disk 10, no groove is normally provided as a track and the pit train on the surface of the transparent substrate 14 serves as a track.

The optical disk apparatus 12, as shown in FIG. 1, further comprises a disk drive section 30, a system CPU section 50, a system ROM/RAM section 52, a system processor section 54, a data RAM section 56, a video decoder 58, an audio decoder section 60, a sub-picture decoder section 62, and a D/A and data reproducing section 64.

As shown in FIG. 2, the disk drive section 30 contains a motor driving circuit 11, a spindle motor 12, an optical head 32 (i.e., an optical pickup), a feed motor 33, a focus circuit 36, a feed motor driving circuit 37, a tracking circuit 38, a head amplifier 40, and a servo processing circuit 44. The optical disk 10 is placed on the spindle motor 12 driven by the motor driving circuit 11 and is rotated by the spindle motor 12. The optical head 32 that projects a laser beam on the optical disk 10 is located under the optical disk 10. The optical head 32 is placed on a guide mechanism (not shown). The feed motor driving circuit 37 is provided to supply a driving signal to the feed motor 33. The motor 33 is driven by the driving signal and moves in and out the optical head 32 radially over the optical disk 10. The optical head 32 is provided with an object lens 34 positioned so as to face the optical disk 10. The object lens 34 is moved according to the driving signal supplied from the focus circuit 36 so as to move along its optical axis.

To reproduce the data from the aforementioned optical disk, the optical head 32 projects a laser beam on the optical disk 10 via the object lens 34. The object lens 34 is traversed minutely over the optical disk 10 according to the driving signal supplied from the tracking circuit 38. Furthermore, the object lens 34 is moved minutely along its optical axis according to the driving signal supplied from the focusing circuit 36 so that its focal point may be positioned on the recording layer 16 of the optical disk 10. This causes the laser beam to form the smallest beam spot on the spiral track (i.e., the pit train), enabling the beam spot to trace the track. The laser beam is reflected from the recording layer 16 and returned to the optical head 32. The optical head 32 converts the beam reflected from the optical disk 10 into an electric signal, which is supplied from the optical head 32 to the servo processing circuit 44 via the head amplifier 40. From the electric signal, the servo processing circuit 44 produces a focus signal, a tracking signal, and a motor control signal and supplies these signals to the focus circuit 36, tracking circuit 38, and motor driving circuit 11, respectively.

Therefore, the object lens 34 is moved along its optical axis and across the radius of the optical disk 10, its focal point is positioned on the recording layer 16 of the optical disk 10, and the laser beam forms the smallest beam spot on the spiral track. Furthermore, the spindle motor 12 is rotated by the motor driving circuit 11 at a specific rotating speed. This allows the beam to trace the pit train at a constant linear speed.

The system CPU section 50 of FIG. 1 supplies to the servo processing circuit 44 a control signal serving as an access signal. In response to the control signal, the servo processing circuit 44 supplies a head-moving signal to the feed motor driving circuit 37, which supplies a driving signal to the feed motor 33. Then, the feed motor 33 is driven, causing the optical head 32 to traverse over the optical disk 10. Then, the optical head 32 accesses a specific sector formed at the recording layer 16 of the optical disk 10. The playback data is reproduced from the specific sector by the optical head 32, which then supplies it to the head amplifier 40. The head amplifier 40 amplifies the reproduced data, which is outputted at the disk drive section 30.

The reproduced data is stored in the data RAM section 56 by the system processor section 54 under the supervision of the system CPU section 50 controlled by the programs stored in the system ROM/RAM section 52. The stored reproduced data is processed at the system processor section 54, which sorts the data into video data, audio data, and sub-picture data, which are supplied to the video decoder section 58, audio decoder section 60, and sub-picture decoder section 62, respectively, and are decoded at the respective decoders. The D/A and data-reproducing section 64 converts the decoded video data, audio data, and sub-picture data into an analog video signal, an analog audio signal, and an analog sub-picture signal and supplies the resulting video signal to the monitor 6 and the resulting audio signal to the speaker 8. Then, on the basis of the video signal and sub-picture signal, images are displayed on the monitor section 6 and according to the audio signal, sound is simultaneously reproduced at the speaker section 8.

The detailed operation of the optical disk apparatus of FIG. 1 will be described later with reference to the logic format of the optical disk explained below.

The data recording area 28 between the lead-in area 27 and the lead-out area 26 on the optical disk of FIG. 1 has a volume and file structure as shown in FIG. 4. The structure has been determined in conformity to specific logic format standards, such as micro UDF or ISO 9660. The data recording area 28 is physically divided into a plurality of sectors as described earlier. These physical sectors are assigned serial numbers. In the following explanation, a logical address means a logical sector number (LSN) as determined in micro UDF or ISO 9660. Like a physical sector, a logical sector contains 2048 bytes. The numbers (LSN) of logical sectors are assigned consecutively in ascending order as the physical sector number increments.

As shown in FIG. 4, the volume and file structure is a hierarchical structure and contains a volume and file structure area 70, a video manager (VMG) 71, at least one video title set (VTS) 72, and other recorded areas 73. These areas are partitioned at the boundaries between logical sectors. As with a conventional CD, a logical sector is defined as a set of 2048 bytes. Similarly, a logical block is defined as a set of 2048 bytes. Therefore, a single logical sector is defined as a single logical block.

The file structure area 70 corresponds to a management area determined in micro UDF or ISO 9660. According to the description in the management area, the video manager 71 is stored in the system ROM/RAM section 52. As explained with reference to FIG. 5, the information used to manage video title sets is written in the video manager, which is composed of a plurality of files 74, starting with file #0. In each video title set (VTS) 72, compressed video data, compressed audio data, compressed sub-picture data, and the playback information about these data items are stored as explained later. Each video title set is composed of a plurality of files 74. The number of video title sets is limited to 99 maximum. Furthermore, the number of files 74 (from File #j to File #j+9) constituting each video title set is determined to be 10 maximum. These files are also partitioned at the boundaries between logical sectors.

In the other recorded areas, the information capable of using the aforementioned video title sets 72 is recorded. The other recorded areas are not necessarily provided.

Figure 5:
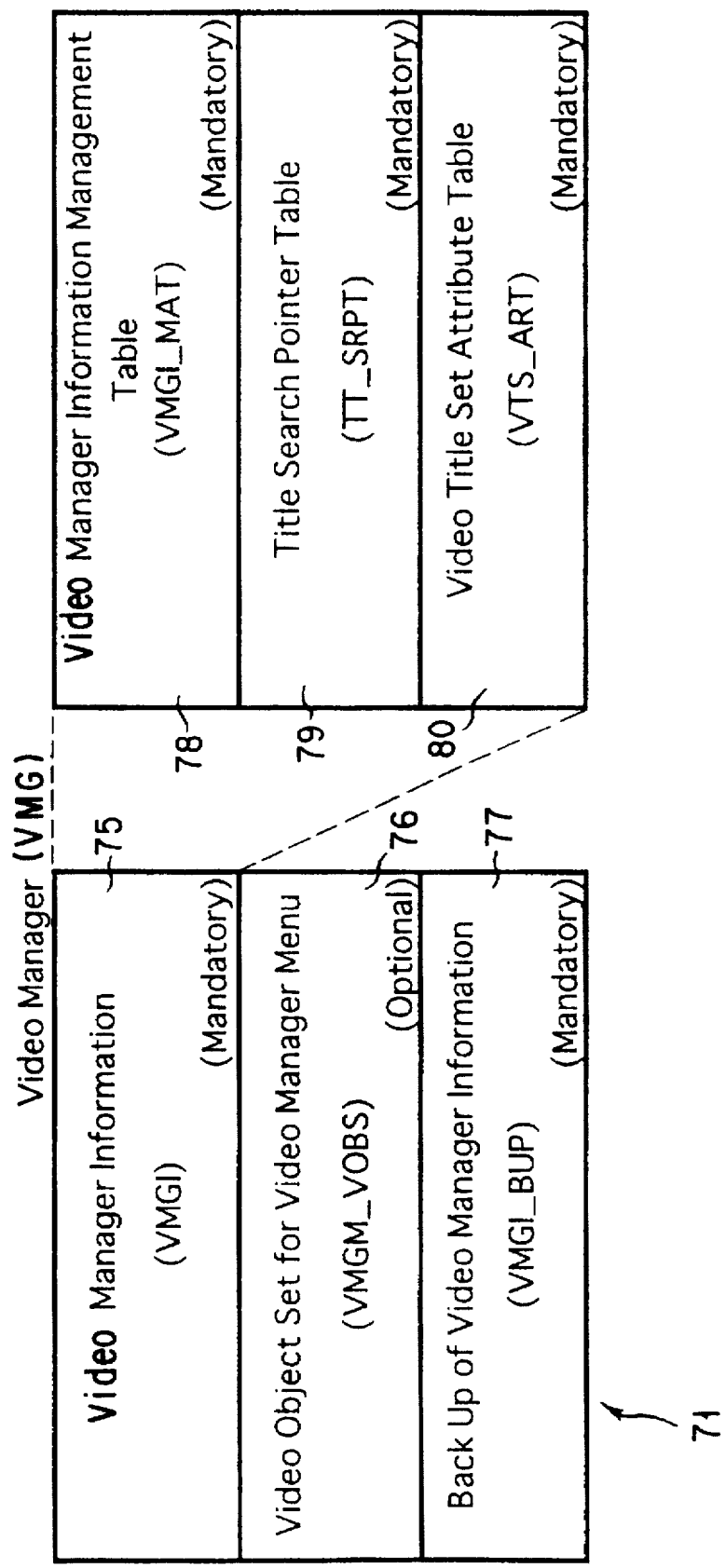
FIG. 5 shows the structure of the video manager of FIG. 4.

As shown in FIG. 5, the video manager 71 contains at least three items each corresponding to individual files 74. Specifically, the video manager 71 is made up of video manager information (VMGI) 75, a video object set (VMGM_VOBS) 76 for video manager menu, and backup (VMGI_BUP) 77 of video manager information. Here, the volume manager information (VMGI) 75 and the backup (VMGI_BUP) 77 of video manager information are determined to be indispensable items, and the video object set (VMGM_VOBS) 76 for video manager menu is determined to be an optional item. In the video object set (VMGM-VOBS) 76 for VMGM, the video data, audio data, and sup-picture data for a menu of the volumes of the optical disk managed by the video manager 71 are stored.

According to the video object set (VMGM_VOBS) for VMGM, the volume name of the optical disk, the sound accompanying the volume name representation, and the description of the sub-picture are displayed and at the same time, selectable items are provided in the form of sub-pictures as in video reproduction explained later. For example, the video object set (VMGM_VOBS) 76 for VMGM indicates that the optical disk contains video data representing the matches a boxer played until he won a world championship. In this example; and a fighting pose of boxer X, together with a volume name, such as The Glorious History of Boxer X, is reproduced in the form of video data and at the same time, his theme song is reproduced in sound, and his chronological table is provided in a sub-picture. Furthermore, the user is asked which language choice to select, English or Japanese, for example for the narration of the matches. At the same time, the user is asked whether subtitles in another language should be provided in a sub-picture or which language choice should be selected for the subtitles. Thus, for example, the VMGM video object set (VMGM_VOBS) 76 makes preparations for the user to watch a video of a match of boxer X in English narration with a sub-picture using Japanese subtitles.

Here, the structure of a video object set (VOBS) 82 will be described with reference to FIG. 6. FIG. 6 shows an example of a video object set (VOBS) 82. The video object set (VOBS) 82 comes in three types 76, 95, 96 for two menus and a title. Specifically, in the video object set (VOBS) 82, a video title set (VTS) 72 contains a video object set (VTSM_VOBS) 95 for a menu of video title sets and a video object set (VTSTT_VOBS) for the titles of at least one video title set as explained later. Each video object 82 set has the same structure except that their uses differ.

As shown in FIG. 6, a video object set (VOBS) 82 is defined as a set of one or more video objects (VOB). The video objects 83 in a video object set (VOBS) 82 are used for the same application. A video object set (VOBS) 82 for menus is usually made up of a single video object (VOB) 83 and stores the data used to display a plurality of menu screens. In contrast, a video object set (VTSTT_VOBS) 82 for title sets is usually composed of a plurality of video objects (VOB) 83.

Taking the aforesaid video of a boxing match taken as an example, a video object (VOB) 83 corresponds to the video data of each match played by boxer X. Specifying a particular video object (VOB) enables, for example, boxer X's eleventh match for a world championship to be reproduced on a video. The video object set (VTSM_VOBS) 95 for a menu of the video title sets 72 contains the menu data for the matches played by boxer X. According to the presentation of the menu, a particular match, for example, boxer X's eleventh match for a world championship, can be specified. In the case of a usual single story movie, one video object 83 (VOB) corresponds to one video object set (VOBS) 82. One video stream is completed with one video object set (VOBS) 82. In the case of a collection of animated cartoons or an omnibus movie, a plurality of video streams; each corresponding to individual stories, are provided in a single video object set (VOBS) 82. Each video stream is stored in the corresponding video object. Accordingly, the audio stream and sub-picture stream related to the video stream are also completed with each video object (VOB) 83.

An identification number (IDN#j) is assigned to a video object (VOB) 83. By the identification number, the video object (VOB) 83 can be identified. A single video object (VOB) 83 is made up of one or more cells 84. Although a usual video stream is made up of a plurality of cells, a menu video stream, or a video object (VOB) 83 may be composed of one cell. A cell is likewise assigned an identification number (C_IDN#j). By the identification number (C_IDN#j), the cell 84 is identified.

As shown in FIG. 6, each cell 84 is composed of one or more video object units (VOBU) 85, normally a plurality of video object units (VOBU) 85. Here, a video object unit (VOBU) 85 is defined as a pack train having a single navigation pack (NAV pack) 86 at its head. Specifically, a video object unit (VOBU) 85 is defined as a set of all the packs recorded, starting at a navigation pack (NAV pack) to immediately in front of the next navigation pack. The playback time of the video object unit (VOBU) corresponds to the playback time of the video data made up of one or more GOPs (Group of Pictures) contained in the video object (VOBU). The maximum playback time is determined to be 0.4 or more second and less than one second. In the MPEG standard, a single GOP is determined to be normally 0.5 second long and be compressed screen data for reproducing about 15 screens during that duration.

When a video object unit includes video data as shown in FIG. 6, more than one GOP composed of video packs (V packs) 88, a sup-picture pack (SP pack) 90, and an audio pack (A pack) 91 all determined in the MPEG standard, are arranged to produce a video data stream. Regardless of the number of GOPs, a video object unit (VOBU) 85 is determined on the basis of the playback time of a GOP. The video object always has a navigation pack (NV pack) 86 at its head. Even when the playback data consists only of audio and/or sub-picture data, it will be constructed using the video object unit as a unit. Specifically, even if a video object unit is constructed only of audio packs, the audio packs to be reproduced within the playback time of the video object unit to which the audio data belongs will be stored in the video object unit, as with the video object of video data.

The video manager 71 will be explained with reference to FIG. 5. The video management information 75 placed at the head of the video manager 71 contains information on the video manager itself, the information used to search for titles, the information used to reproduce the video manager menu, and the information used to manage the video title sets (VTS) 72 such as the attribute information on video titles. The volume management information contains at least three tables 78, 79, 80 in the order shown in FIG. 5. Each of these tables 78, 79, 80 is aligned with the boundaries between logical sectors. A first table, a video manger information management table (VMGI_MAT) 78, is a mandatory table, in which the size of the video manager 71, the start address of each piece of the information in the video manger 71, and the start address of and the attribute information about the video object set (VMGM_VOBS) 76 for a video manager menu are written. As explained later, the attribute information includes the video attribute information, the audio attribute information, and the sub-picture attribute information. According to these pieces of attribute information, the modes of the decoders 58, 60, 62 are changed, thereby enabling the video object set (VMGM_VOBS) 76 to be reproduced in a suitable mode.

Written in a second table of the video manager 71, a title search pointer table (TT_SRPT) 79, are the start addresses of the video titles stored on the optical disk that are selectable according to a title number entered from the key/display section 4 on the apparatus.

In a third table of the video manager 71, a video title set attribution table (VTS_ATRT) 80, the attribute information determined in the video title set (VTS) 72 in the volumes of the optical disk is written. Specifically, in this table, the following items are written as attribute information: the number of video title sets (VTS) 72, video title set (VTS) 72 numbers, video attributes, such as a video data compression scheme, audio stream attributes, such as an audio coding mode, and sub-picture attributes, such as the type of sub-picture display.

The details of the contents of the volume management information management table (VMGI_MAT) 78, title search pointer table (TT_SRPT) 78, and video title set attribute table (VTS_ATRT) 80 will be described with reference to FIGS. 7 to 20.

As shown in FIG. 7, written in the volume management information management table (VMGI_MAT) 78 are an identifier (VMG_ID) for the video manager 71, the size of video management information in the number of logical blocks (a single logical block contains 2048 bytes, as explained earlier), the version number (VERN) related to the standard for the optical disk, commonly known as a digital video disk (a digital multipurpose disk, hereinafter, referred to as a DVD), and the category (VMG_CAT) of the video manger 71.

In the category (VMG_CAT) of the video manager 71, a flag indicating whether or not the DVD video directory inhibits copying is written. Further written in the table (VMGI_MAT) 78 are a volume set identifier (VLMS_ID), the number of video title sets (VTS_Ns), the identifier for a provider supplying the data to be recorded on the disk (PVR_ID), the start address (VMGM_VOBS_SA) of the video object set (VMGM_VOBS) 76 for a video manager menu, the end address (VMGI_MAT_EA) of a volume manager information management table (VMGI_MAT) 78, and the start address (TT_SRPT_SA) of a title search pointer table (TT_SRPT). If the video object set (VMGM_VOBS) 95 for the VMG menu is absent, "00000000h" will be written in its start address (VMGM_VOBS_SA). The end address (VMGI_MAT_EA) of VMG_MAT 78 is represented by the relative bit number from the first logical block of VMGI_MAT 78 and the start address (TT_

SRPT_SA) of TT_SRPT 79 is represented by the relative number of logical blocks from the first logical block of VMGI 75.

Furthermore, in the table 78, the start address (VTS_ATRT_SA) of the attribute table (VTS_ATRT) of video title sets 72 (VTS) is represented by the number of bytes, relative to the first byte in the VMGI manager table (VMGI_MAT) 71, and the video attribute (VMGM_V_AST) of the video manager menu (VMGM) video object set 76 is written as well. Further written in the table 78 are the number (VMGM_AST_Ns) of audio streams in the video manager menu (VMGM), the attributes (VMGM_AST_ATR) of audio streams in the video manager menu (VMGM), the number (VMGM_SPST_Ns) of sub-picture streams in the video manager menu (VMGM), and the attributes (VMGM_SPST_ATR) of sub-picture streams in the video manager menu (VMGM).

In the video attribute (VMGM_V_ATR), as shown in FIG. 8, bit number b8 to bit number b15 are allocated to the compression mode, frame rate, display aspect ratio, and display mode, which are the video attribute of the video object set 76 for the video manager menu (VMGM) and bit number b0 to bit number b7 are left empty for reservation for later use. When "00" is written in bit numbers b15, b14, this means the menu video data has been compressed in the video compression mode on the basis of the MPEG-1 standard; and when "01" is written in bit numbers b15, b14, this means the menu video data has been compressed in the video compression mode on the basis of the MPEG-2 standard. The other numbers are for reservation for later use. When "00" is written in bit numbers b13, b12, this means that the menu video data has a frame rate of 29.27/s at which 29.27 frames are reproduced every second. Specifically, when "00" is written in bit numbers b13, b12, this means that the menu video data is TV-system video data according to the NTSC scheme and has a frame rate at which a single frame is drawn at a horizontal frequency of 60 Hz using 525 scanning lines. When "01" is written in bit numbers b13, b12, this means that the menu video data has a frame rate of 25/s at which 25 frames are reproduced every second. Specifically, this means that the menu video data is TV-system video data according to the PAL scheme and has a frame rate at which a single frame is drawn at a frequency of 50 Hz using 625 scanning lines. The other numerals in bit numbers b13, b12 are for reservation for later use.

Furthermore, when "00" is written in bit numbers b11, b10, this means that the menu video data has a display aspect ratio (ratio of height to width) of 3/4; and when "11" is written in bit numbers b11, b10, this means that the menu video data has a display aspect ratio (ratio of height to width) of 9/16. The other numbers are for reservation for later use.

Furthermore, when the display aspect ratio is 3/4, that is, when "00" is written in bit numbers b11, b10, "11" is written in bit numbers b9, b8. When the display aspect ratio is 9/16, that is, when "11" is written in bit numbers b11, b10, whether the displaying of the menu video data in pan scan and/or letter box is permitted is written. Specifically, when "00" is written in bit numbers b9, b8, this means that the displaying in either of pan scan and letter box is permitted; when "01" is written in bit numbers b9, b8, this means that the displaying in pan scan is permitted, but the displaying in letter box is inhibited; and when "10" is written in bit numbers b9, b8, this means that the displaying in pan scan is inhibited, but the displaying in letter box is permitted. When "11" is written in bit numbers b9, b8, this means that the displaying is not particularly specified.

FIG. 9 shows the relationship between the video data recorded on the optical disk and the reproduced screen images on the TV monitor. As for the video data, because the display aspect ratio is written in bit numbers b11, b10 and the display mode is written in bit numbers b9, b8 as the aforementioned attribute information, this gives the displays as shown in FIG. 9. The video data whose original display aspect ratio ("00" in bit numbers b11, b10) is 3/4 is compressed as it is and recorded. Specifically, as shown in FIG. 9, in the case of the image data with a circle drawn in the center around which four small circles are placed, even if the display mode is any of normal ("00" in bit numbers b9, b8), pan scan ("01" in bit numbers b9, b8), and letter box ("10" in bit numbers b9, b8), it will be displayed on a TV monitor 6 having a TV aspect ratio of 3/4 without changing the display mode as an image with a circle drawn in the center around which four small circles are placed. Even with a TV monitor 6 having a TV aspect ratio of 9/16, the image data will be displayed without changing the display mode as an image with a circle drawn in the center around which four small circles are placed, leaving the areas on both sides of the screen of the TV monitor blank.

In contrast, the image data whose aspect ratio ("11" in bit numbers b11, b10) is 9/16 is compressed and recorded in a representation with more height than width and distorted so that it may have an aspect ratio of 3/4. Specifically, the image having a display aspect ratio of 9/16 with a circle drawn in the center around which four small circles are placed, outside which another four small circles are placed—one large circle and eight small circles—is compressed and recorded as the data transformed into a representation where all circles have more height than width. Accordingly, when the display mode is normal ("00" in bit numbers b9, b8), the original image will be displayed without changing the display mode on a TV monitor 6 having a TV aspect ratio of 3/4 as an image having an oval with more height than width drawn in the center around which four small ovals with more height than width are placed, outside which another four small ovals with more height than width are placed—one large ovals and eight small ovals. In contrast, when the display mode is pan scan ("01" in bit numbers b9, b8), the original image will be displayed on the TV monitor 6 having a TV aspect ratio of 3/4 as an image with a circle, not an oval, drawn in the center around which four small circles are placed, and the edge of the screen is trimmed that the four outermost small circles are cut away. Furthermore, when the display mode is letter box ("10" in bit numbers b9, b8), because the aspect ratio remains unchanged, the original image will be displayed on the TV monitor 6 having a TV aspect ratio of 3/4 as an image of full screen, that is, a single large circle, not an oval, and eight small circles except that no images appear at the top and bottom of the screen. Naturally, because a TV monitor 6 having a TV aspect ratio of 9/16 agrees with the display aspect ratio ("11" in bit numbers b11, b10) of the image data, the image data is displayed as an image with a complete circle drawn in the center around which four small complete circles are placed, outside which another four small complete circles are placed—one large circle and eight small circles.

As described above, when the image data whose display aspect ratio ("11" in bit numbers b11, b10) is displayed on the TV monitor 6 having a TV aspect ratio of 3/4, no image appears on the top and bottom of the screen. At a frame rate ("01" in bit numbers b13, b12) at which a single frame is drawn at a horizontal frequency of 60 Hz using 525 scanning lines, 72 horizontal scanning lines, the top and bottom ones put together, draw in black (Y=16, U=V=128) as shown in FIG. 10A and therefore the top and bottom portions appear black. At a frame rate ("00" in bit numbers b13, b12) at which a single frame is drawn at a horizontal frequency of 50 Hz using 625 scanning lines, 60 horizontal scanning lines, the top and bottom ones put together, draw in black (Y=16, U=V=128) as shown in FIG. 10A and therefore the top and bottom portions appear black.

Explanation of the contents of the table shown in FIG. 7 will be resumed. In the audio stream attribute (VMGM_AST_ATR) of the video manager menu (VMGM), bit number b63 to bit number b48 are allocated to the audio coding mode, audio type, audio application type, quantization, sampling frequency, and the number of audio channels and bit number b47 to bit number b0 are left empty for reservation for later use as shown in FIG. 11. If the VMCG video object set 76 is absent, or if an audio stream is absent in the video object set, "0" will be written in each bit, starting at bit number b63 down to bit number b0. The audio coding mode is written in bit number b63 to bit number b61. When "000" is written for the audio coding mode, this means that the audio data has been coded according to Dolby AC-3 (a trademark of Dolby Laboratories Licensing Corporation). When "010" is written for the audio coding mode, this means that the audio data is compressed without any expanded bit stream under MPEG-1 or MPEG-2. When "011" is written for the audio coding mode, this means that the audio data is compressed with an expanded bit stream under MPEG-2. When "100" is written for the audio coding mode, this means that the audio data is coded by linear PCM. For the audio data, the other numbers are for reservation for later use. At a frame rate ("00" is written in bit numbers b13, b12 in VMGM_V_ATR) at which a single frame is drawn at a horizontal frequency of 60 Hz using 525 scanning lines, in the video data attribute, Dolby AC-3 ("000" in bit numbers b63, b62, b61) or linear PCM ("100" in bit numbers b63, b62, b61) is to be set. At a frame rate ("01" is written in bit numbers b13, b12 in VMGM_V_ATR) at which a single frame is drawn at a horizontal frequency of 50 Hz using 625 scanning lines, in the video data attribute, MPEG-1 or MPEG-2 ("010" or "011" in bit numbers b63, b62, b61) or linear PCM ("100" in bit numbers b63, b62, b61) is to be set.

The audio type is written in bit numbers b59 and b58. When the audio type is not specified, "00" will be written in these bit numbers. The other numbers are for reservation. The ID of an audio application field is written in bit numbers b57 and b56. When the ID is not specified, "00" will be written in these bit numbers. The other numbers are for reservation. The quantization of audio data is written in bit numbers b55 and b54. When bit numbers b55, b54 contain "00", this means the audio data quantized in 16 bits; when bit numbers b55, b54 contain "01", this means the audio data quantized in 20 bits; when bit numbers b55, b54 contain "10", this means the audio data quantized in 24 bits; and when bit numbers b55, b54 contain "11", this means that the quantization is not specified. Here, when the audio coding mode is set to linear PCM ("100" in bit numbers b63, b62, b61), no specification of quantization ("11" in bit numbers b55, b54) is written. The audio data sampling frequency Fs is written in bit numbers b53 and b52. When the sampling frequency Fs is 48 kHz, "00" is written in these bit numbers; when the sampling frequency Fs is 96 kHz, "01" is written in these bit numbers; and the other numbers are for reservation.

The number of audio channels is written in bit numbers b50 to b48. When bit numbers b50 to b48 contain "000", this means a single channel (monaural); when bit numbers b50 to b48 contain "001", this means two channels (stereo); when bit numbers b50 to b48 contain "010", this means three channels; when bit numbers b50 to b48 contain "011", this means four channels; when bit numbers b50 to b48 contain "100", this means five channels; when bit numbers b50 to b48 contain "101", this means six channels; when bit numbers b50 to b48 contain "110", this means seven channels; and when bit numbers b50 to b48 contain "111", this means eight channels.

In the sub-picture stream attribute (VMGM_SPST_ATR) of the video manager menu (VMGM) in the table of FIG. 7, bit number b47 to bit number b40 are allocated to the sub-picture mode, reservation, sub-picture display type, and sub-picture type as shown in FIG. 12. When "000" is written in bit numbers b47, b46, b45 as the description of sub-picture coding mode, this means that the sub-picture data has been run-length compressed according to the 2 bits/pixel type standard; when "001" is written in bit numbers b47, b46, b45 as the description of sub-picture coding mode, this means that the sub-picture data has been run-length compressed according to other standards; and the other numbers are for reservation.

The sub-picture display type (VMGM_SPST_ATR) is written in bit numbers b44, b43, b42. If the aspect ratio is 3/4 ("00" in bit numbers b11 and b10) which is described in the VMGM_V_ATR and "000" is written in bit numbers b44, b43, b42 which is described in VMGM_SPST_ATR, this means that this attribution information (VMGM_SPST_ATR) is not utilized. If the aspect ratio is 9/16 ("11" in bit numbers b11 and b10) which is described in the VMGM_V_ATR and "001" is written in bit numbers b44, b43, b42 which is described in VMGM_SPST_ATR, this means that this sub-picture stream is permitted to be displayed at only a wide type representation. If the aspect ratio is 9/16 ("11" in bit numbers b11 and b10) which is described in the VMGM_V_ATR and "010" is written in bit numbers b44, b43, b42 which is described in VMGM_SPST_ATR, this means that this sub-picture stream is permitted to be displayed properly at only a letter box type representation. If the aspect ratio is 9/16 ("11" in bit numbers b11 and b10) which is described in the VMGM_V_ATR and "011" is written in bit numbers b44, b43, b42 which is described in VMGM_SPST_ATR, this means that this sub-picture stream is permitted to be displayed properly at both of the wide type and letter box type representations. If the aspect ratio is 9/16 ("11" in bit numbers b11 and b10) which is described in the VMGM_V_ATR and "100" is written in bit numbers b44, b43, b42 which is described in VMGM_SPST_ATR, this means that this sub-picture stream is permitted to be displayed properly at only a pan scan type representations. If the aspect ratio is 9/16 ("11" in bit numbers b11 and b10) which is described in the VMGM_V_ATR and "110" is written in bit numbers b44, b43, b42 which is described in VMGM_SPST_ATR, this means that this sub-picture stream is permitted to be displayed properly at both of the pan scan type and letter box type representations. If the aspect ratio is 9/16 ("11" in bit numbers b11 and b10) which is described in the VMGM_V_ATR and "111" is written in bit numbers b44, b43, b42 which is described in VMGM_V_ATR, this means that this sub-picture stream is permitted to be displayed properly at one of the pan scan type, wide type and letter box type representations. Furthermore, the sub-picture type is written in bit numbers b41, b40. When bit numbers b41, b40 contains "00", this means that the display type is not specified. The other numbers are for reservation.

Figures 13, 14, 15:
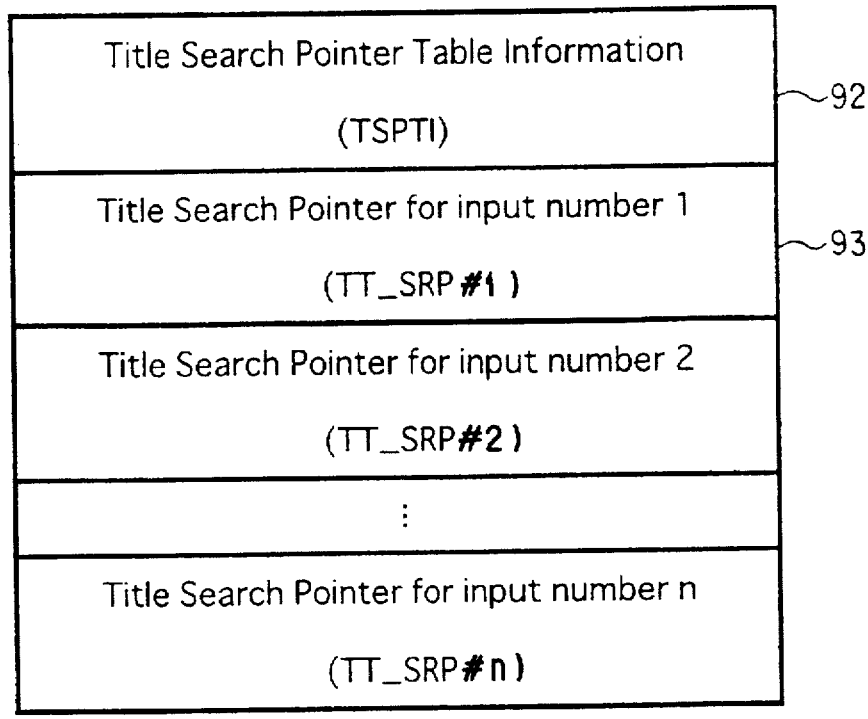
FIG. 13 shows the structure of the title search pointer table (TT_SRPT) in the video manger (VMGI) of FIG. 5.
FIG. 14 shows the parameters for title search pointer table information (TSPTI) in the title search pointer table (TT_SRPT) of FIG. 13 and the description thereof.
FIG. 15 shows the parameters for the title search pointers (TT_SRP) corresponding to the entry numbers of the title search pointer table (TT_SRPT) of FIG. 13 and the description thereof.

Explanation of the structure shown in FIG. 5 will be resumed. In the title search pointer table (TT_SRPT) 79 of FIG. 5, as shown in FIG. 13, the title search pointer table information (TSPTI) is first written and then as many title search pointers (TT_SRP) for input numbers 1 to n (n<=99) as are needed are written consecutively. When only the playback data for a single title such as, for example, the video data for a single title, is stored in a volume of the optical disk, only a single title search pointer (TT_SRP) 93 is written in the table (TT_SRPT) 79.

The title search pointer table information (TSPTI) 92 contains the number of entry program chains (EN_PGC_Ns) and the end address (TT_SRPT_EA) of the title search pointer (TT-SRP) 93 as shown in FIG. 14. The address (TT_SRPT_EA) is represented by the number of bytes, relative to the first byte in the title search pointer table (TT_SRPT) 79. Furthermore, as shown in FIG. 15, each title search pointer (TT_SRP) contains the video title set number (VTSN), the program chain number (PGCN), and the start address (VTS_SA) of the video title set 72.

The contents of the title search pointer (TT_SRP) 93 specifies a video title set to be reproduced and a program chain (PGC) as well as a location in which the video title set 72 is to be stored. The start address (VTS_SA) of the video title set 72 is represented by the number of logical blocks in connection with the title set specified by the video title set number (VTSN).

Here, a program chain 87 is defined as a set of programs 89 that reproduce the story of a title. In the case of a program chain for a menu, still picture programs or moving picture programs are reproduced one after another to complete a menu for a single title. In the case of a program chain for a title set, a program chain corresponds to a chapter in a story consisting of programs and the movie of a single title is completed by reproducing program chains consecutively. As shown in FIG. 16, each program 89 is defined as a set of aforementioned cells 84 arranged in the order in which they are to be reproduced.

As shown in FIG. 5, the video title set attribute table (VTS_ATRT) 80 describing the attribute information on the video title set (VTS) 72 contains video title set attribute table information (VTS_ATRTI) 66, n video title set attribute search pointers (VTS_ATR_SRP) 67, and n video title set attributes (VTS_ATR) 68, which are arranged in that order. The video title set attribute table information (VTS_ATRTI) 66 contains information on the table 80. In the video title set attribute search pointers (VTS_ATR_SRP) 67, description is made in the order corresponding to the title sets #1 to #n and similarly description is made of the pointers for searching for the video title set attributes (VTS_ATR) 68 written in the order corresponding to the title sets #1 to #n. In each of the video title set attributes (VTS_ATR) 68, the attribute of the corresponding title set (VTS) is written.

Figures 17, 18, 19, 20:
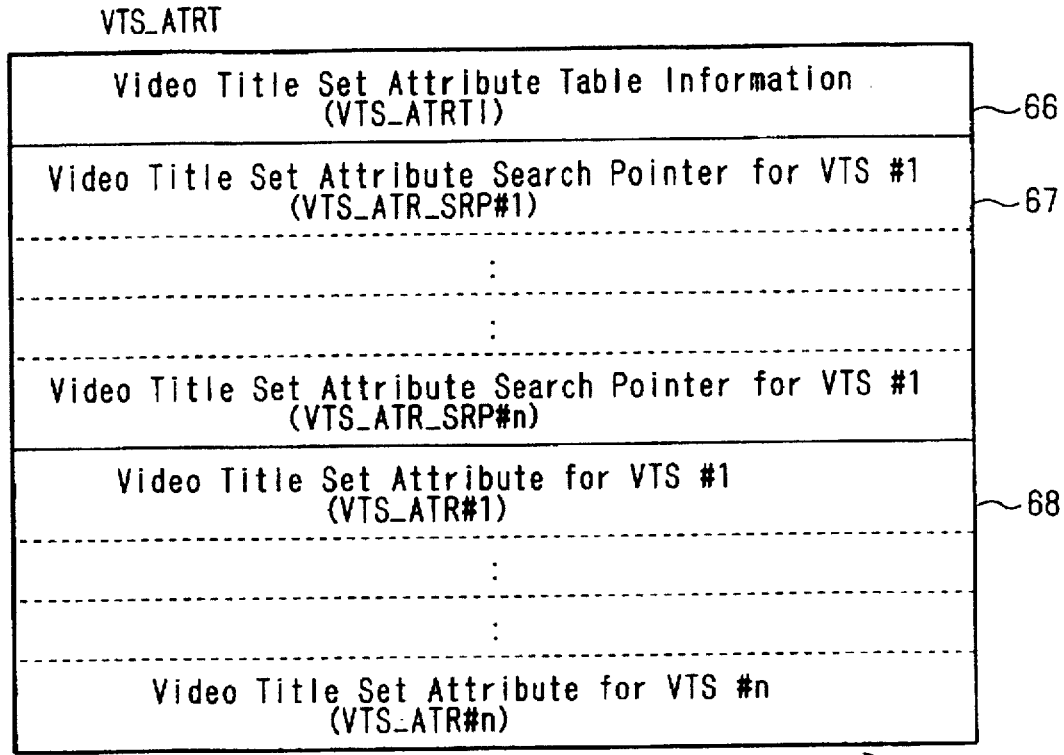
FIG. 17 shows the structure of the video title set attribute table (VTS_ATRT) in the video manager (VMGI) of FIG. 5.
FIG. 18 shows the parameters for video title set attribute table information (VTS_ATRTI) in the video title set attribute table (VTS_ATRT) of FIG. 17 and the description thereof.
FIG. 19 shows the parameters for video title set attribute search pointers (VTS_ATR_SRP) in the video title set attribute table (VTS_ATRT) of FIG. 17 and the description thereof.
FIG. 20 shows the parameters for video title set attributes (VTS_ATR) in the video title set attribute table (VTS_ATRT) of FIG. 17 and the description thereof.

More specifically, the video title set attribute information (VTS_ATRTI) 66 contains a parameter (VTS_Ns) for the number of video titles and a parameter (VTS_ATRT_EA) for the end address of the video title set attribute table (VTS_ART) 80 as shown in FIG. 18. As shown in FIG. 19, in each video title set attribute search pointer (VTS_ATR_SRP) 67, a parameter (VTS_ATR_SA) for the start address of the corresponding video title set attribute (VTS_ATR) 68 is written. As shown in FIG. 20, the video title set attribute (VTS_ATR) 68 contains a parameter (VTS_ATR_EA) for the end address of the video title set attribute (VTS_ATR) 68, a parameter (VTS_CAT) for the category of the corresponding video title set, and a parameter (VTS_ATRI) for attribute information on the corresponding video title set. Because the attribute information on the video title set contains the same contents of the attribute information on the video title set written in the video title set information management table (VTS_MAT), which will be explained later with reference to FIGS. 21 and 22, explanation of it will be omitted.

Now, the structure of the logic format of the video title set (VTS) 72 shown in FIG. 4 will be explained with reference to FIG. 21. In each video title set (VTS) 72, four items 94, 95, 96, 97 are written in the order shown in FIG. 21. Each video title set (VTS) 72 is made up of one or more video titles having common attributes. The video title set information (VTSI) contains the management information on the video titles 72, including information on playback of the video object set 96, information on playback of the title set menu (VTSM), and attribute information on the video object sets 72.

Each video title set (VTS) 72 includes the backup 97 of the video title set information (VTSI) 94. Between the video title set information (VTSI) 94 and the backup (VTSI_BUP) of the information, a video object set (VTSM_VOBS) 95 for video title set menus and a video object set (VTSTT_VOBS) 96 for video title set titles are arranged. Both of the video object sets (VTSM_VOBS and VTSTT_VOBS) have the structure shown in FIG. 6, as explained earlier.

The video title set information (VTSI) 94, the backup (VTSI_BUP) 97 of the information, and the video object set (VTSTT_VOBS) 96 for video title set titles are items indispensable to the video title sets 72. The video object set (VTSM_VOBS) 95 for video title set menus is an option provided as the need arises.

Figure 21:
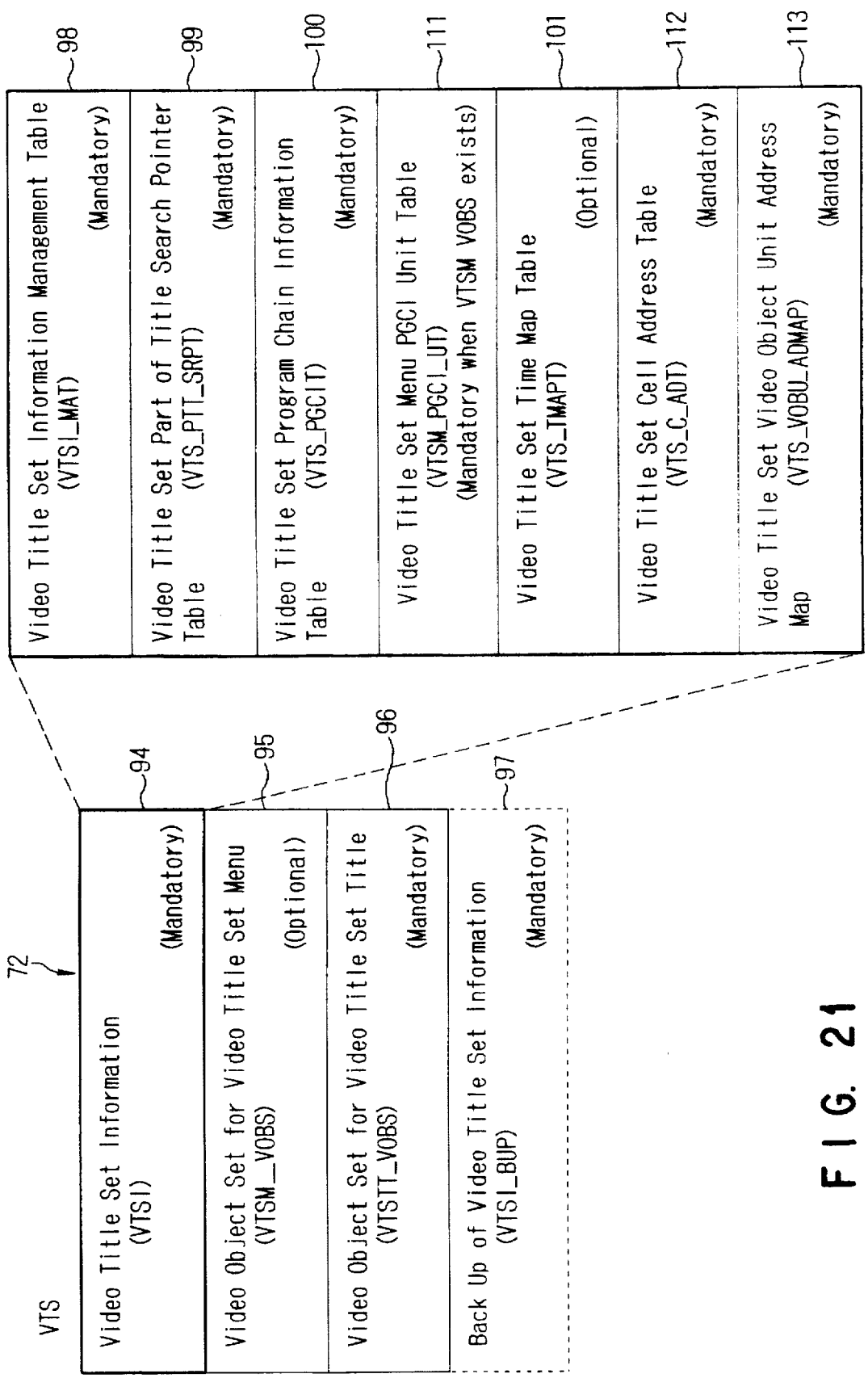
FIG. 21 shows the structure of the video title set of FIG. 4.

The video title set information (VTSI) 94 consists of seven tables 98, 99, 100, 101, 111, 112, 113 as shown in FIG. 21. These seven tables 98, 99, 100, 101, 111, 112, 113 are forced to align with the boundaries between logical sectors. The video title set information management table (VTSI_MAT) 98, a first table, is a mandatory table, in which the size of the video title set (VTS) 72, the start address of each piece of information in the video title set (VTS) 72, and the attributes of the video object sets (VOBS) 82 in the video title set (VTS) 72 are written.

The video title set part-of-title search pointer table (VTS_PTT_srpt), a second table, is mandatory table, in which part of the selectable video titles, that is, program chain (PGC) or programs (PG) contained in the selectable video title set 72, are written according to the number that the user has entered from the key/display section 4. Entering the desired one of the entry numbers listed in the pamphlet coming with the optical disk 10 from the key/display section 4, the user can watch the video, starting with the section in the story corresponding to the entered number.

The video title set program chain information table (VTS_PGCIT) 100, a third table, is a mandatory table, in which the VTS program chain information (VTS_PGCI), or information on VTS program chains, is written.

The video title set menu PGCI unit table (VTSM_PGCI_UT) 111, a fourth table, is a mandatory item, when the video object set (VTSM_VOBS) 95 for video title set menus is provided. In the table, information on program chains for reproducing the video title set menu (VTSM) provided for each language is written. By referring to the video title set menu PGCI unit table (VTSM_PGCI_UT) 111, a program chain for the specified language in the video object set (VTSM_VOBS) 95 can be acquired and reproduced as a menu.

The video title set time search map table (VTS_MAPT) 101, a fifth table, is an optional table provided as the need arises, in which information on the recording location of the video data in each program chain (PGC) in the title set 72 to which the map table (VTS_MAPT) belongs is written for a specific period of time of display.

The video title set cell address table (VTS_C_ADT) 112, a sixth table, is a mandatory item, in which the address of each cell 84 constituting all the video objects 83 or the address of each cell piece constituting cells are written in the order in which the identification numbers of the video objects are arranged. Here, a cell piece is a piece constituting a cell. Cells undergo an interleaving process in cell pieces and are arranged in a video object 83.

The video object title set video object unit address map (VTS_VOBU_ADMAP) 113, a seventh table, is a mandatory item, in which the start addresses of all the video object units 85 in the video title set are written in the order of arrangement.

Next, the video title information manager table (VTSI_MAT) 98 and video title set program chain information table (VTS_PGCIT) 100 shown in FIG. 21 will be described with reference to FIGS. 22 to 34.

FIG. 22 shows the contents of the video title information manager table (VTSI_MAT) 98, in which the video title set identifier (VTS_ID), the size (VTS_SZ) of the video title set 72, the version number (VERN) of the DVD video specification, the category (VTS_CAT) of the video title set 72, and the end address (VTSI_MAT_EA) of the video title information manager table (VTSI_MAT) 98 are written in that order. Furthermore, in the table (VTSI_MAT) 98, the start address (VTSM_VOBS_SA) of the video object set (VTSM_VOBS) 95 for the VTS menu (VTSM) and the start address (VTSTT_VOB_SA) of the video object for the title in the video title set (VTS) are written. If the video object set (VTSM_BOBS) 95 for the VTS menu (VTSM) is absent, "00000000h" will be written in the start address (VTSM_VOBS_SA). The end address (VTSI_MAT_EA) of VTSI_MAT is expressed by the number of logical bytes, relative to the first byte in the video title set information management table (VTI_MAT) 94. The start address (VTSTM_VOB_SA) of VTSM_VOBS and the start address (VTSTT_VOB_SA) of VTSTT_VOB are expressed by the number of logical blocks (RLBN) relative to the first logical block in the video title set (VTS) 72.

Furthermore, in the table (VTSI_MAT) 98, the start address (VTS_PTT_SRPT_SA) of the video title set information part-of-title search pointer table (VTS_PTT_SRPT) 99 is represented by the number of blocks, relative to the first logical blocks in the video title set information (VTSI) 94. Furthermore, in the table (VTSI_MAT) 98, the start address (VTS_PGCIT_SA) of the video title set program chain information table (VTS_PGCIT) 100 and the start address (VTS_PGCI_UT_SA) of the PGCI unit table (VTS_PGCI_UT) 111 of video title set menus represented by the number of blocks, relative to the first logical blocks in the video title set information (VTSI) 94, and the start address (VTS_MAPT_SA) of the time search map table (VTS_MAPT) 101 in the video title set (VTS) is represented by sectors, relative to the first logical sector in the video title set (VTS) 72. Similarly, the VTS address table (VTS_C_ADT) 112 and the address map (VTS_VOBU_ADMAP) 113 for VTS_VOBU are written in logical sectors, relative to the first logical sector in the video title set (VTS) 72.

Written in the table (VTSI_MAT) 98 are the video attribute (VTSM_V_ATR) of the video object set (VTSM_VOBS) 95 for the video title set menu (VTSM) in the video title set (VTS) 72, the number of audio streams (VTSM_AST_Ns), the attributes (VTSM_AST_ATR) of the audio streams, the number of sub-picture streams (VTSM_SPST_Ns), and the attributes (VTSM_SPST_ATR) of the sub-picture streams. Similarly, further written in the table (VTSI_MAT) 98 are the video attribute (VTS_V_ATR) of the video object set (VTSTT_VOBS) 96 for the video title set (VTSTT) for the video title set (VTS) in the video title set (VTS) 72, the number of audio streams (VTS_AST_Ns), the attributes (VTS_AST_ATR) of the audio streams, the number of sub-picture streams (VTS_SPST_Ns), and the attributes (VTS_SPST_ATR) of the sub-picture streams. Additionally, the attribute (VTS_MU_AST_ATR) of the multichannel audio stream in the video title set (VTS) is written in the table (VTSI_MAT) 98.

The video attribute, audio stream attribute, and sub-picture stream attribute written in FIG. 22 will be described in detail. In the video attribute (VTSM_V_ATR) of the video object set (VTSM_VOBS) 95 for VTSM and the video attribute (VTS_V_ATR) of the video object set (VTST_VOBS) 96 for the video title set title (VTSTT), the same attribute information as the video attribute (VMGM_V_ATR) of the video object (VMGN_VOBS) for the video manager menu already explained with reference to FIGS. 8, 9, 10A, and 10B is written. Specifically, in each of the video attributes (VTSM_V_ATR) and (VTS_V_ATR), as shown in FIG. 8, bit number b8 to bit number b15 are allocated to the compression mode, frame rate, display aspect ratio, and display mode, which are the video attributes of the video object set 76 for the video manager menu (VMGM), and bit number b0 to bit number b7 are left empty for reservation for later use. When "00" is written in bit numbers b15, b14, this means the menu video data has been compressed in the video compression mode on the basis of the MPEG-1 standard; and when "01" is written in bit numbers b15, b14, this means the menu video data has been compressed in the video compression mode on the basis of the MPEG-2 standard. The other numbers are reserved for later use. When "00" is written in bit numbers b13, b12, this means that the menu video data has a frame rate of 29.27/s at which 29.27 frames are reproduced every second. Specifically, when "00" is written in bit numbers b13, b12, this means that the menu video data is TV-system video data according to the NTSC scheme and has a frame rate at which a single frame is drawn at a horizontal frequency of 60 Hz using 525 scanning lines. When "01" is written in bit numbers b13, b12, this means that the menu video data has a frame rate of 25/s at which 25 frames are reproduced every second. Specifically, this means that the menu video data is TV-system video data according to the PAL scheme and has a frame rate at which a single frame is drawn at a frequency of 50 Hz using 625 scanning lines. The other numerals in bit numbers b13, b15 are reserved for later use.

Furthermore, when "00" is written in bit numbers b11, b10, this means that the menu video data has a display aspect ratio (ratio of height to width) of 3/4; and when "11" is written in bit numbers b11, b10, this means that the menu video data has a display aspect ratio (ratio of height to width) of 9/16. The other numbers are for reservation for later use.

Furthermore, when the display aspect ratio is 3/4, that is, when "00" is written in bit numbers b11, b10, "11" is written in bit numbers b9, b8. When the display aspect ratio is 9/16, that is, when "11" is written in bit numbers b11, b10, whether the displaying of the menu video data in pan scan and/or letter box is permitted is written. Specifically, when "00" is written in bit numbers b9, b8, this means that the displaying in either of pan scan and letter box is permitted;

when "01" is written in bit numbers b9, b8, this means that the displaying in pan scan is permitted, but the displaying in letter box is inhibited; and when "10" is written in bit numbers b9, b8, this means that the displaying in pan scan is inhibited, but the displaying in letter box is permitted. When "11" is written in bit numbers b9, b8, this means that the displaying is not particularly specified. The relationship between the video data recorded on the aforesaid optical disk and the reproduced screen image on the TV monitor 6 is the same as that explained with reference to FIGS. 9, 10A, and 10B, and its explanation will be omitted.

Furthermore, in the audio stream attribute (VTSM_AST_ATR) of the video object set (VTSM_VOBS) 95 for VTSM and the audio stream attribute (VTS_AST_ATR) of the video object set (VTST_VOBS) 96 for the video title set title (VTSTT), almost the same attribute information as the audio stream attribute (VMGM_AST_ATR) of the video object (VMGM_VOBS) for the video manager menu already explained with reference to FIG. 11 is written. Specifically, in the attribute (VTSM_AST_ATR) of the audio stream in the VTS menu video object set (VTSM_VOBS) 95, as shown in FIG. 23, bit number b63 to bit number b48 are allocated to the audio coding mode, reservation, audio type, audio application ID, quantization, sampling frequency, reservation, and the number of audio channels and bit number b47 to bit number b0 are left empty and reserved for later use. In the attribute (VTS_AST_ATR) for the audio stream for the video title set title (VTST), as shown in FIG. 23, bit number b63 to bit number b48 are allocated to the audio coding mode, expansion of multichannel, audio type, audio application ID, quantization, sampling frequency, and the number of audio channels and bit number b47 to bit number b40; bit number b39 to bit number b32 are allocated to specific codes; bit number b31 to bit number b24 are for reservation for specific codes; bit number b23 to bit number b8 are left empty for reservation for later use; and bit number b8 to b0 are allocated to application information. Here, if the VTS menu video object set (VTSM_VOBS) 95 is absent, or if an audio stream is absent in the video object set, "0" will be written in each bit, starting at bit number b63 down to bit number b0.

In both of the attributes (VTSM_AST_ATR, VTS_AST_ATR) of the audio streams for VTSM and VTST, bit numbers b63, b62, b61 are allocated to the audio coding mode. When "000" is written for the audio coding mode, this means that the audio data has been coded according to Dolby AC-3 (a trademark of Dolby Laboratories Licensing Corporation). When "010" is written for the audio coding mode, this means that the audio data is compressed without any expanded bit stream under MPEG-1 or MPEG-2. When "011" is written for the audio coding mode, this means that the audio data is compressed with an expanded bit stream under MPEG-2. When "100" is written for the audio coding mode, this means that the audio data is coded by linear PCM. For the audio data, the other numbers are for reservation for later use. At a frame rate ("00" is written in bit numbers b13, b12 in VTSM_V_ATR and VTS_V_ATR) at which a single frame is drawn at a horizontal frequency of 60 Hz using 525 scanning lines, in the video data attribute, Dolby AC-3 ("000" in bit numbers b63, b62, b61) or linear PCM ("100" in bit numbers b63, b62, b61) is to be set. At a frame rate ("01" is written in bit numbers b13, b12 in VTSM_V_ATR and VTS_V_ATR) at which a single frame is drawn at a horizontal frequency of 50 Hz using 625 scanning lines, in the video data attribute, MPEG-1 or MPEG-2 ("010" or "011" in bit numbers b63, b62, b61) or linear PCM ("100" in bit numbers b63, b62, b61) is to be set. In the audio coding mode of the VTST audio stream attribute (VTS_AST_ATR), expansion of multichannel is written in bit number b60. When bit number b60 contains "0", this means that the multichannel audio stream attribute (VTS_MU_AST_ATR) of VTS related to audio streams is invalid. When bit number b60 contains "1", this means linking to the multichannel audio stream attribute (VTS_MU_AST_ATR) of VTS related to audio streams.

The audio type is written in bit numbers b59 and b58. When the audio type is not specified, "00" will be written in these bit numbers. When a language, or speech, is specified, "01" will be written in these bit numbers. The other numbers are for reservation. The ID of an audio application field is written in bit numbers b57 and b56. When the ID is not specified, "00" will be written in these bit numbers; when karaoke is specified, "01" is written in these bit numbers; when surround is specified, "10" is written in these bit numbers; and the other numbers are for reservation. The quantization of audio data is written in bit numbers b55 and b54. When bit numbers b55, b54 contain "00", this means the audio data quantized in 16 bits; when bit numbers b55, b54 contain "01", this means the audio data quantized in 20 bits; when bit numbers b55, b54 contain "10", this means the audio data quantized in 24 bits; and when bit numbers b55, b54 contain "11", this means that the quantization is not specified. Here, when the audio coding mode is set to linear PCM ("100" in bit numbers b63, b67, b61), no specification of quantization ("11" in bit numbers b55, b54) is written. The audio data sampling frequency Fs is written in bit numbers b53 and b52. When the sampling frequency Fs is 48 kHz, "00" is written in these bit numbers; when the sampling frequency Fs is 96 kHz, "01" is written in these bit numbers; and the other numbers are for reservation.

The number of audio channels is written in bit numbers b66 to b64. When bit numbers b50 to b48 contain "000", this means a single channel (monaural); when bit numbers b50 to b48 contain "001", this means two channels (stereo); when bit numbers b50 to b48 contain "010", this means three channels; when bit numbers b50 to b48 contain "011", this means four channels; when bit numbers b50 to b48 contain "100", this means five channels; when bit numbers b66 to b64 contain "101", this means six channels; when bit numbers b66 to b64 contain "110", this means seven channels; and when bit numbers b50 to b48 contain "111", this means eight channels. Here, three or more channels are determined to be multichannel. Specific codes are to be written in b47 to b40 and b39 to b32. When the type of audio stream is language, or speech, the code for the language determined in ISO-639 is written in these bit locations in the form of a language symbol. When the type of audio stream is not language or speech, the locations are for reservation.

The number (VTS_AST_Ns) of VTS audio streams is set in the range of 0 to 8. Thus, eight VTS audio stream attributes (VTS_AST_ATR) are prepared in accordance with the number of streams that can be set. Specifically, areas for the VTS audio stream attributes (VTS_AST_Ns) of VTS audio stream #0 to VTS audio stream #7 are provided. When the number of VTS audio streams is less than 8 and some attributes have no corresponding audio streams, the VTS audio stream attributes (VTS_AST_Ns) corresponding to the absent audio streams shown in FIG. 22 have "0" in all bits.

Furthermore, in the sub-picture stream attribute (VTSM_SPST_ATR) of the video object set (VTSM_VOBS) 95 for VTSM and the sub-picture stream attribute (VTS_SPST_ATR) of the video object set (VTSTT_VOBS) 96 for the video title set title (VTSTT), the same attribute information as the sub-picture stream attribute (VMGM_SPST_ATR) of the video manager menu video object (VMGM_VOBS) already explained referring to FIG. 11 is written. Specifically, in the sub-picture stream attribute (VTSM_SPST_ATR) of the video object set (VTSM_VOBS) 95 for VTSM, bit number b47 to bit number b40 are allocated to the sub-picture coding mode, sub-picture display type, and sub-picture type as shown in FIG. 12 and bit number b39 to bit number b0 are for reservation. In the sub-picture stream attribute (VTS_SPST_ATR) of the video object set (VTS_VOBS) 96 for VTSTT, as shown in FIG. 12, bit number b47 to bit number b40 are allocated to the sub-picture coding mode, sub-picture display type, and sub-picture type; bit number b39 to bit number b32 and bit number 31 to bit number b24 are allocated to specific codes; bit number b23 to bit number b16 are for reservation for specific codes; bit number b15 to bit number b8 are allocated to expansion of specific codes; and bit number b7 to bit number b0 are for reservation.

When "000" is written in bit numbers b47, b46, b45 as the description of sub-picture coding mode, this means that the sub-picture data has been run-length compressed according to the 2 bits/pixel type standard; when "001" is written in bit numbers b47, b46, b45 as the description of sub-picture coding mode, this means that the sup-picture data has been run-length compressed according to other standards; and the other numbers are for reservation. A symbol for a Row coding scheme, meaning uncompressed sub-picture data, may be written for reservation.

The sub-picture display type (VTSM_SPST_ATR, VTS_SPST_ATR) is written in bit numbers b44, b43, b42. If the aspect ratio is 3/4 ("00" in bit numbers b11 and b10) which is described in the VTSM_V_ATR or VTS_V_ATR and "000" is written in bit numbers b44, b43, b42 which is described in VTSM_SPST_ATR, VTS_SPST_ATR, this means that this attribution information (VTSM_SPST_ATR, VTS_SPST_ATR) is not utilized. If the aspect ratio is 9/16 ("11" in bit numbers b11 and b10) which is described in the VTSM_V_ATR or VTS_V_ATR and "001" is written in bit numbers b44, b43, b42 which is described in VTSM_SPST_ATR, VTS_SPST_ATR, this means that this sub-picture stream is permitted to be displayed at only a wide type representation. If the aspect ratio is 9/16 ("11" in bit numbers b11 and b10) which is described in the VTSM_V_ATR or VTS_V_ATR and "010" is written in bit numbers b44, b43, b42 which is described in VTSM_SPST_ATR, VTS_SPST_ATR, this means that this sub-picture stream is permitted to be displayed properly at only a letter box type representation. If the aspect ratio is 9/16 ("11" in bit numbers b11 and b10) which is described in the VTSM_V_ATR or VTS_V_ATR and "011" is written in bit numbers b44, b43, b42 which is described in VTSM_SPST_ATR, VTS_SPST_ATR, this means that this sub-picture stream is permitted to be displayed properly at both of the wide type and letter box type representations. If the aspect ratio is 9/16 ("11" in bit numbers b11 and b10) which is described in the VTSM_V_ATR or VTS_V_ATR and "100" is written in bit numbers b44, b43, b42 which is described in VTSM_SPST_ATR, VTS_SPST_ATR, this means that this sub-picture stream is permitted to be displayed properly at only a pan scan type representation. If the aspect ratio is 9/16 ("11" in bit numbers b11 and b10) which is described in the VTSM_V_ATR or VTS_V_ATR and "110" is written in bit numbers b44, b43, b42 which is described in VTSM_SPST_ATR, VTS_SPST_ATR, this means that this sub-picture stream is permitted to be displayed properly at both of the pan scan type and letter box type representations. If the aspect ratio is 9/16 ("11" in bit numbers b11 and b10) which is described in the VTSM_V_ATR or VTS_V_ATR and "111" is written in bit numbers b44, b43, b42 which is described in VTSM_SPST_ATR, VTS_SPST_ATR, this means that this sub-picture stream is permitted to be displayed properly at one of the pan scan type, wide type and letter box type representations. Furthermore, the sub-picture type is written in bit numbers b41, b40. When bit numbers b41, b40 contain "00", this means that the display type is not specified; when bit numbers b41, b40 contain "01", this means language, or subtitles; and the other numbers in bit numbers b41, b40 are reserved for items such as a pattern.

Specific codes are to be written in b39 to b32 and b31 to b24. When the type of sub-picture stream is language, or subtitles, the code for the language determined in ISO-639 is written in these bit locations in the form of a language symbol. When the type of sub-picture stream is not language, the locations are for reservation. In addition, in expansion of specific codes in bit number b15 to bit number b8, the type of characters for subtitles is written. When bit number b15 to bit number b8 contain "00h", this means that the sub-picture stream has no normal characters or no normal category; when bit number b15 to bit number b8 contain "01h", this means large characters; and the other numbers are for system reservation or are determined by the video supplier.

The number (VTSM_SPST_Ns) of sub-pictures for the VTS menu is basically one, but can be set in the range of 0 to 3. In this case, the attributes (VTSM_SPST_ATR) of the sub-picture for the VTS menu are written in ascending order, starting at sub-picture stream number #0 to stream number #31, each having the description as shown in FIG. 12. When the number of sub-picture streams (VTS_SPST_Ns) is less than 32 and some attributes have no corresponding audio streams, the VTS sub-picture attributes (VTS_AST_Ns) corresponding to the absent VTS sub-picture streams have "0" in all bits.

In the attribute (VTS_MU_AST_ATR) of the multi-channel audio stream of the video title set (VTS), the attributes of multichannel audio stream #0 to multichannel audio stream #7 are written. in each multichannel audio stream attribute (VTS_MU_AST_ATR), the contents (e.g., karaoke or surround) of the audio channel, an audio mixing scheme, etc., are written.

Figure 24:
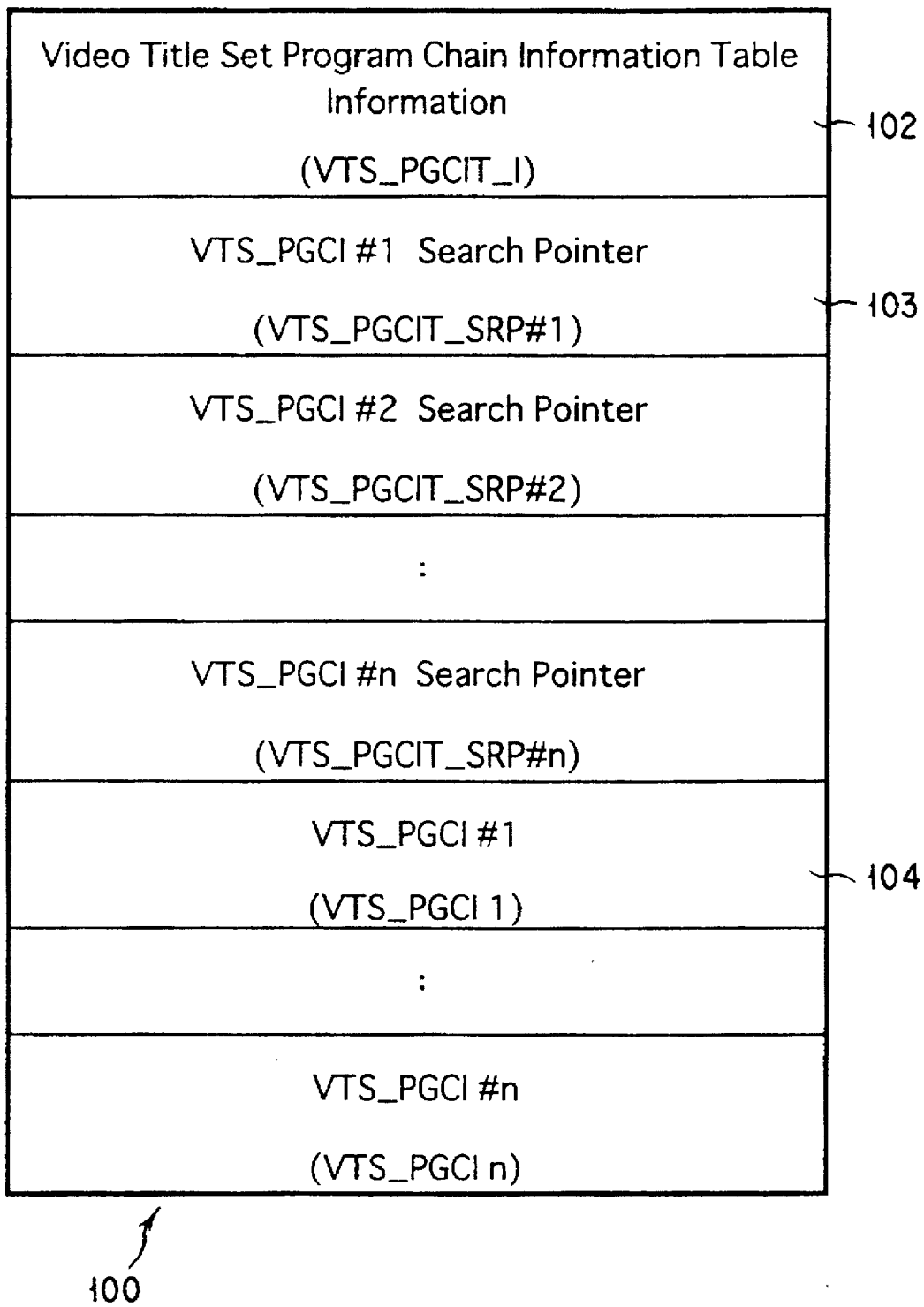
FIG. 24 shows the structure of the video title set program chain information table (VTS_PGCIT) of FIG. 21.

The VTS program chain information table (VTS_PGCIT) 100 of FIG. 21 has a structure as shown in FIG. 24. In the information table (VTS_PGCIT) 100, information on the VTS program chains (VTS_PGC) is written, the first item of which is information (VTS_PGCIT_I) 102 on the information table (VTS_PGCIT) 100 of VTS program chains (VTS_PGC). In the information table (VTS_PGCIT) 100, the information (VTS_PGCIT_I) 102 is followed by as many VTS_PGCI search pointers (VTS_PGCIT_SRP) used to search for VTS program chains (VTS_PGC) as the number (from #1 to #n) of VTS program chains in the information table (VTS_PGCIT) 100. At the end of the table, there are provided as many pieces of information (VTS_PGCI) 104 on the respective VTS program chains (VTS_PGC) as the number (from #1 to #n) of VTS program chains (VTS_PGC).

Figures 25, 26, 27:
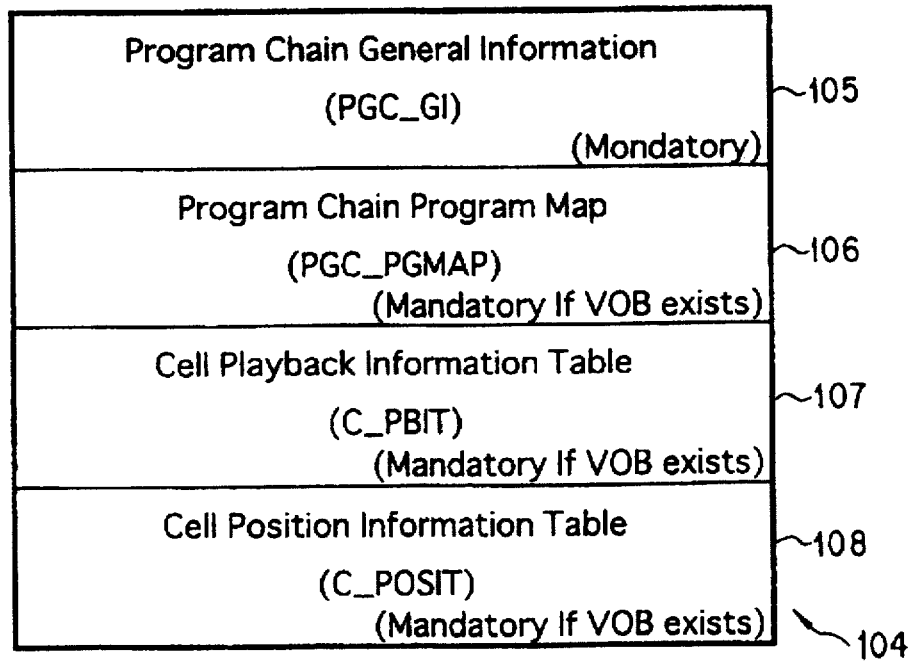
FIG. 25 shows the parameters for pieces of information (VTS_PGCIT_I) in the video title set program chain information table (VTS_PGCIT) of FIG. 21 and the description thereof.
FIG. 26 shows the parameters for search pointers (VTS_PGCIT_SRP) of the video title set program chain information table (VTS_PGCIT) of FIG. 24 and the description thereof.
FIG. 27 shows the structure of the program chain information (VTS_PGCI) for the video title set corresponding to a program chain in the video title set program chain information table (VTS_PGCIT) of FIG. 24.

The information (VTS_PGCIT_I) 102 in the VTS program chain information table (VTS_PGCIT), as shown in FIG. 25, contains the number (VTS_PGC_Ns) of VTS program chains (VTS_PGC) and the end address (VTS_

PGCIT_EA) of the table information (VTS_PGCIT_I) expressed by the number of bytes, relative to the first byte of the information table (VTS_PGCIT) 100.

Furthermore, as shown in FIG. 26, the VTS_PGCIT search pointer (VTS_PGCIT_SRP) 103 contains the attributes (VTS_PGC_CAT) 72 of the program chains (VTS_PGC) in the video title set (VTS) and the start address (VTS_PGCI_SA) of the VTS_PGC information (VTS_PGCI) expressed by the number of bytes, relative to the first byte of the VTS_PGC information table (VTS_PGCIT) 100. Here, the VTS_PGC attribute (VTS_PGC_CAT) contains, for example, an attribute indicating whether an entry program chain (Entry PGC) is the first one to be reproduced. Usually, an entry program chain (PGC) is written before program chains (PGC) that are not entry program chains (PGC).

The PGC information (VTS_PGCI) 104 in the video title set contains four items as shown in FIG. 27. In the PGC information (VTS_PGCI) 104, program chain general information (PGC_GI) 105, a mandatory item, is first arranged, followed by at least three items that are made mandatory only when there is an video object. Specifically, contained as the three items in the PGC information (VTS_PGCI) 104 are a program chain program map (PGC_PGMAP) 106, a cell playback information table (C_PBIT) 107, and a cell position information table (C_POSIT) 108.

As shown in FIG. 28, the program chain general information (PGC_GI) 105 contains the category (PGCI_CAT) of program chains, the contents (PGC_CNT) of program chains (PGC), and the playback time (PGC_PB_TIME) of program chains (PGC). Written in the category (PGCI_CAT) of PGC are whether the PGC can be copied or not and whether the programs in the PGC are played back continuously or at random. The contents (PGC_CNT) of PGC contain the description of the program chain structure, that is, the number of programs, the number of cells, etc. The playback time (PGC_PB_TIME) of PGC contains the total playback time of the programs in the PGC. The playback time is the time required to continuously play back the programs in the PGC, regardless of the playback procedure.

Furthermore, the program chain general information (PGC_GI) 105 contains PGC sub-picture stream control (PGC_SPST_CTL), PGC audio stream control (PGC_AST_CTL), and PGC sub-picture pallet (PGC_SP_PLT). The PGC sub-picture stream control (PGC_SPST_CTL) contains the number of sub-pictures usable in the PGC. The PGC audio stream control (PGC_AST_CTL) likewise contains the number of audio streams usable in the PGC. The PGC sub-picture pallet (PGC_SP_PLT) contains a set of a specific number of color pallets used in all of the sub-picture streams in the PGC.

Furthermore, the PGC general information (PGC_GI) contains the start address (PGC_PGMAP_SA_SA) of the PGC program map (PGC_PGMAP_SA), the start address (C_PBIT_SA) of the cell playback information table (C_PBIT) 107 and the start address (C_POSIT_SA) of the cell position information table (C_POSIT) 108. Both of the start addresses (C_PBIT_SA and C_POSIT_SA) are represented by the number of bytes, relative to the first byte in the VTS_PGC information (VTS_PGCI).

The program chain program map (PGC_PGMAP) 106 is a map showing the arrangement of the programs in the PGC of FIG. 29. In the map (PGC_PGMAP) 106, the entry cell numbers (ECELLN), the start cell numbers of the individual programs, are written in ascending order as shown in FIGS. 29 and 30. In addition, program numbers are allocated, starting at 1, in the order in which the entry cell numbers are written. Consequently, the first entry number in the map (PGC_PGMAP) 106 must be #1.

The cell playback information table (C_PBIT) 107 defines the order in which the cells in the PGC are played back. In the cell playback information table (C_PBIT) 107, pieces of the cell playback information (C_PBIT) are written consecutively as shown in FIG. 31. Basically, cells are played back in the order of cell number. The cell playback information (C_PBIT) contains a cell category (C_CAT) as playback information (P_PBI) as shown in FIG. 32. Written in the cell category (C_CAT) are a cell block mode indicating whether the cell is one in the block and if it is, whether the cell is the first one, a cell block type indicating whether the cell is not part of the block or is one in an angle block, and an STC discontinuity flag indicating whether the system time clock (STC) must be set again. Here, a cell block is defined as a set of cells with a specific angle. The change of the angle is realized by changing the cell block. Taking baseball as example, the changing from an angle block of shooting scenes from the infield to an angle block of shooting scenes from the outfield corresponds to the change of the angle.

Further written in the cell category (C_CAT) are a cell playback mode indicating whether the contents of the cell is played back continuously or made still at one video object unit (VOBU) to another in the cell, and cell navigation control indicating whether the picture is made still after the playback of the cell or indicating the rest time.

As shown in FIG. 32, the playback information (P_PBI) of the cell playback information table (C_PBIT) 107 contains the cell playback time (C_PBTM) representing the total playback time of the PGC. When the PGC has an angle cell block, the playback time of the angle cell number 1 represents the playback time of the angle block. Further written in the cell playback information table (C_PBIT) 107 are the start address (C_FVOBU_SA) of the first video object unit (VOBU) 85 in the cell expressed by the number of logical sectors, relative to the first logical sector in the video object unit (VOBU) 85 in which the cell is recorded and the start address (C_LVOBU_SA) of the end video object unit (VOBU) 85 in the cell expressed by the number of logical sectors, relative to the first logical sector in the video object unit (VOBU) in which the cell is recorded.

The cell position information table (C_POSI) 108 specifies the identification numbers (VOB_ID) of the video objects (VOB) in the cell used in the PGC and the cell identification number (C_ID). In the cell position information table (C_POSI), pieces of cell position information (C_POSI) corresponding to the cell numbers written in the cell playback information table (C_PBIT) 107 as shown in FIG. 33 are written in the same order as in the cell playback information table (C_PBIT). The cell position information (C_POSI) contains the identification numbers (C_VOB_IDN) of the video object units (VOBS) in the cell and the cell identification number (C_IDN) as shown in FIG. 34.

As explained with reference to FIG. 6, a cell 84 is a set of video object units (VOBU) 85. A video object unit (VOBU) 85 is defined as a pack train starting with a navigation (NV) pack 86. Therefore, the start address (C_FVOBU_SA) of the first video object unit (VOBU) 85 in a cell 84 is the start address of the NV pack 86. As shown in FIG. 35, the NV pack consists of a pack header 110, a system header 111, and two packets of navigation data—a presentation control information (PCI) packet 116 and a data search information (DSI) packet 117. As many bytes as shown in FIG. 35 are allocated to the respective sections so that one pack may contain 2048 bytes corresponding to one logical sector. The NV pack is placed immediately in front of the video pack containing the first data item in the group of pictures (GOP). Even when the object unit 85 contains no video pack, an NV pack is placed at the head of the object unit containing audio packs or/and sub-picture packs. As with an object unit containing object units, even with an object unit containing no video pack, the playback time of the object unit is determined on the basis of the unit in which video is reproduced.

Here, GOP is determined in the MPEG standard and is defined as a data train constituting a plurality of screens as explained earlier. Specifically, GOP corresponds to compressed data. Expanding the compressed data enables the reproduction of a plurality of frames of image data to reproduce moving pictures. The pack header 110 and system header 111 are defined in the MPEG 2 system layer. The pack header 110 contains a pack start code, a system clock reference (SCR), and a multiplex rate. The system header 111 contains a bit rate and a stream ID. The packet header 112, 114 of each of the PCI packet 116 and DSI packet 117 contains a packet start code, a packet length, and a stream ID as determined in the MPEG2 system layer.

As shown in FIG. 36, another video, audio, or sub-picture pack 88, 90, 91 consists of a pack header 120, packet header 121, and a packet 122 containing the corresponding data as determined in the MPEG2 system layer. Its pack length is determined to be 2048 bytes. Each of these packs is aligned with the boundaries between logical blocks.

The PCI data (PCI) 113 in the PCI packet 116 is navigation data used to make a presentation, or to change the contents of the display, in synchronization with the playback of the video data in the VOB unit (VOBU) 85. Specifically, as shown in FIG. 37, the PCI data (PCI) 113 contains PCI general information (PCI_GI) as information on the entire PCI and angle information (NSMLS_ANGLI) as each piece of jump destination angle information in angle change. The PCI general information (PCI_GI) contains the address (NV_PCK_LBN) of the NV pack (NV_PCK) 86 in which the PCI 113 is recorded as shown in FIG. 38, the address being expressed in the number of blocks, relative to the logical sector of VOBU 85 in which the PCI 113 is recorded. The PCI general information (PCI_GI) contains the category (VOBU_CAT) of VOBU 85, the start playback time (VOBU_S_PTM) of VOBU, and the end playback time (VOBU_EPTM) of VOBU. Here, the start PTS (VOBU_SPTS) of VOBU 85 indicates the playback start time (start presentation time) of the video data in the VOBU 85 containing the PCI 113. The playback start time is the first playback start time in the VOBU 85. Normally, the first picture corresponds to I picture (intra-picture) data in the MPEG standard. The end PTS (VOBU_EPTS) in the VOBU 85 indicates the playback end time (end presentation time) of the VOBU 85 containing the PCI 113.

DSI data (DSI) 115 in the DSI packet 117 shown in FIG. 35 is navigation data used to search for the VOB unit (VOBU) 85. The DSI data (DSI) 115 contains DSI general information (DSI_GI), seamless information (SML_PBI), angle information (SML_AGLI), address information (NV_PCK_ADI) on a navigation pack, and synchronizing playback information (SYNCI).

The DSI information (DSI_GI) contains information about the entire DSI 115. Specifically, as shown in FIG. 40, the DSI general information (DSI_GI) contains the system clock reference (NV_PCK_SCR) for the NV pack 86. The system clock reference (NV_PCK_SCR) is stored in the system time clock (STC) built in each section of FIG. 1. On the basis of the STC, video, audio, and sub-picture packs are decoded at the video, audio, and sub-picture decoders 58, 60, and 62 and the monitor 6 and the speaker 8 reproduce images and sound, respectively. The DSI general information (DSI_GI) contains the start address (NV_PCK_LBN) of the NV pack (NV_PCK) 86 containing the DSI 115 expressed by the number of logical sectors (RLSN), relative to the first logical sector in the VOB set (VOBS) 82 containing the DSI 115, and the address (VOBU_EA) of the last pack in the VOB unit (VOBU) 85 containing the DSI 115 expressed by the number of logical sectors (RLSN), relative to the first logical sector in the VOB unit (VOBU).

Furthermore, the DSI general information (DSI_GI) contains the end address (VOBU_IP_EA) of the V pack (V_PCK) 88 containing the last address of the first I picture in the VOBU expressed by the number of logical sectors (RLSN), relative to the first logical sector in the VOB unit (VOBU) containing the DSI 115, and the identification number (VOBU_IP_IDN) of the VOBU 83 containing the DSI 115 and the identification number (VOBU_C_IDN) of the cell in which the DSI 115 is recorded.

The navigation pack address information of DSI contains the addresses of a specified number of navigation packs. Video fast-forward etc. are effected, referring to the addresses. The synchronizing information (SYNCI) includes address information on the sub-pictures and audio data reproduced in synchronization with the playback start time of the video data in the VOB unit (VOBU) containing DSI 115. Specifically, as shown in FIG. 41, the start address (A_SYNCA) of the target audio pack (A_PCK) 91 is expressed by the number of logical sectors (RLSN), relative to the NV pack (NV_PCK) 86 in which DSI 115 is recorded. When there are more than one audio stream (8 audio streams maximum), as many pieces of synchronizing information (SYNCI) as there are audio streams are written. Furthermore, the synchronizing information (SYNCI) includes the address (SP_SYNCA) of the NV pack (NV_PCK) 86 of the VOB unit (VOBU) 85 containing the target audio pack (SP_PCK) 91, the address being expressed by the number of logical sectors (RLSN), relative to the NV pack (NV_PCK) 86 in which DSI 115 is recorded. When there are more than one sub-picture stream (32 sub-picture streams maximum), as many pieces of synchronizing information (SYNCI) as there are sub-picture streams are written.

Explained next will be the circuit configuration that enables the video decoder section 58, audio decoder section 60, sub-picture section 62, and D/A and reproducing section 64 to be set properly according to the above-described video data attributes (VMG_V_ATR, VTSM_V_ATR, VTS_V_ATR), audio data attributes (VMGM_AST_ATR, VTSM_AST_ATR, VTS_AST_ATR), and sub-picture data attributes (VMGM_SPST_ATR, VTSM_SPST_ATR, VTS_SPST_ATR).

The video decoder section 58 comprises a register 58A, a selector 58B, an MPEG1 decoder 58C, and an MPEG2 decoder 58D as shown in FIG. 42. In the circuit of FIG. 42, the control signal corresponding to the video data attributes (VMGM_V_ATR, VTSM_V_ATR, VTS_V_ATR) supplied from the system CPU section 50 via the system processor section 54 is held in the register 58A, which supplies the output to the selector 58B. According to the output from the register 58A, the selector 58B selectively outputs the video data supplied from the system processor section 54 to either the MPEG1 decoder 58C or the MPEG2 decoder 58D. When the MPEG1 decoder 58C has been selected, the video data from the selector 58B is supplied to the MPEG1 decoder 58C, and the video data is decoded by the MPEG1 coding scheme. When the MPEG2 decoder 58D has been selected, the video data from the selector 58B is supplied to the MPEG2 decoder 58D, and the video data is decoded at the MPEG2 decoder 58D by the MPEG2 coding scheme. The decoder output from either the MPEG1 decoder 58C or the MPEG2 decoder 58D is supplied to a video reproducing section 201, which will be explained later, in the D/A converter and reproducing section 64 as the decoder output of the video decoder section 58.

The audio decoder section 60 comprises a register 60A, a selector 60B, an MPEG1 decoder 60C, an AC3 decoder 60D, and a PCM decoder 60E as shown in FIG. 43. In the circuit of FIG. 43, the control signal corresponding to the audio data attributes (VMGM_AST_ATR, VTSM_AST_ATR, VTS_AST_ATR) supplied from the system CPU section 50 via the system processor section 54 is held in the register 60A, which supplies the output to the selector 60B. According to the output from the register 68A, the selector 60B selectively outputs the audio data supplied from the system processor section 54 to either the MPEG1 decoder 60C, the AC3 decoder 60D, or the PCM decoder 60E. When the MPEG1 decoder 60C has been selected, the audio data from the selector 60B is decoded at the MPEG1 decoder 60C by the MPEG1 coding scheme. When the AC3 decoder 60D has been selected, the audio data from the selector 60B is decoded at the AC3 decoder 60D by the AC3 coding scheme. When the PCM decoder 60E has been selected, the digital audio data from the selector 60B is decoded at the PCM decoder 60E into analog audio data. The decoder output from either the MPEG1 decoder 60C, AC3 decoder 60D or PCM decoder 60E is supplied to an audio reproducing section 202, which will be explained later, in the D/A and reproducing section 64 as the decoder output of the audio decoder section 60.

Figure 44:
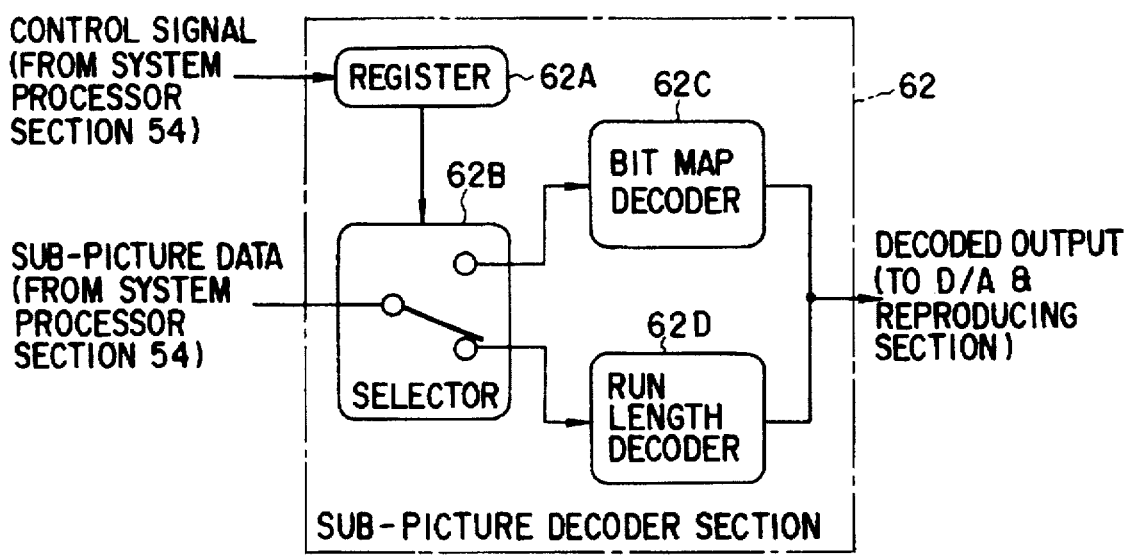
FIG. 44 is a block diagram of the sub-picture decoder section of FIG. 1.

The sub-picture decoder section 62 comprises a register 62A, a selector 62B, a bit map decoder 62C, and a run-length decoder 62D as shown in FIG. 44. In the circuit of FIG. 44, the control signal corresponding to the sub-picture data attributes (VMGM_SPST_ATR, VTSM_SPST_ATR, VTS_SPST_ATR) supplied from the system CPU section 50 via the system processor section 54 is held in the register 62A, which supplies the output to the selector 62B. According to the output from the register 62A, the selector 62B selectively outputs the sub-picture data supplied from the system processor section 54 to either the bit map decoder 62C or the run-length decoder 62D. When the bit map decoder 62C has been selected, the sub-picture data from the selector 62B is decoded at the bit map decoder 62C by the bit map coding scheme. When the run-length decoder 62D has been selected, the sub-picture data from the selector 62B is decoded at the run-length decoder 62D, by the run-length coding scheme.

The D/A and reproducing section 64 comprises a video reproducing section 201, an audio reproducing section 202, an audio mixing section 203, and a sub-picture reproducing section 207 as shown in FIG. 1.

As shown in FIG. 45, the video reproducing section 201 comprises a letter box converter 204 having memory in it, a digital NTSC/PAL converter 205 having the video formatter function of converting a color difference signal of NTSC video data into a color difference signal of PAL video data or vice versa, and a D/A converter 206 that converts a digital video signal into an analog video signal. The letter box converter 204 either converts the video data supplied from the video decoder section 58 into letter box or does not convert it into letter box according to the control signal corresponding to the display mode (bit numbers b9, b8) of the video data attributes (VMGM_V_ATR, VTSM_V_ATR, VTS_V_ATR) supplied from the system CPU section 50 via the system processor section 54, and then output the resulting signal. In the letter box converting process, when the conversion is allowed (the bit numbers b9, b8 of the display mode are "00" or "10"), the video data having an aspect ratio of 9/16 is converted so that all the data may be displayed on the monitor section 6 having an aspect ratio of 3/4, as explained with reference to FIG. 9. Because a dark portion appears at the upper edge of the screen when pictures are displayed on the monitor 6, it is called a letter box. The digital NTSC/PAL converter 205 converts the video data from the letter box converter 204 into either the NTSC format or the PAL format according to the control signal corresponding to the frame rate (bit numbers b13, b12) of the video data attributes (VMG_V_ATR, VTSM_V_ATR, VTS_V_AT) supplied from the system CPU section 50 via the system processor section 54. The output of the digital NTSC/PAL converter 205 is converted by the D/A converter 206 into analog data and then is outputted to the monitor section 6.

The audio reproducing section 202 comprises a register 202A, a selector 202B, a stereo output section 202C, a monaural output section 202D, and a surround output section 202E as shown in FIG. 46. In the circuit of FIG. 46, the control signal corresponding to the audio data attributes (VMGM_AST_ATR, VTSM_AST_ATR, VTS_AST_ATR) supplied from the system CPU section 50 via the system processor section 54 is held in the register 202A, which supplies the output to the selector 202B. According to the output from the register 202A, the selector 202B selectively outputs the audio data supplied from the audio decoder section 60 to either the stereo output section 202C, the monaural output section 202D, or the surround output section 202E. When the stereo output section 202C has been selected, the audio data from the selector 202B is converted into stereo data. When the monaural output section 202D has been selected, the audio data from the selector 202B is converted into monaural data. When the surround output section 202D has been selected, the audio data from the selector 202B is converted into surround data. The output from either the stereo output section 202C, the monaural output section 202D, or the surround output section 202E, or the output of the audio reproducing section 202, is directly supplied to the speaker 8. In case that the audio data is the multi channel audio data, the output from the surround output section 202, the output is supplied to the speaker 8 through an audio mixing section 203.

The audio mixing section 203 comprises a register 203A, a register 203B, a selector 203C, a first stream processing section 203D, a second stream processing section 203E, and a mixing section 203F as shown in FIG. 47. In the circuit of FIG. 47, the control signal corresponding to the audio data attributes (VMGM_AST_ATR, VTSM_AST_ATR, VTS_AST_ATR) supplied from the system CPU section 50 via the system processor section 54 is held in the registers 202A and 203B. The output of register 103A is supplied to the selector 203C and the output of the register 203B is supplied to the mixing section 203F. According to the output from the register 203A, the selector 203C selectively outputs the audio data supplied from the audio reproducing section 202 to either the first stream processing section 203D or the second stream processing section 203E. When the first stream processing section 203D has been selected, the audio data from the selector 203C is converted by the first stream processing section 203D into the first stream data. When the second stream processing section 203E has been selected, the audio data from the selector 203C is converted by the second stream processing section into the second stream data. The output from either the first stream processing section 203D or the second stream processing section 203E is supplied to the mixing section 203F. According to the output of the register 203A, the mixing section 203F performs mixing. The mixed data is supplied to the speaker 8 as the output of the audio mixing section 203.

Hereinafter, the operation of reproducing the movie data from the optical disk 10 with the logic format shown in FIGS. 4 to 14 will be explained with reference to FIG. 1. In FIG. 1, the solid-line arrows indicate data buses and the broken-line arrows represent control buses.

With the optical disk apparatus of FIG. 1, when the power supply is turned on and an optical disk 10 is loaded, the system CPU section 50 reads the initial operation program from the system ROM/RAM 52 and operates the disk drive section 30. Then, the disk drive section 30 starts to read the data from the lead-in area 27 and then from the volume and file structure area 70 next to the lead-in area 27 determining a volume structure and a file structure in accordance with ISO-9660. Specifically, to read the data from the volume and file structure area 70 located in a specific position on the optical disk 10 set in the disk drive section 30, the system CPU section 50 gives a read instruction to the disk drive section 30 to read the contents of the volume and file structure area 70, and stores the data temporarily in the data RAM section 56 via the system processor section 54. The system CPU section 50 extracts information about the recording position and recording size of each file and management information necessary for other managing actions via the path table and directory record stored in the data RAM section 56, and transfers and stores these pieces of information in specific locations in the system ROM/RAM section 52.

Then, the system CPU section 50 acquires a video manager 71 composed of files, starting with file number 0, with reference to the information about the recording position and recording capacity of each file in the system ROM/RAM section 52. Specifically, referring to the recording position and recording capacity of each file acquired from the system ROM/RAM section 52, the system CPU section 50 gives a read instruction to the disk drive section 30, acquires the positions and sizes of a plurality of files constituting the video manager 71 existing on the root directory, reads the video manager 71, and stores it in the data RAM section 56 via the system processor section 54.

A video manager information management table (VMGI_MAT) 78, the first table in the video manager 71, is searched for. By the search, the start address (VMGM_VOBS_SA) of the video object set (VMGM_VOBS) 76 for the video manager menu (VMGM) is obtained and the video object set (VMGM_VOBS) 76 is reproduced. Because the playback of the video object set (VMGM_VOBS) 76 for menus is the same as that of the video object set (VTSM_VOBS) for titles in the video title set (VTS), its playback procedure will be omitted. When a language is set in the video object set (VMGM_VOBS) 76, or when there is no video manager menu (VMGM), the video manager information management table (VMGI_MAT) is searched for and the start address (TT_SRPT_SA) of the title set search pointer table (TT_SRPT) 79 is retrieved. Here, in reproducing the video manager menu, the system CPU section 50 acquires the number of video streams, audio streams, and sub-picture streams for volume menus and attribute information on each of those written in the information management table (VMGI_MAT) of the video manager (VMGI) 75, and on the basis of these pieces of attribute information, sets the parameter for playback of the video manager menu in each of the video decoder section 58, audio decoder section 60, and sub-picture section 62.

By the retrieval, the title set search pointer table (TT_SRPT) 79 is transferred to a particular location in the system ROM/RAM section 52 and stored there. Next, the system CPU section 50 acquires the end address of the title search pointer table (TT_SRPT) 79 from the title search pointer table information (TSPTI) 92 and also obtains the video title set number (VTSN) corresponding to the input number, the program chain number (PGCN), and the start address (VTS_SA) of the video title set from the title search pointer (TT_SRP) 93 according to the input number from the key/display section 4. When there is only one title set, one title search pointer (TT_SRP) 93 is searched for, regardless of whether the input number has been entered from the key/display section 4, and the start address (VTS_SA) of the title set is acquired. From the start address (VTS_SA) of the title set, the system CPU section 50 acquires the target title set.

Next, from the start address (VTS_SA) of the video title set 72 of FIG. 15, the video title set information (VTSI) 94 about the title set is obtained as shown in FIG. 22. The end address (VTI_MAT_EA) of the video title set information management table (VTSI_MAT) 98 of FIG. 22 is acquired from the management table (VTSI_MAT) 98 of the video title set information (VTSI) 94. At the same time, each section of the reproducing apparatus shown in FIG. 1 is set on the basis of the number of audio streams and the number of sub-picture data streams (VTS_AST_Ns, VTS_SPST_Ns) and the video, audio, and sub-picture data attribute information (VTS_V_ATR, VTS_A_ATR, VTS_SPST_ATR). A detailed explanation of the setting of each section of the reproducing apparatus according to the attribute information will be given later.

When a menu (VTSM) for a video title set (VTS) has a simple structure, the start address (VTSM_VOB_SA) of a video object set (VTSM VOB) 95 for a video title set menu is acquired from the video title set information management table (VTSI_MAT) 98 of FIG. 23. On the basis of the video object set (VTSM_VOB) 95, the video title set menu is displayed. When an video object set (VTT_VOBS) 96 for titles (VTST) in the title set (VTS) is simply reproduced without selecting a program chain (PGC) with reference to the menu, the video object set 96 is reproduced on the basis of the start address (VTSTT_VOB_SA) shown in FIG. 23.

When a program chain (PGC) is specified from the key/display section 4, the desired program chain is searched for in the following procedure. The act of searching for a program chain is not limited to a program chain for titles in the video title set. The same procedure applies to the operation of searching for a program chain for a relatively complex menu made up of program chains. The start address of the program chain information table (VTS_PGCIT) 100 in the video title set (VTS) of FIG. 22 written in the management table (VTSI_MAT) 98 of the video title set information (VTSI) is acquired, and information (VTS_PGCIT_I) 102 in the VTS program chain information table of FIG. 24 is read. From the information (VTS_PGCIT_I) 102, the number of program chains (VTS_PGC_Ns) and the end address (VTS_PGCIT_EA) of the table 100 shown in FIG. 25 are obtained.

When the number of a program chain is specified from the key/display section 4, the category of the program chain and the start address of the VTS_PGC information 104 corresponding to the search pointer (VTS_PGCIT_SRP) 103 shown in FIG. 26 are acquired from the VTS_PGCIT search pointer (VTS_PGCIT_SRP) 103 corresponding to the number shown in FIG. 24. On the basis of the start address (VTS_PGCI_SA), the program chain general information (PGC_GI) of FIG. 27 is read out. According to the general information (PGC_GI), the category and playback time of the program chain (PGC_CAT, PGC_PB_TIME) are obtained and further the start addresses (C_PBIT_SA, C_POSIT_SA) of the cell playback information table (C_PBIT) and cell position information table (C_POSIT) 108 contained in the general information (PGC_GI) are acquired. From the start address (C_PBIT_SA), the video object identifier (C_VOB_IDN) and cell identification number (C_IDN) of FIG. 34 are acquired as the cell position information (C_POSI) of FIG. 33.

Furthermore, from the start address (C_POSIT_SA), the cell playback information (C_PBI) of FIG. 31 is obtained. The start address (C_FVOBU_SA) of the first VOBU 85 and the start address (C_LVOBU_SA) of the last VOBU in the cell of FIG. 32 contained in the playback information (C_PBI) are acquired. Then, the target cell is searched for. In the playback of cells, referring to the program map of FIG. 29 in the PGC program map (PGC_PGMAP) 106 of FIG. 27, playback cells 84 are determined one after another. The data cells 84 of program chains thus determined are read one after another from the video object 144 and inputted to the data RAM section 56 via the system processor section 54. The data cells 84, on the basis of the playback time information, are supplied to the video decoder section 58, audio decoder section 60, and sub-picture decoder section 62, which decode them. The decoded signals are subjected to signal conversion at the D/A and data-reproducing section 64 and an image is reproduced at the monitor section 6 and at the same time, sound is reproduced at the speaker sections 8, 9.

Explained next will be the acquisition of the video data attribute information (VTS_V_ATR) and the setting of the video decoder and video reproducing section 201 according to the video data attribute information (VTS_V_ATR) in the optical disk reproducing apparatus, with reference to the flowchart shown in FIGS. 48A and 48B. When the setting process is started, the system CPU section 50 controls the disk drive section 30 to read the video title set information management table (VTSI_MAT) 98 from the optical disk 10 and temporarily stores it in the data RAM section 56. As shown in step S0, the system CPU section 50 acquires the video data attribute (VTS_V_ATR) recorded in the video title set information management table (VTSI_MAT) 98 stored in the data RAM section 56. It is confirmed at step S1 whether the acquired video data attribute (VTS_V_ATR) has been acquired newly or a new video data attribute (VTS_V_ATR) different from the already acquired video data attribute (VTS_V_ATR) has been acquired. If no video data attribute (VTS_V_ATR) has been acquired, control will be returned to step S0. If the new video data attribute (VTS_V_ATR) is the same as the already acquired video data attribute (VTS_V_ATR), the process will be terminated. If a new video data attribute (VTS_V_ATR) has been acquired, the system CPU section 50, as shown in step S2, judges which of the MPEG1 and MPEG2 standards the video compression mode written in the acquired video data attribute (VTS_V_ATR) complies with and on the basis of the judgment result, supplies a control signal to the register 58A of the video decoder section 58 of FIG. 42. This causes the selector 58B to be switched according to the control signal supplied to the register 58A. If, as shown in step S3, the video compression mode 131 conforms to the MPEG1 standard, the system processor section 54 will supply the video data via the selector 58B to the MPEG1 decoder 58C, which decodes it in the MPEG1 mode. If, as shown in step S4, the video compression mode 131 conforms to the MPEG2 standard, the system processor section 54 will supply the video data via the selector 58B to the MPEG2 decoder 58D, which decodes it in the MPEG2 mode.

Furthermore, the system CPU section 50, as shown in step S5, judges whether the frame rate written in the frame rate (bit numbers b13, b12) of the acquired video data attribute (VTS_V_ATR) conforms to the NTSC scheme (a frame rate of 29.97/s) or the PAL scheme (a frame rate of 25/s) and on the basis of the judgment result, supplies a control signal to the digital NTSC/PAL converter 205 in the video reproducing section 201 in the D/A & reproducing section 64. If the frame rate complies with the NTSC scheme (a frame rate of 29.97/s), or if bit number b13, b12 describing the frame rate contain "00", the video data, as shown in step S6, will be converted by the digital NTSC/PAL converter 205 into an NTSC video signal. If the frame rate complies with the PAL scheme (a frame rate of 25/s), or if bit number b13, b12 describing the frame rate contain "01", the video data, as shown in step S7, will be converted by the digital NTSC/PAL converter 205 into a PAL video signal.

Furthermore, the system CPU section 50, as shown in step S8, judges whether the display aspect ratio written in the acquired video data attribute (VTS_V_ATR) is 3/4 or 9/16. If the judgment result shows 3/4, or if bit numbers b11, b10 describing the display aspect ratio contain "00", the system CPU section 50 will supply a control signal for disabling the conversion into letter box via the system processor section 54 to the letter box converter 204 in the video reproducing section 204 in the D/A & reproducing section 64. As shown in step S9, this prevents the letter box converter 204 from converting the data into letter box format. In addition, the system CPU section 50, as shown in step S10, supplies a control signal for disabling the pan scan process via the system processor section 54 to the MPEG2 decoder 58d in the video decoder section 58. This prevents the MPEG2 decoder 58d from performing the pan scan process.

When at step S8, the judgment result shows 9/16, or if bit numbers b11, b10 describing the display aspect ratio is "11", the system CPU section 50, as shown in step S11, will judge whether the user-specified display aspect ratio is 9/16. If the judgment result shows 9/16, control will be returned to step S9 as explained earlier. If the user-specified aspect ratio is 3/4, the system CPU section 50, as shown in step S12, will judge whether the display conversion specified by the user from the key/display section 4 is the pan scan scheme. If the judgment result does not show the pan scan scheme, the system CPU section 50, as shown in step S13, will supply a control signal for performing the letter box process via the system processor section 54 to the letter box converter 204 in the video reproducing section 201 in the D/A & reproducing section 64. This causes the letter box converter 204 to perform the letter box conversion. In addition, the system CPU section 50, as shown in step S14, supplies a control signal for disabling the pan scan process via the system processor section 54 to the MPEG2 decoder 58d in the video decoder section 58. This prevents the MPEG2 decoder 58d from performing the pan scan process.

Furthermore, if the judgment result at step S12 shows the display conversion by the pan scan scheme, the system CPU section 50, as shown in step S15, will judge whether the pan scan 134 written in the acquired video data attribute (VTS_V_ATR) is enabled or disabled. If the judgment result shows enable, the system CPU section 50 will supply a control signal for disabling the letter box conversion via the system processor section 54 to the letter box converter 204 in the video reproducing section 201 in the D/A & reproducing section 64. As shown in step S16, this prevents the letter box converter 204 from performing the letter box conversion. In addition, the system CPU section 50, as shown in step S17, supplies a control signal for enabling the pan scan process via the system processor section 54 to the MPEG2 decoder 58d in the video decoder section 58. This causes the MPEG2 decoder 58d to perform the pan scan process.

Furthermore, if the judgment result at step S15 shows disable, the system CPU section 50, as shown in step S18, will cause either the key/display section 4 to display a message for pan scan to be disabled or the indicator to inform the user of the disabling of pan scan. Additionally, after the system CPU section 50 makes the key/display section or the indicator work this way, control is passed to step S9.

Figure 48A:
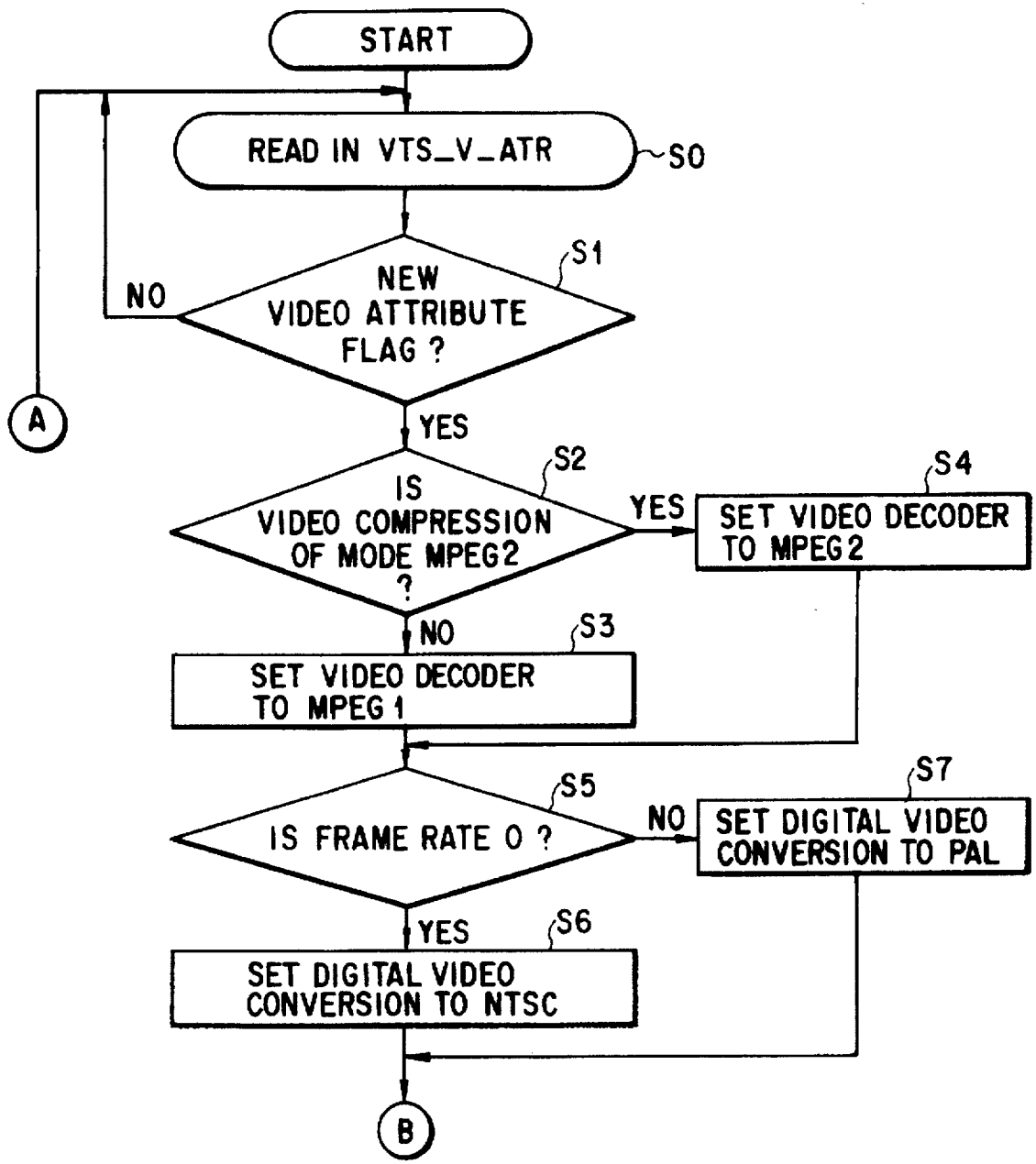
FIGS. 48A and 48B are flowcharts to help explain the acquisition of video data attributes and the process of setting the reproducing system.
Figure 48B:
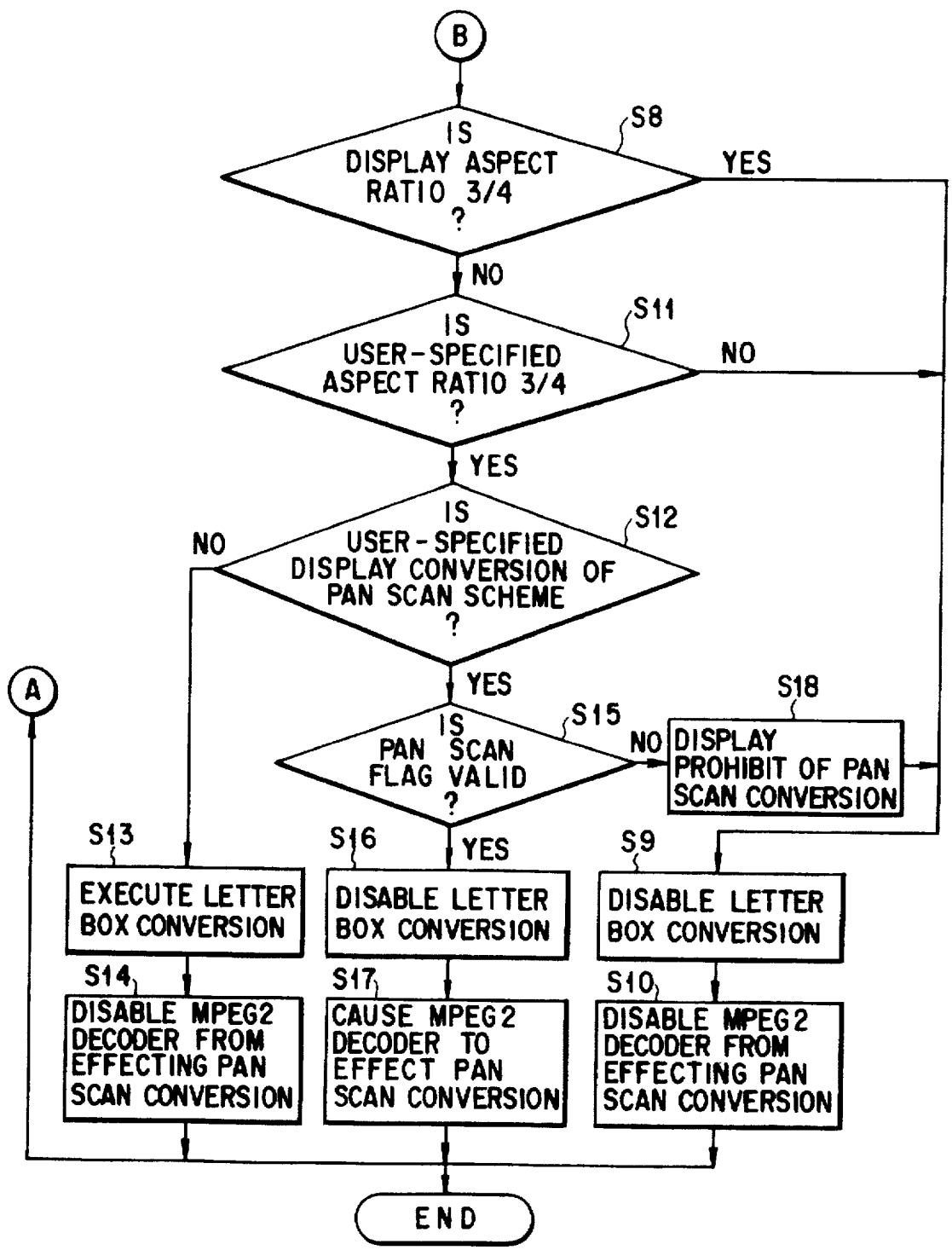

In the flow in FIGS. 48A and 48B, when the video decoder section 58 and video reproducing section 201 are set according to the video data attribute information (VMGM_V_ATR), the video management information management table (VMGI_MAT) 78 is read out instead of the video title set information management table (VTSI_MAT) 98 and the video data attribute information (VMG_V_ATR) is acquired. Additionally, in the flow of FIGS. 48A and 48B, when the video decoder section 58 and video reproducing section 201 are set according to the video data attribute information (VTSM_V_ATR), the video data attribute information (VTSM_V_ATR), like the video data attribute information (VTS_V_ATR), is acquired from the video title set information management table (VTSI_MAT) 98.

Figure 49:
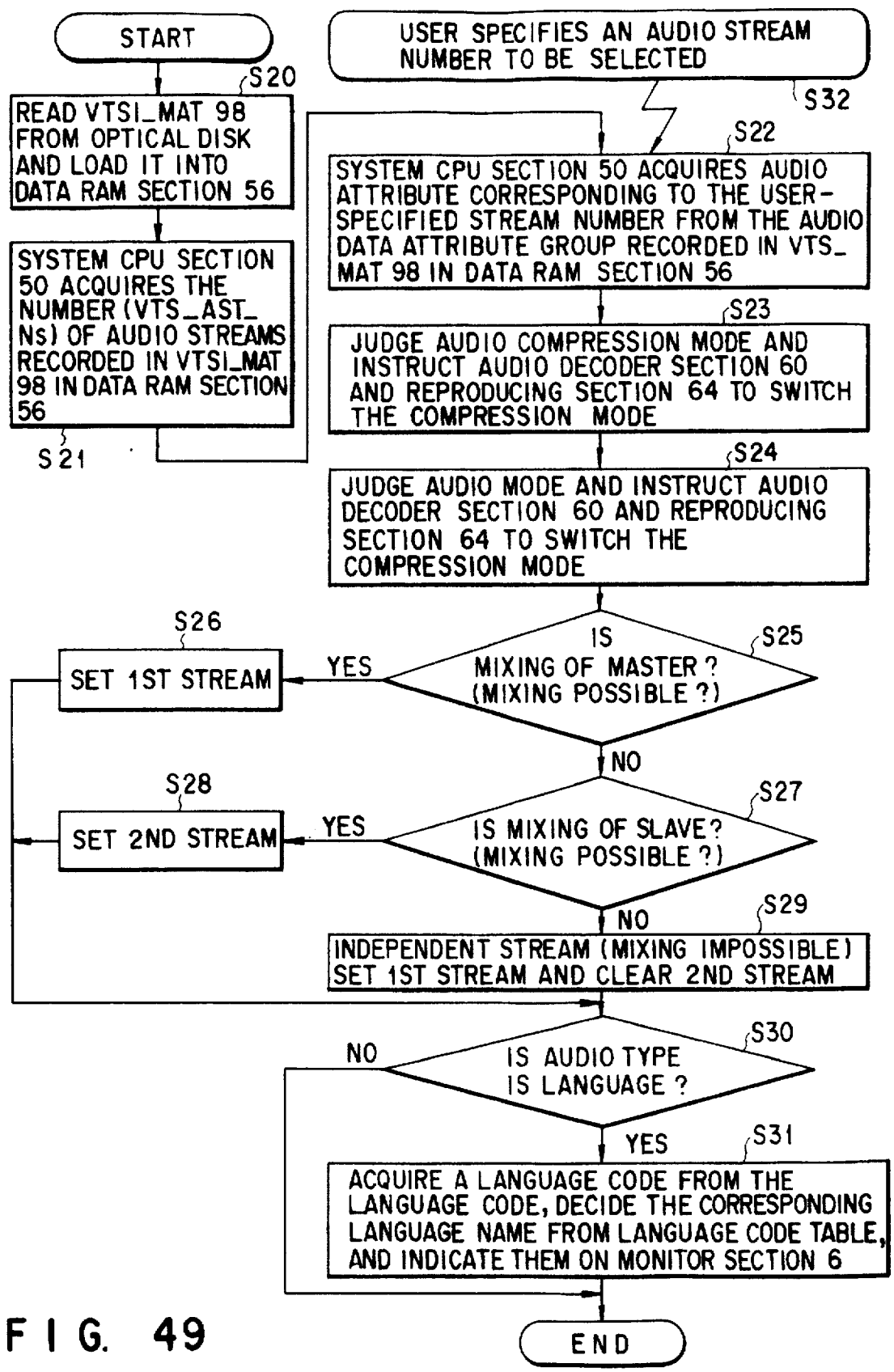
FIG. 49 is a flowchart to help explain the acquisition of audio data attributes and the process of setting the reproducing system.
Figure 50:
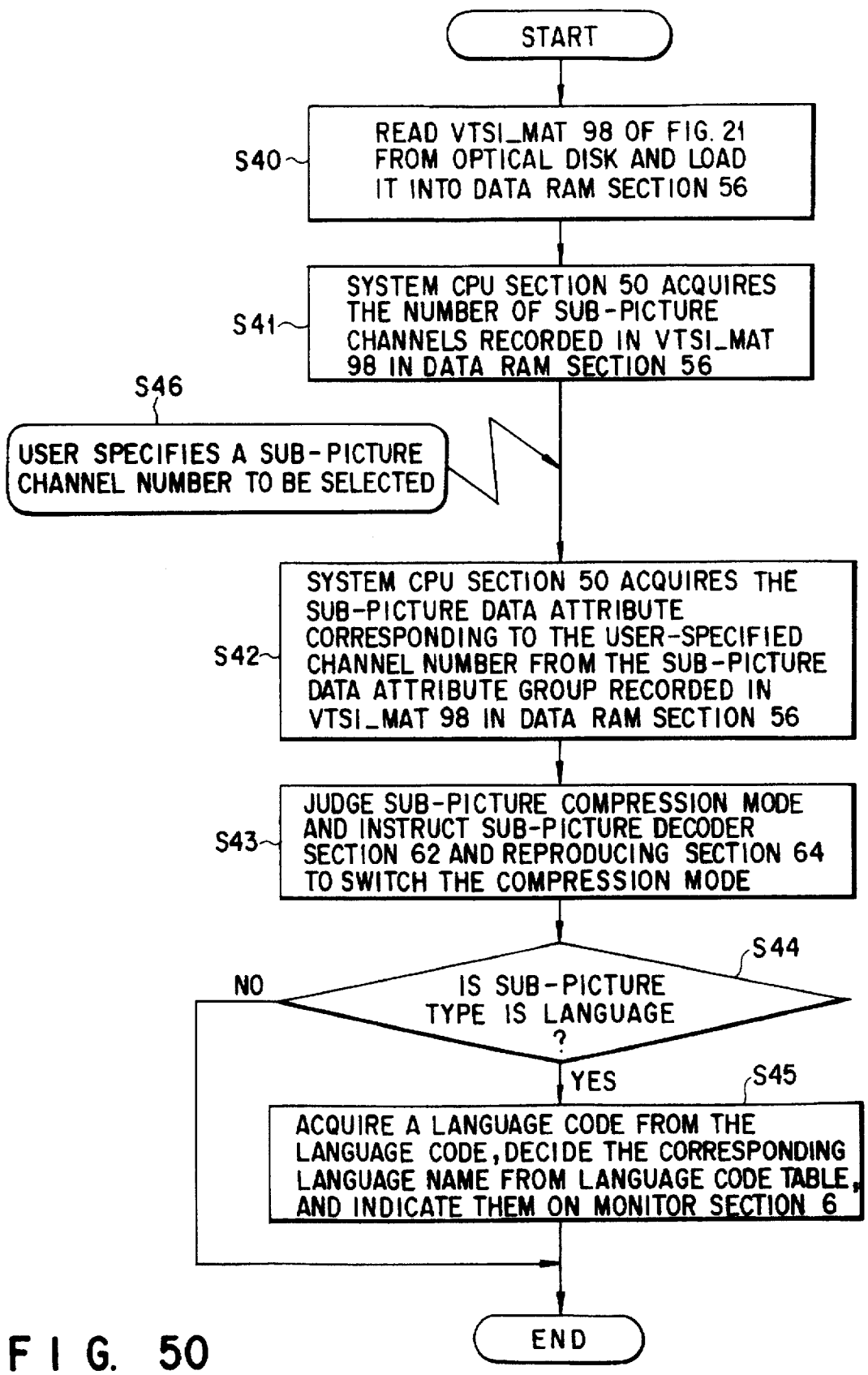
FIG. 50 is a flowchart to help explain the acquisition of sub-picture data attributes and the process of setting the reproducing system.

Explained next will be the acquisition of the audio data attribute information (VTS_AST_AT) and the setting of the video decoder and video reproducing section 201 according to the attribute information (VTS_AST_ATR) in the optical disk reproducing apparatus, with reference to the flowchart shown in FIG. 49. When the setting process is started, the system CPU section 50, as shown in step 20, controls the disk drive section 30 to read the video title set information management table (VTSI_MAT) 98 from the optical disk 10 and temporarily stores it in the data RAM section 56. As shown in step S21, the system CPU section 50 acquires the number of audio streams recorded in the video title set information management table (VTSI_MAT) 98 stored in the data RAM section 56. As shown in step 32, when the user specifies a selectable audio stream number from the key/display section 4, the system CPU section 50, as shown in step 22, acquires the audio attribute (VTS_AST_ATR) corresponding to the user-specified stream number from the audio data attribute group (VTS_AST_ATR) in the video title set information management table (VTSI_MAT) 98 stored in the data RAM section 56. The system CPU section 50, as shown in step 23, judges which of MPEG1 and linear PCM standards the audio compression mode written in the acquired audio data attribute (VTS_AST_ATR) complies with and on the basis of the judgment result, supplies a control signal to the register 68A of the audio decoder section 60.

This causes the selector 60B to be switched according to the control signal supplied to the register 60A. When the audio coding mode conforms to the MPEG1 standard, the system processor section 54 supplies the audio data to the MPEG1 decoder 60C via the selector 60B. When the audio coding mode conforms to the AC3 standard, the system processor section 54 supplies the audio data to the AC3 decoder 60D via the selector 60B. When the video coding mode conforms to the digital PCM standard, the system processor section 54 supplies the audio data to the PCM decoder 60E via the selector 60B.

Furthermore, the system CPU section 50, as shown in step S24, judges whether the audio mode 152 written in the acquired audio data attribute (VTS_AST_ATR) is stereo, monaural, or surround and on the basis of the judgment result, supplies a control signal to the register 202A in the audio reproducing section 202. This causes the selector 202B to be switched according to the control signal supplied to the register 202A. When the audio mode 152 is stereo, the audio data from the audio decoder section 60 is supplied to the stereo output section 202C via the selector 202B. When the audio mode 152 is monaural, the audio data from the audio decoder section 60 is supplied to the monaural output section 202D via the selector 202B. When the audio mode 152 is surround, the audio data from the audio decoder section 60 is supplied to the surround output section 202E via the selector 202B.

Next, the system CPU section 50, as shown in step S25, judges whether the mixing mode written in the acquired audio data attribute 125 is mixing impossible, master stream enabling mixing, or slave stream enabling mixing and on the basis of the judgment result, supplies a control signal to the registers 203A and 203B in the audio mixing section 203. This causes the selector 203C to be switched according to the control signal supplied to the register 203A. When the mixing mode is master stream enabling mixing as shown in step 25, the stream is determined to be the first stream as shown in step 26 and supplied to the first stream processing section 203D. When the mixing mode is slave stream enabling mixing as shown in step 27, the stream is determined to be the second stream as shown in step 28 and supplied to the second stream processing section 203E. When the mixing mode is independent stream disabling mixing, the stream is determined to be the first stream and supplied to the first stream processing section 203D. Additionally, the processing of the mixing processing section 203F is switched according to the control signal supplied to the register 203B. When the mixing mode is mixing possible, mixing is performed on the first stream in the first stream processing section 203D and on the second stream in the second stream processing section 203E. The resulting signal is outputted to the speaker section 8. When the mixing mode is mixing impossible, only the first stream in the first stream processing section 203D is outputted to the speaker section 8.

Furthermore, the system CPU section 50, as shown in step 30, judges whether or not the audio type 153 written in the acquired audio data attribute 125 is language. If the judgment result shows a language, the CPU section will acquire a language code from language code 156, determine the name of the corresponding language from a language code table previously stored in the system ROM/RAM section 52, and indicate it on the monitor section 6 as shown in step 31.

In contrast, when the user has specified a language code, the CPU section can pinpoint the audio stream having the desired language code from the number of audio streams 124 and audio data attribute 125.

Additionally, during playback of data, the change of the audio stream number is commanded because of the user's event, for example, (S32), the acquisition and setting of audio data attributes are effected according to the processes in S22 to S31.

The above series of processes has set the audio decoder section 60, audio reproducing section 202, and audio mixing section 203 optimally for the video data in the title set to be reproduced. In the flow in FIG. 49, when the video decoder section 58 and video reproducing section 201 are set according to the audio data attribute (VMGM_AST_ATR), the video management information management table (VMGI_MAT) 78 is read out instead of the video title set information management table (VTSI_MAT) 98 and the audio data attribute (VMG_AST_ATR) is acquired. Additionally, in the flow of FIGS. 48A and 48B, when the audio decoder section 60 and audio reproducing section 202 are set according to the audio data attribute (VTSM_AST_ATR), the audio data attribute (VTSM_AST_ATR), like the audio data attribute (VTS_AST_ATR), is acquired from the video title set information management table (VTSI_MAT) 98.

Explained next will be the acquisition of the sub-picture attribute information (VTS_SPST_ATR) and the setting of the sub-picture decoder 62 and video reproducing section 201 according to the attribute information (VTS_SPST_ATR) in the optical disk reproducing apparatus, with reference to the flowchart shown in FIGS. 48A and 48B. As shown in step 40, the system CPU section 50 controls the disk drive section 30 to read the video title set information management table (VTSI_MAT) 98 from the optical disk 10 and temporarily stores it in the data RAM section 56. As shown in step S41, the system CPU section 50 acquires the number of sub-picture streams (VTS_SPST_Ns) recorded in the video title set information management table (VTSI_MAT) stored in the data RAM section 56. As shown in step 46, when the user specifies a selectable audio stream number from the key/display section 4, the system CPU section 50, as shown in step 42, acquires the audio attribute (VTS_AST_ATR) corresponding to the user-specified channel number from the sub-picture data attribute (VTS_AST_ATR) recorded in the video title set information management table (VTSI_MAT) stored in the data RAM section 56. The system CPU section 50, as shown in step 43, judges whether sub-picture compression mode written in the acquired sub-picture attribute (VTS_AST_ATR) is Raw (corresponding to a bit map), run length, or others and on the basis of the judgment result, supplies a control signal to the register 62A of the sub-picture decoder section 62. This causes the selector 62B to be switched according to the control signal supplied to the register 62A. When the sub-picture compression mode corresponds to a bit map, the system processor section 54 supplies the sub-picture data to the bit map decoder 62C via the selector 62B. When the sub-picture compression mode corresponds to run length, the system processor section 54 supplies the sub-picture data to the run length decoder 62D via the selector 62B.

Furthermore, the system CPU section 50, as shown in step 44, judges whether or not sub-picture type 172 written in the acquired sub-picture attribute 127 is a language. If the judgment result shows a language, the CPU section, as shown in step 45, will acquire a language code 156 from the language code, determine the name of the corresponding language from a language code table previously stored in the system ROM/RAM section 52, and indicate it on the monitor section 6.

In contrast, when the user has specified a language code, the CPU section can pinpoint the sub-picture stream having the desired language code from the number of sub-picture streams and sub-picture data attribute 127. Additionally, as shown in step 46, when during playback of data, the change of the sub-picture stream number is commanded because of the user's event, for example, the acquisition and setting of sub-picture data attributes are effected according to the processes in S42 to S45.

The above series of processes has set the sub-picture decoder section 62 and sub-picture reproducing section 207 optimally for the video data in the title set to be reproduced. In the flow in FIG. 49, when the sub-picture decoder section 62 and sub-picture reproducing section 207 are set according to the sub-picture attribute (VMGM_SPST_ATR), the video management information management table (VMGI_MAT) 78 is read out instead of the video title set information management table (VTSI_MAT) 98 and the sub-picture attribute (VMG_SPST_ATR) is acquired. Additionally, in the flow of FIGS. 48A and 48B, when the audio decoder section 60 and audio reproducing section 202 are set according to the sub-picture attribute (VTSM_SPST_ATR), the sub-picture attribute (VTSM_SPST_ATR), like the sub-picture attribute (VTS_SPST_ATR), is acquired from the video title set information management table (VTSI_MAT) 98.

Figure 51:
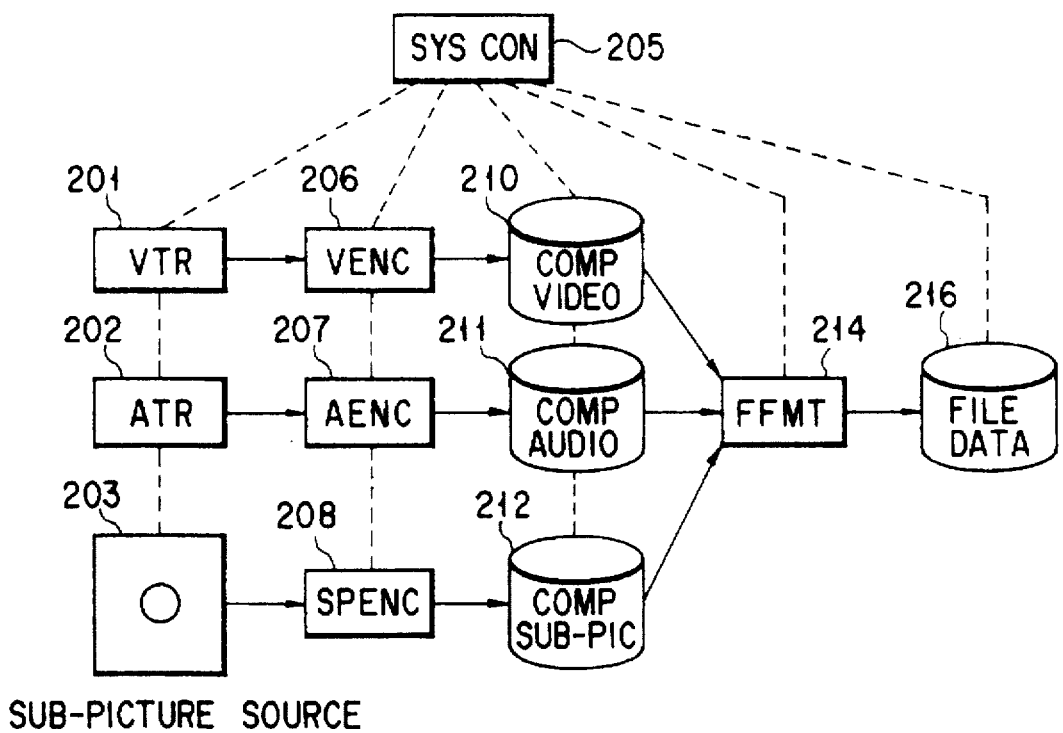
FIG. 51 is a block diagram of an encoder system that creates video files by encoding the video data.
Figure 52:
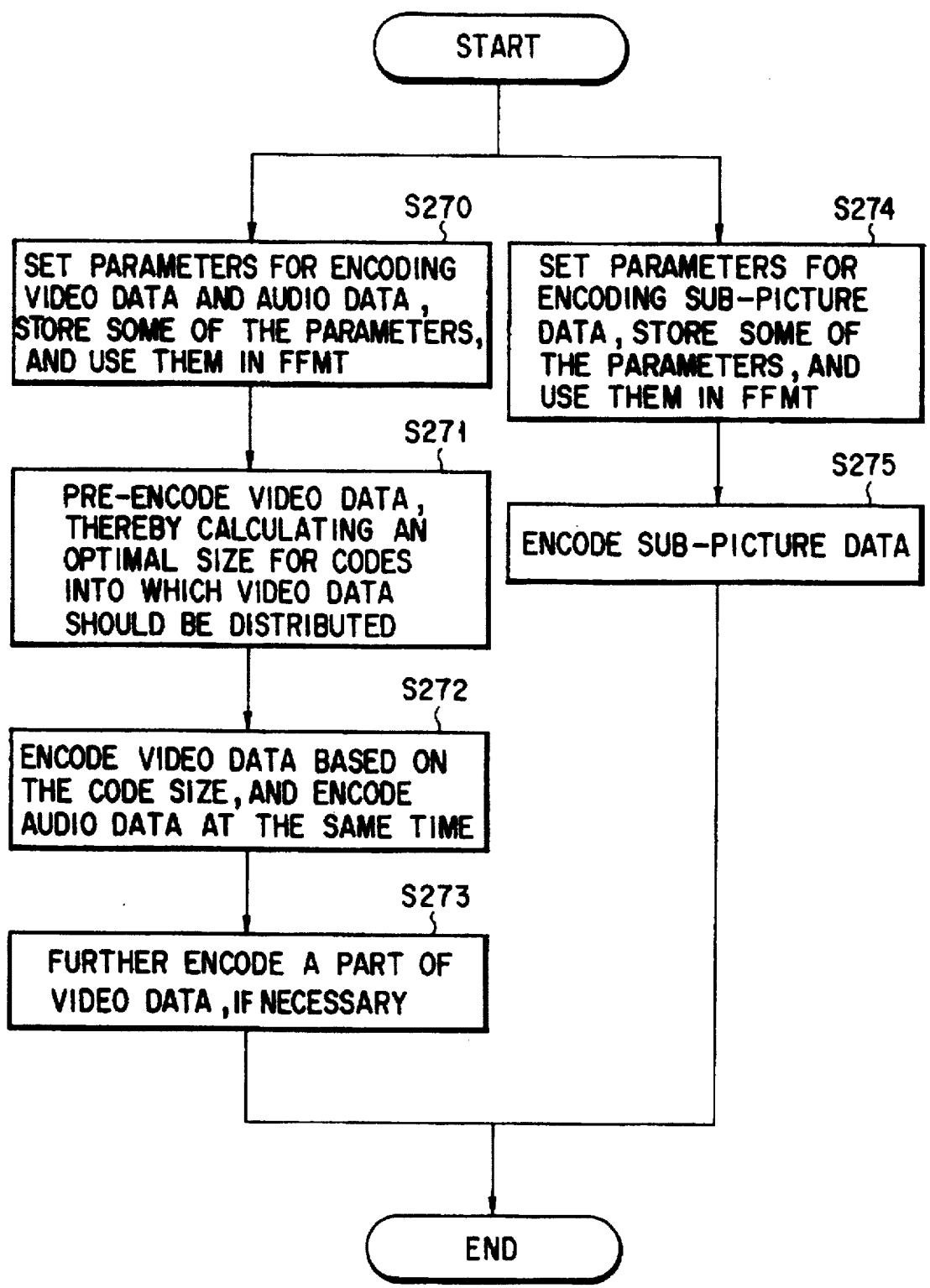
FIG. 52 is a flowchart for the encoding process of FIG. 51.

Referring to FIGS. 51 to 53, explained next will be a method of recording data on the optical disk 10 on and from which the video data is recorded and reproduced in the logic formats shown in FIGS. 4 to 41 and a recording system to which the recording method is applied.

FIG. 51 shows an encoder system that creates a video file 88 of a title set 84 whose video data is encoded. In the system of FIG. 51, for example, a videotape recorder (VTR) 201, an audiotape recorder (ATR) 202, and a sub-picture source 203 are used as sources of the main video data, audio data, and sub-picture data. Under the control of a system controller (Sys con) 205, they create the main video data, audio data, and sub-picture data, which are supplied to a video encoder (VENC) 206, an audio encoder (AENC) 207, and a sub-picture encoder (SPENC) 208, respectively. Under the control of the system controller (Sys con) 205, these encoders 206, 207, and 208 perform A/D conversion of the main video data, audio data, and sub-picture data and encode them by the respective compression schemes. The encoded main video data, audio data, and sub-picture data (Comp Video, Comp Audio, Comp Sub-pict) are stored in memories 210, 211, and 212. The main video data, audio data, and sub-picture data (Comp Video, Comp Audio, Comp Subpict) are outputted to a file formatter (FFMT) 214 under the control of the system controller (Sys con) 205, which converts them so that they may have a file structure of video data for the system as explained earlier. Then, under the control of the system controller (Sys con) 205, the setting conditions for each data item and the management information including attributes are stored in a memory 216 in the form of files.

Explained next will be a standard flow of an encoding process in the system controller (Sys con) 205 that creates a file from video data.

According to the flow of FIG. 52, the main video data and audio data are encoded and the encoded main video data and audio data (Comp Video, Comp Audio) are supplied. Specifically, when the encoding process is started, as shown in step S70 of FIG. 52, the parameters necessary for encoding the main video data and audio data are set. Part of the set parameters are stored in the system controller (Sys con) 205 and at the same time, are used at the file formatter (FFMT) 214. As shown in step S271, the main video data is pre-encoded using the parameters and the optimum distribution of the amount of codes is calculated. Then, on the basis of the code amount distribution obtained in the pre-encoding, the main video data is encoded as shown in step S272. At the same time, the audio data is also encoded at step S272. As shown in step in S273, if necessary, the main video data is partially encoded again and the reencoded portion of the main video data is replaced with the old one. Through the series of steps, the main video data and audio data are encoded. Furthermore, as shown in steps S274 and S275, the sub-picture data is encoded and the encoded sub-picture data (Comp Sub-pict) is supplied. Namely, the parameters necessary for encoding the sub-picture data is set. As shown in step S274, part of the parameters are stored in the system controller (Sys con) 205 and used in the file formatter (FFMT) 214. On the basis of the parameters, the sub-picture data is encoded. By the process, the sub-picture data is encoded.

According to the flow of FIG. 53, the encoded main video data, audio data, and sub-picture data (Com Video, Com Audio, Comp Sub-pict) are combined and converted so as to form a video data title set structure as explained in FIGS. 4 and 21. Specifically, as shown in step S276, a cell is set as the smallest unit of the video data and cell playback information on the cell (C_PBI) is created. Then, as shown in step S277, the structure of the cells constituting a program chain and the main video, sub-picture, and audio attributes (the information obtained in encoding the respective data items are used part of these attributes) are set. Then, as shown in FIG. 21, a video title set information management table information (VTSI_MAT) including information on program chains and a video title set program chain table (VTS_PGCIT) 100 are created. At this time, as the need arises, a video title set direct access pointer table (VTS_DAPT) is also created. The encoded main video data, audio data, and sub-picture data (Com Video, Comp Audio, Comp Subpict) are subdivided into specific packs. An NV pack is placed at the head of each VOBU so that playback can be effected in the order of time code of each data item. With the NV packs arranged this way, each data cell is positioned so that a video object (VOB) may be composed of a plurality of cells as shown in FIG. 6. A set of such video objects is formatted into the title set structure.

In the flow of FIG. 53, the program chain information (PGI) is obtained in the process of step S277 by using the database in the system controller (Sys con) 205 or entering data again as the need arises.

Figure 54:
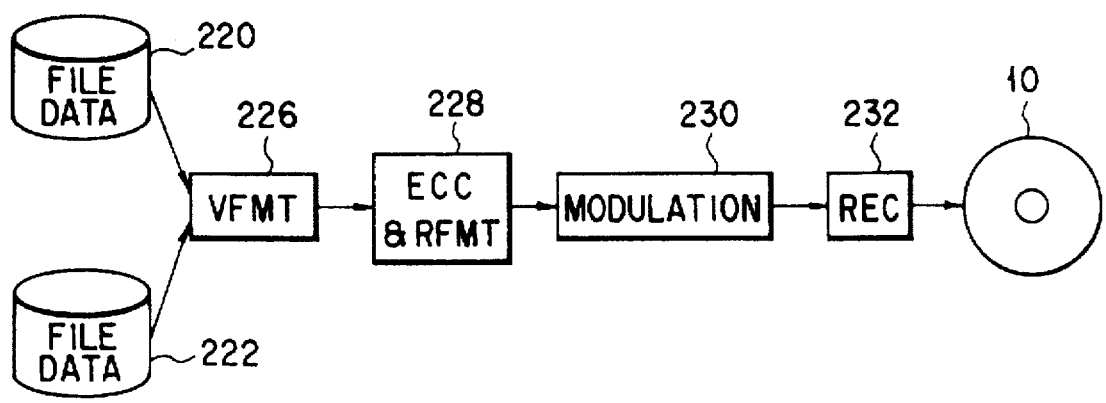
FIG. 54 is a block diagram of a disk formatter system used to record a formatted video file on an optical disk.

FIG. 54 shows a disk formatter system that records on an optical disk the title set formatted as described above. In the disk formatter system of FIG. 54, the memories 220, 222 in which the created title set is stored supply these file data items to a volume formatter (VFMT) 226. The volume formatter (VFMT) 226 extracts the management information from the title sets 84, 86, produces a video manager 71, and create the logic data to be recorded on the disk 10 in the arrangement of FIG. 4. A disk formatter (DFMT) 228 adds error correction data to the logic data created at the volume formatter (VFMT) 226, thereby reconverting the logic data into physical data to be recorded on the disk. A modulator 230 converts the physical data created at the disk formatter (DFMT) 228 into the recording data to be recorded actually on the disk. Then, a recorder 232 records the modulated recording data on the disk 10.

A standard flow for creating the aforementioned disk will be described with reference to FIGS. 55 and 56. FIG. 55 shows the flow of creating the logic data to be recorded on the disk 10. Specifically, as shown in step S280, parameter data items, including the number of video data files, their arrangement, and the size of each video data file, are set first. Next, as shown in step S281, a video manager 71 is created from the set parameters and the video title set information 281 in each video set 72. Thereafter, as shown in step S282, the video manager 71 and video title set 72 are arranged in that order according to the corresponding logical block number, thereby creating the logic data to be recorded on the disk 10.

Thereafter, the flow of creating the physical data to be recorded on the disk as shown in FIG. 56 is executed. Specifically, as shown in step S283, the logic data is divided into units of a specific number of bytes, thereby forming error correction data. Next, as shown in step S284, the logic data divided into units of a specific number of bytes are combined with the created error correction data to form physical sectors. Thereafter, as shown in step S285, physical data is created by combining physical sectors. In this way, the modulating process based on certain rules is performed on the physical data created in the flow of FIG. 56, thereby forming the recording data. Thereafter, the recording data is recorded on the disk 10.

The above-described data structure can be applied not only to a case where the data is recorded on recording mediums, such as optical disks, and then the disks are distributed to the users, but also to a communication system as shown in FIG. 57. Specifically, according to the procedure shown in FIGS. 51 to 54, an optical disk 10 in which a video manager 71 and video title set 72 as shown in FIG. 4 are stored may be loaded into a reproducing apparatus 300, from whose system CPU section 50 the encoded data is taken out digitally and transmitted by a modulator/transmitter 310 to the users or the cable subscribers by radio or via a cable. Furthermore, the encoding system 320 shown in FIGS. 51 and 54 may create the data encoded on the provider side, such as a broadcasting station and the encoded data may be transmitted by the modulator/transmitter 310 to the users or the cable subscribers by radio or via a cable. In such a communication system, the information in the video manager 71 is modulated at the modulator/transmitter 310 and then supplied to or is directly supplied to the users free of charge. When a user is interested in the title, the modulator/transmitter 310 transmits the title set 72 at the user's or subscriber's request by radio or via a cable. Under the control of the video manager 71, the video title set information 94 is first transferred and then the title video object 95 in the video title set reproduced according to the title set information 94 is transferred. At this time, if necessary, the video title set menu video object 95 is also transmitted. The transferred data is received by a receiver/demodulator 400 on the user side and is processed as encoded data at the system CPU section 50 of the reproducing apparatus on the user or subscriber side of FIG. 1 in the same manner as in the above-described reproducing process, whereby the video data is reproduced.

In transferring the video title set 72, the attribute information (VMGM_V_ATR, VMGM_AST_ATR, VMGM_SPST_ATR), (VTSM_V_ATR, VTSM_AST_ATR, VTSM_SPST_ATR), and (VTS_V_ATR, VTS_AST_ATR, VTS_SPST_ATR) are transferred for each title set as management information on video data, so that the video data etc. can be reproduced under suitable playback conditions in the reproducing system on the user side or subscriber side.

As described above, with the present invention, when the video data is displayed, the video data output scheme can be changed arbitrarily on the basis of the video data attributes given to the video data and the video data in the video title set can be reproduced optimally by reference to the attribute information. Moreover, by preparing a plurality of title sets in which the video data and sub-picture data differing in attribute information have been stored and storing these video titles on an optical disk, the video data, audio data, and sub-picture data can be reproduced in a suitable mode to a reproducing system even if the reproducing system is based on a different standard.

With the present invention, when there are a plurality of audio streams or sub-picture streams for the video data, because as many attributes as there are streams or channels are recorded in the order of number, the data attribute of the audio stream or sub-picture stream corresponding to the specified number can be acquired easily and the reproducing system can be set in the best playback condition in accordance with the specified audio stream or sub-picture stream. Because information as to whether or not the change to a display mode suitable for the playback screen is permitted with respect to the original image is written as attribute information, the video etc. can be reproduced with the maker's intention being always reflected in it.

What is claimed is:

1. A system for reproducing playback data from a recording medium having a playback data area in which the playback data is stored and a playback management information area in which management information on said stored video data and playback information on the procedure for reproducing the playback data is stored, said playback data including a combination of video data packs, audio data packs, and sub-picture data packs, each video data pack having video data compressed at a selected video compression mode, each audio data pack having audio data encoded at a selected audio encoding mode, and each sub-picture data pack having sub-picture data compressed at a selected sub-picture compression mode wherein the video data, the audio data, and the sub-picture data are compressed or encoded separately according to the selected compression or encoding mode, said management information including attribute information in which the video compression mode, the audio encoding mode, and the sub-picture compression mode are described, said system comprising:

searching means for searching said playback data and playback information area for to read out the attribute information describing the video compression mode, the audio encoding mode, and the sub-picture compression mode;

means for sending the information describing the video compression mode, the audio encoding mode, and the sub-picture compression mode to generate a video enabling signal, an audio enabling signal, and a sub-picture enabling signal, respectively;

video decoding means for decoding the compressed video data into an expanded video signal;

audio decoding means for decoding the encoded audio data into a decoded audio signal;

sub-picture decoding means for decoding the compressed sub-picture data into an expanded sub-picture signal;

enabling means for enabling the video decoding means, the audio decoding means, and the sub-picture decoding means in response to the video enabling signal, the audio enabling signal, and the sub-Picture enabling signal;

video output means for outputting the video signal with the sub-picture signal; and audio output means for outputting the audio signal.

2. A system according to claim 1, wherein said attribute information includes information on first and second compression modes in which the video data is to be compressed, and wherein said system includes conversion sections each having first and second decoding sections, each of which is selected by a selecting means, which decode the video data in first and second expansion modes corresponding to the first and second compression modes, respectively.

3. A system according to claim 1, wherein said attribute information includes information on first and second frame rates which determine a video data display scheme and wherein said system includes conversion sections each having first and second conversion units, each of which is selected by a selecting means, which convert the video data into a video signal to be displayed according to the first and second frame rates, respectively.

4. A system according to claim 1, wherein said attribute information includes information on first and second aspect ratios indicating a screen ratio for displaying the video data as images, and wherein said system includes conversion sections each having first and second conversion units, each of which is selected by a selecting means, which convert the video data into a video signal having the first and second aspect ratios, respectively.

5. A system according to claim 1, wherein said attribute information includes information on first and second display modes indicating a display scheme of displaying the video data as images, and wherein said system includes conversion sections each having first and second conversion units, each of which is selected by a selecting means, which convert video data into a video signal having either of the first and second display modes.

6. A system according to claim 5, wherein said attribute information includes information for permitting representation in either the first display mode wherein or the second display mode, and said first and second conversion units convert video data into video signals having the first and second display modes, respectively.

7. A system according to claim 1, wherein said attribute information includes information on an audio type of audio data, and wherein said system includes conversion sections each having a conversion unit that converts said audio data into an audio signal suitable for the audio type.

8. A system according to claim 1, wherein said attribute information includes information on an application type of audio data, and wherein said system includes conversion sections each having a conversion unit that converts the audio data into an audio signal suitable for the application type.

9. A system according to claim 1, wherein said attribute information includes information on a number of quantization bits of the audio data, and wherein said system includes conversion sections each having a decoding unit that decodes the audio data according to the number of quantization bits.

10. A system according to claim 1, wherein said attribute information includes information on a sampling frequency of the audio data, and wherein said system includes conversion sections each having a decoding unit that decodes the audio data according to the sampling frequency.

11. A system according to claim 1, wherein said attribute information includes information on a range of a number of audio channels of the audio data, and wherein said system includes conversion sections each having a conversion unit that converts the audio data into an audio channel signal corresponding to a number selected in the range of the number of audio channels.

12. A system according to claim 1, wherein said system includes conversion sections each having a conversion unit that decodes the sub-picture data according to the sub-picture encoding mode.

13. A system according to claim 1, wherein said attribute information includes information on a sub-picture display type of the sub-picture data, and wherein said system includes conversion sections each having a conversion unit that converts the sub-picture data into a sub-picture signal suitable for the sub-picture display type.

14. A system according to claim 1, wherein said attribute information includes information on a sub-picture type of the sub-picture data, and wherein said system includes conversion sections each having a conversion unit that converts the sub-picture data into a sub-picture signal suitable for the sub-picture type.

15. A system according to claim 1, wherein said attribute information includes information on multichannel audio streams of the audio data, and wherein said system includes conversion sections each having a conversion unit that decodes the audio data according to the attributes of the multichannel audio streams.

16. A system according to claim 1, wherein said attribute information includes information on multichannel audio streams of the audio data, and wherein said system includes conversion sections each having mixing means for mixing audio data according to attributes of the multichannel audio streams.

17. A system according to claim 1, wherein said playback data area stores control data for controlling the playback of the video data, the audio data, and the sub-picture data, the control data including time information prescribing a playback time of the video data and synchronization information of the audio data and the sub-picture data to be reproduced in synchronization with the video data.

18. A system according to claim 1, wherein said management information includes the number of audio streams contained in the audio data.

19. A system according to claim 1, wherein said management information includes the number of sub-picture streams contained in the sub-picture data.

20. A system according to claim 1, wherein the video data includes menu data for displaying a menu of the video data to be reproduced and said management information includes the unique attribute information necessary for converting the menu data into a menu playback signal.

21. A system according to claim 1, wherein said video data includes management menu data for displaying choices of the data recorded on said recording medium and said management information includes unique attribute information necessary for converting the management menu data into a menu playback signal.

22. A method of reproducing video data from a recording medium having a playback data area in which video data is stored and a playback information area in which management information on said stored video data and playback information on the procedure for reproducing the playback data is stored, said playback data including a combination of video data packs, audio data packs, and sub-picture data packs, each video data pack having video data compressed at a selected video compression mode, each audio data pack having audio data encoded at a selected audio encoding mode, and each sub-picture data pack having sub-picture data compressed at a selected sub-picture compression mode wherein the video data, the audio data, and the sub-picture data are compressed or encoded separately according to the selected compression or encoding mode, said management information including attribute information in which the video compression mode, the audio encoding mode, and the sub-picture compression mode are described, said method comprising:

searching said playback information area for to read out the attribute information describing the video compression mode, the audio encoding mode, and the sub-picture compression mode;

enabling decoding of the compressed video data, the encoded audio data, and the compressed sub-picture data based on the video compression mode, the audio encoding mode, and the sub-picture compression mode, respectively;

decoding the compressed video data into an expanded video signal;

decoding the encoded audio data into a decoded audio signal;

decoding the compressed sub-picture data into an expanded sub-picture signal;

outputting the video signal with the sub-picture signal; and outputting the audio signal.

23. A method according to claim 22, wherein said attribute information includes information on first and second video compression modes in which the video data is to be compressed, and wherein a converting step has first and second decoding steps which decode the video data in first and second expansion modes corresponding to the first and second compression modes, respectively.

24. A method according to claim 22, wherein said attribute information includes information on first and second frame rates determining a video data display scheme and wherein a converting step has first and second converting processes which convert the video data into video signals to be displayed according to the first and second frame rates, respectively.

25. A method according to claim 22, wherein said attribute information includes information on first and second aspect ratios indicating a screen ratio for displaying the video data as images, and wherein a converting step has first and second converting processes which convert the video data into video signals having the first and second aspect ratios, respectively.

26. A method according to claim 22, wherein said attribute information includes information on a first and second display modes indicating the scheme of displaying video data as images, and said converting step includes a first and second converting steps each of which is selected at the selecting step and which convert video data into a video signal having either display mode.

27. A method according to claim 26, wherein said attribute information includes information on first and second display modes for permitting representation of the video data in either the first display mode or the second display mode, and wherein the first and second converting processes convert the video data into video signals having the first and second display modes, respectively.

28. A method according to claim 22, wherein said attribute information includes information on an audio type of the audio data, and wherein said method includes a converting step having a step of converting the audio data into an audio signal suitable for the audio type.

29. A method according to claim 22, wherein said attribute information includes information on an application type of the audio data, and wherein said method includes a converting step having a step of converting the audio data into an audio signal suitable for the application type.

30. A method according to claim 22, wherein said attribute information includes information on a number of quantization bits of the audio data, and wherein said method includes a converting step having a step of converting the audio data according to the number of quantization bits.

31. A method according to claim 22, wherein said attribute information includes information on a sampling frequency of the audio data, and wherein said method includes a converting step having a step of converting the audio data according to the sampling frequency.

32. A method according to claim 22, wherein said attribute information includes information on a range of a number of audio channels of the audio data and wherein said method includes a converting step having a step of converting the audio data into an audio channel signal corresponding to a number selected in the range of the number of audio channels.

33. A method according to claim 22, wherein said method includes a converting step having a step of decoding the sub-picture data according to the sub-picture encoding mode.

34. A method according to claim 22, wherein said attribute information includes information on a sub-picture display type of the sub-picture data, and wherein said method includes a converting step having a step of converting the sub-picture data into a sub-picture signal suitable for the sub-picture display type.

35. A method according to claim 22, wherein said attribute information includes information on a sub-picture type of the sub-picture data, and wherein said method includes a converting step having a step of converting the sub-picture data into a sub-picture signal suitable for the sub-picture type.

36. A method according to claim 22, wherein said attribute information includes information on multichannel audio streams of the audio data, and wherein said method includes a converting step having a step of decoding the audio data according to the attributes of the multichannel audio streams.

37. A method according to claim 22, wherein said attribute information includes information on multichannel audio streams of the audio data, and wherein said method includes a converting step having a step of mixing the audio data according to the attributes of the multichannel audio streams.

38. A method according to claim 22, wherein said playback data area stores control data for controlling the playback of the video data, the audio data, and the sub-picture data, the control data including time information prescribing a playback time of the video data and synchronization information of the audio data and the sub-picture data to be reproduced in synchronization with the video data.

39. A method according to claim 22, wherein the playback data area stores audio data and the management information includes the number of audio streams contained in the audio data.

40. A method according to claim 22, wherein the playback data area stores sub-picture data and the management information includes the number of sub-picture streams contained in the sub-picture data.

41. A method according to claim 22, wherein the video data includes menu data for displaying a menu of video data to be reproduced and the management information includes unique attribute information necessary for converting the menu data into a menu playback signal.

42. A method according to claim 22, wherein the video data includes management menu data for displaying choices of the data recorded on said recording medium and the management information includes unique attribute information necessary for converting the management menu data into a menu playback signal.

43. A communication system for transferring playback data, comprising:

means for creating the playback data, management information in the playback data and playback management data specifying the procedure of reproducing the playback data, the playback data containing video data units, which are to be reproduced time-sequentially and each of which is to be reproduced within a constant time span, each video data unit containing data pack trains into which the video data is compressed and packeted at a selected video compression mode, said playback data also including audio data Packs having audio data encoded at a selected audio encoding mode and sub-picture data packs having sub-picture data coded at a selected sub-picture compression mode wherein the video data, the audio data, and the sub-picture data are compressed or encoded separately according to the selected compression or encoding mode, said management information including attribute information in which the video compression mode, the audio encoding mode, and the sub-picture compression mode are described;

means for transferring the playback management data and for transferring the video data the audio data, and the sub-picture data after the playback management data has been transferred;

conversion sections for converting the transferred video data into video signals, the transferred audio data into audio signals, and the transferred sub-picture data into sub-picture signals according to the attribute information; and selecting means for selecting one of the conversion sections according to the attribute information in the transferred playback management data.

44. A communication system according to claim 43, wherein said attribute information includes information on first and second compression modes in which the video data is to be compressed, and said conversion sections each include first and second decoding sections, each of which is selected by the selecting means and which decode the video data in first and second expansion modes corresponding to the first and second compression modes, respectively.

45. A communication system according to claim 43, wherein said attribute information includes information on first and second frame rates determining a video data display scheme and said conversion sections each include first and second conversion units, each of which is selected by the selecting means and which convert the video data into a video signal to be displayed according to the first and second frame rates, respectively.

46. A communication system according to claim 43, wherein said attribute information includes information on first and second aspect ratios indicating the screen ratio for displaying the video data as images, and said conversion sections each include first and second conversion units, each of which is selected by the selecting means and which convert the video data into a video signal having the first and second aspect ratios, respectively.

47. A communication system according to claim 43, wherein said attribute information includes information on first and second display modes indicating the scheme of displaying the video data as images, and said conversion sections each include first and second conversion units, each of which is selected by the selecting means and which convert video data into a video signal having either display mode.

48. A communication system according to claim 47, wherein the attribute information includes information for permitting representation of the video data in either the first display mode or the second display mode, and the first and second conversion units convert the video data into video signals having the first and second display modes, respectively.

49. A communication system according to claim 43, wherein said attribute information includes information on the audio encoding mode of the audio data, said conversion sections each include a decoding section that decodes the audio data according to the audio encoding mode.

50. A communication system according to claim 43, wherein said attribute information includes information on an audio type of the audio data, and said conversion sections each include a conversion unit that converts the audio data into an audio signal suitable for the audio type.

51. A communication system according to claim 43, wherein said attribute information includes information on an application type of the audio data, and said conversion sections each include a conversion unit that converts the audio data into an audio signal suitable for the application type.

52. A communication system according to claim 43, said attribute information includes information on a number of the quantization bits of audio data, and said conversion sections each include a decoding unit that decodes the audio data according to the number of quantization bits.

53. A communication system according to claim 43, wherein said attribute information includes information on a sampling frequency of the audio data, and said conversion sections each include a decoding unit that decodes the audio data according to the sampling frequency.

54. A communication system according to claim 43, wherein said attribute information includes information on a range of a number of audio channels of the audio data, and said conversion sections each include a conversion unit that converts the audio data into an audio channel signal corresponding to a number selected in the range of the number of audio channels.

55. A communication system according to claim 43, said attribute information includes information on a sub-picture coding mode of the sub-picture data, and said conversion sections each include a decoding unit that decodes the sub-picture data according to the sub-picture coding mode.

56. A communication system according to claim 43, said attribute information includes information on a sub-picture display type of the sub-picture data, and said conversion sections each include a conversion unit that converts the sub-picture data into a sub-picture signal suitable for the sub-picture display type.

57. A communication system according to claim 43, said attribute information includes information on a sub-picture type of the sub-picture data, and said conversion sections each include a conversion unit that converts the sub-picture data into a sub-picture signal suitable for the sub-picture type.

58. A communication system according to claim 43, wherein said attribute information includes information on multichannel audio streams of the audio data, and said conversion sections each include a decoding unit that decodes the audio data according to the attributes of the multichannel audio streams.

59. A communication system according to claim 43, wherein said attribute information includes information on multichannel audio streams of the audio data, and said conversion sections each include mixing means for mixing audio data according to the attributes of the multichannel audio streams.

60. A communication system according to claim 43, wherein said data pack trains further include control data for controlling the playback of the video data, the audio data, and the sub-picture data, the control data including time information prescribing a playback time of the video data and synchronization information of the audio data and the sub-picture data to be reproduced in synchronization with the video data.

61. A communication system according to claim 43, wherein said data pack trains further include audio data pack trains into which the audio data has been packeted and said management information includes the number of audio streams contained in the audio data.

62. A communication system according to claim 43, wherein the management information includes the number of sub-picture streams contained in the sub-picture data.

63. A communication system according to claim 43, wherein the video data includes menu data for displaying a menu of the video data to be reproduced and the management information includes unique attribute information necessary for converting the menu data into a menu playback signal.

64. A communication system according to claim 43, wherein the video data includes management menu data for displaying the choices of the data recorded on said recording medium and said management information includes unique attribute information necessary for converting the management menu data into a menu playback signal.

* * * * *